(12) United States Patent
Peringassery Krishnan et al.

(10) Patent No.: US 12,382,101 B2
(45) Date of Patent: Aug. 5, 2025

(54) ADAPTIVE APPLICATION OF GENERALIZED SAMPLE OFFSET

(71) Applicant: Tencent America LLC, Palo Alto, CA (US)

(72) Inventors: Madhu Peringassery Krishnan, Mountain View, CA (US); Xin Zhao, San Jose, CA (US); Liang Zhao, Sunnyvale, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 344 days.

(21) Appl. No.: 17/977,160

(22) Filed: Oct. 31, 2022

(65) Prior Publication Data

US 2023/0156232 A1    May 18, 2023

Related U.S. Application Data

(60) Provisional application No. 63/289,139, filed on Dec. 13, 2021, provisional application No. 63/280,503, filed on Nov. 17, 2021.

(51) Int. Cl.
*H04N 19/70* (2014.01)
*H04N 19/176* (2014.01)
*H04N 19/186* (2014.01)
*H04N 19/46* (2014.01)

(52) U.S. Cl.
CPC .......... *H04N 19/70* (2014.11); *H04N 19/176* (2014.11); *H04N 19/186* (2014.11); *H04N 19/46* (2014.11)

(58) Field of Classification Search
CPC .... H04N 19/70; H04N 19/176; H04N 19/186; H04N 19/46

USPC ...................................................... 375/240.26
See application file for complete search history.

(56) References Cited

U.S. PATENT DOCUMENTS

| | | | | |
|---|---|---|---|---|
| 2013/0195199 | A1* | 8/2013 | Guo | H04N 19/91 |
| | | | | 375/240.18 |
| 2014/0146891 | A1* | 5/2014 | Chuang | H04N 19/146 |
| | | | | 375/240.16 |
| 2017/0054976 | A1* | 2/2017 | Li | H04N 19/14 |
| 2017/0272757 | A1* | 9/2017 | Xu | H04N 19/46 |
| 2019/0289323 | A1* | 9/2019 | Wiegand | H04N 19/184 |

(Continued)

FOREIGN PATENT DOCUMENTS

| CN | 113409560 A | 9/2021 |
|---|---|---|
| WO | WO 2022/197794 A1 | 9/2022 |
| WO | WO 2023/086214 A1 | 5/2023 |

OTHER PUBLICATIONS

Japanese Office Action with English machine translation regarding 2023-555642 dated Sep. 30, 2024, 4 pages.

(Continued)

*Primary Examiner* — Matthew David Kim
(74) *Attorney, Agent, or Firm* — Crowell & Moring LLP

(57) ABSTRACT

This disclosure relates to adaptive loop filtering (ALF) for cross-component sample offset (CCSO), local sample offset (LSO), and generalized sample offset (GSO). ALF uses reconstructed samples of a first color component as input (e.g., Y or Cb or Cr). At least one of the GSO, LSO, or CCSO is determined to be enabled for a frame based on a syntax value in a coded video stream. The coded video stream is decoded by applying the at least one of the GSO, the LSO, or the CCSO at a block level.

18 Claims, 34 Drawing Sheets

(56) References Cited

U.S. PATENT DOCUMENTS

| | | | | |
|---|---|---|---|---|
| 2020/0195976 A1* | 6/2020 | Zhao | ................... | H04N 19/186 |
| 2021/0037258 A1* | 2/2021 | Zhang | ................... | H04N 19/31 |
| 2021/0274201 A1* | 9/2021 | Xu | ................... | H04N 19/593 |
| 2021/0321143 A1* | 10/2021 | Kim | ................... | H04N 19/86 |
| 2022/0038726 A1* | 2/2022 | Kuo | ................... | H04N 19/44 |
| 2022/0078422 A1* | 3/2022 | Park | ................... | H04N 19/124 |
| 2023/0276056 A1* | 8/2023 | Sharman | ................ | H04N 19/13 |
| | | | | 375/240.02 |
| 2023/0319271 A1* | 10/2023 | Lim | ................... | H04N 19/96 |
| | | | | 375/240.02 |

OTHER PUBLICATIONS

Kuo et al., Joint Video Experts Team (JVET) Joint Video Experts Team (JVET), Of ITU-T SG 16 WP 3 and ISO/IEC JTC 1/SC 29, "AHG12: Cross-component Sample Adaptive Offset," Document: JVET-V0153-v2, 22nd Meeting, by teleconference, Apr. 20-28, 2021, 6 pages.

Kuo et al., EE2-5.1 : Cross-component Sample Adaptive Offset, Input document to JVET, Joint Video Experts Team (JVET) of ITU-T SG 16 WP3 and ISO/IEC JTC 1/SC 29, $23^{rd}$ Meeting by Teleconference, Jul. 7-16, 2021, Document JVET-W0066, 7 pages.

International Search Report and Written Opinion for International Application No. PCT/US22/48415 mailed Mar. 1, 2023 (9 pages).

\* cited by examiner

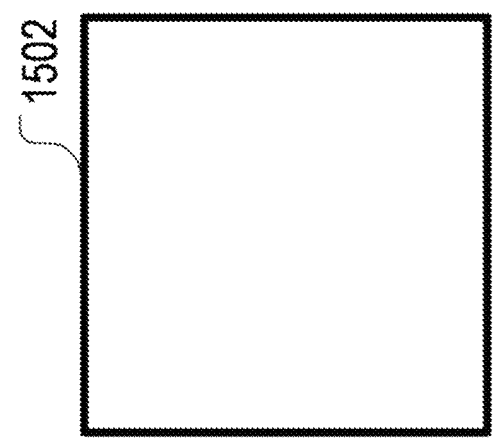
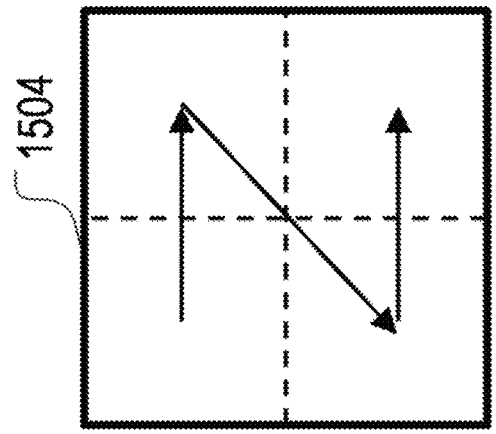
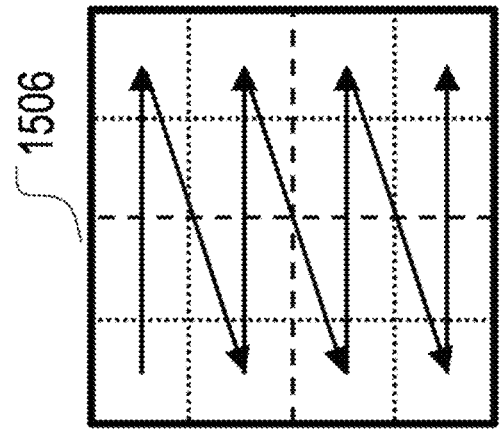
FIG. 15
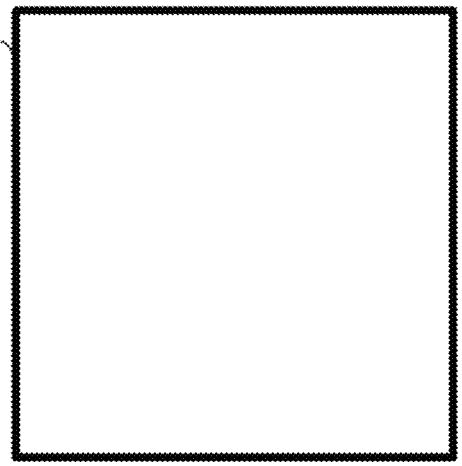
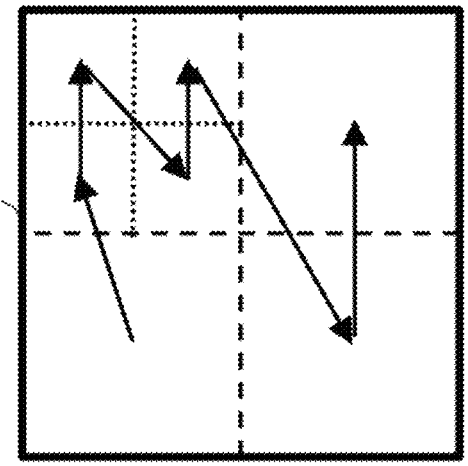
FIG. 16

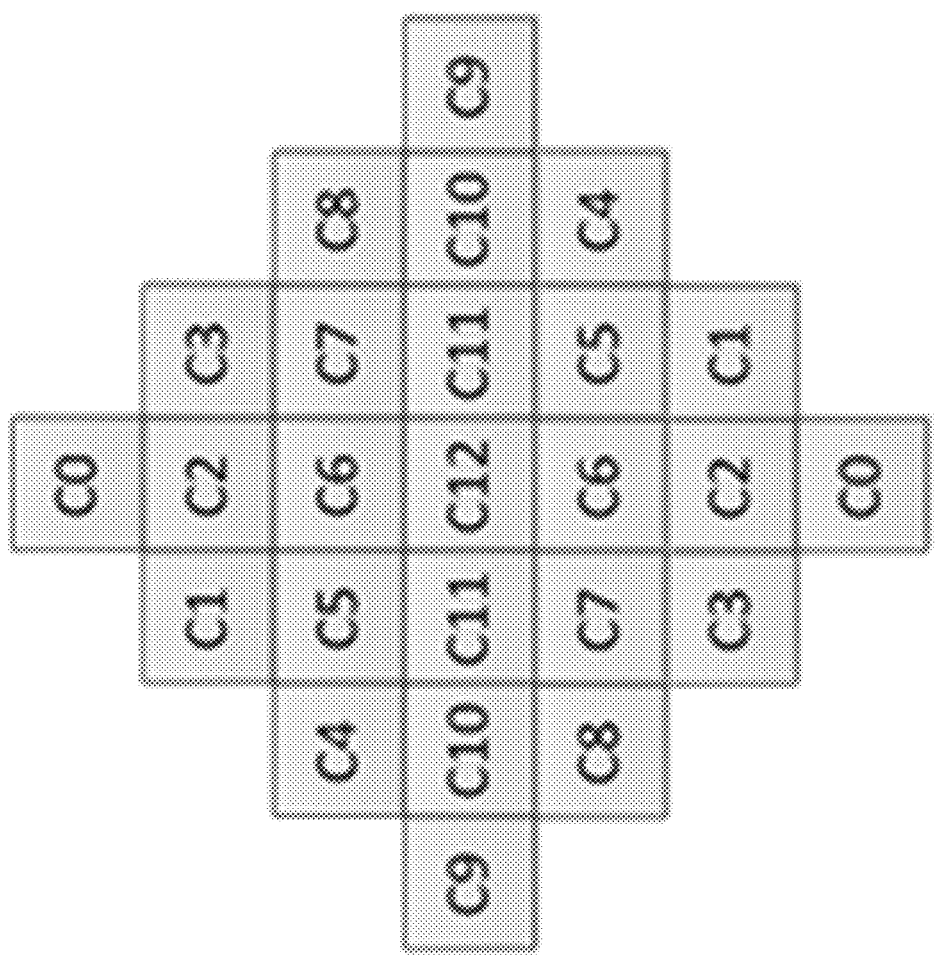
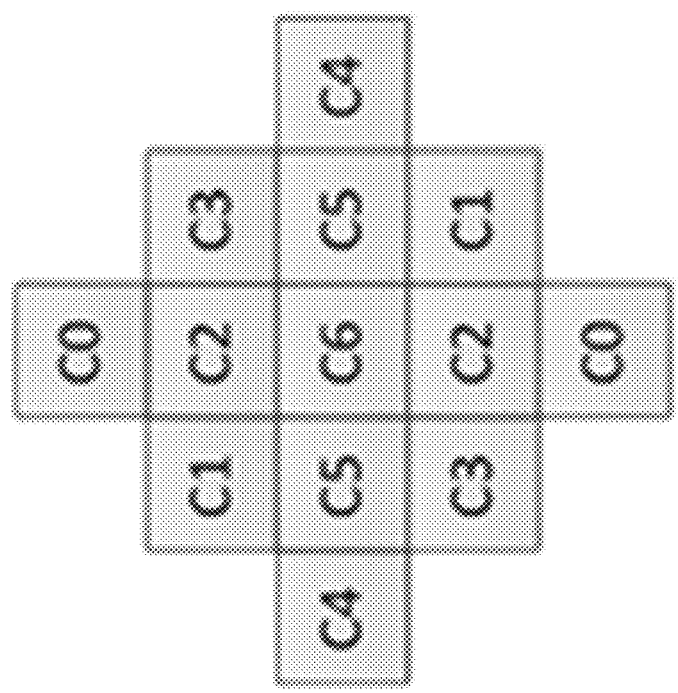
FIG. 18

FIG. 26

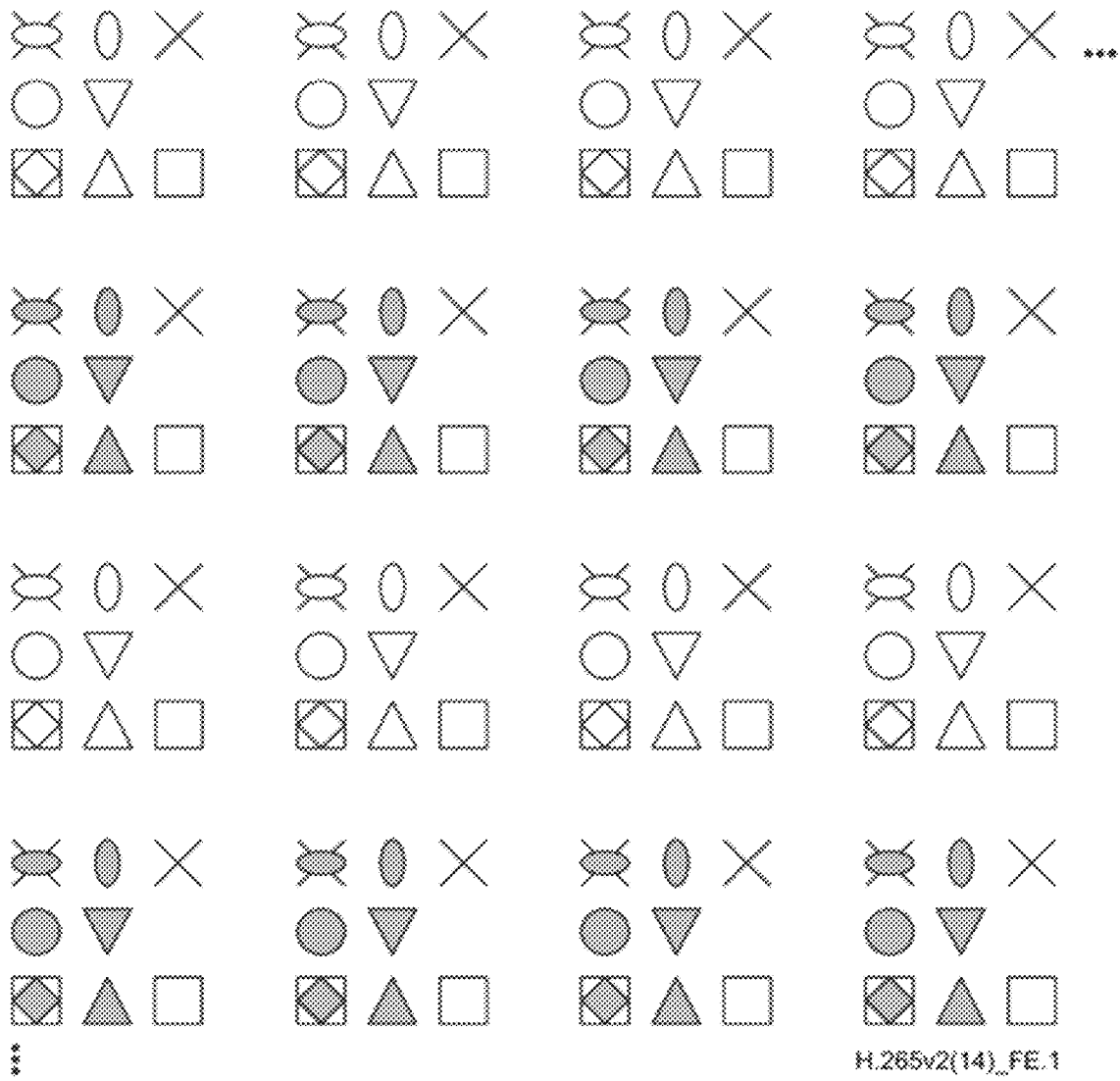

Interpretation of symbols
Luma sample position indications:

✕ Luma sample top field  ☐ Luma sample bottom field

Chroma sample position indications, where gray fill indicates a bottom field sample type and no fill indicates a top field sample type:

⬯ Chroma sample type 2  ◊ Chroma sample type 3
○ Chroma sample type 0  ▽ Chroma sample type 1
◇ Chroma sample type 4  △ Chroma sample type 5

FIG. 31
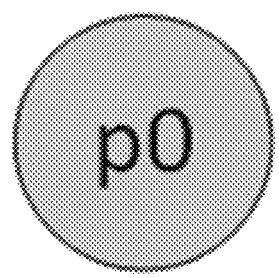
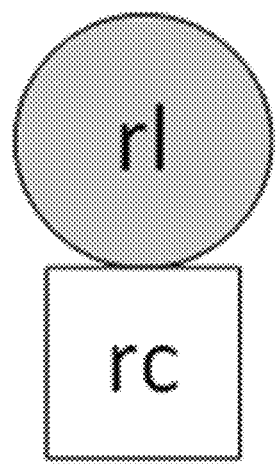
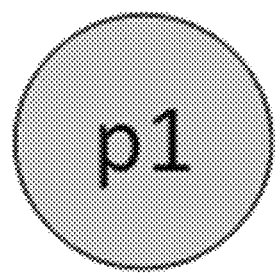

ADAPTIVE APPLICATION OF GENERALIZED SAMPLE OFFSET

INCORPORATION BY REFERENCE

This application is based on and claims the benefit of priority to U.S. Provisional Application No. 63/280,503, filed on Nov. 17, 2021, entitled "ADAPTIVE APPLICATION OF GENERALIZED SAMPLE OFFSET," and U.S. Provisional Application No. 63/289,139, filed on Dec. 13, 2021, entitled "ADAPTIVE APPLICATION OF GENERALIZED SAMPLE OFFSET," the contents of each of which are herein incorporated by reference in their entirety.

TECHNICAL FIELD

This disclosure describes a set of advanced video coding technologies. More specifically, the disclosed technology involves cross-component sample offset (CCSO), local sample offset (LSO), and generalized sample offset (GSO).

BACKGROUND

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Video coding and decoding can be performed using inter-picture prediction with motion compensation. Uncompressed digital video can include a series of pictures, with each picture having a spatial dimension of, for example, 1920×1080 luminance samples and associated full or sub-sampled chrominance samples. The series of pictures can have a fixed or variable picture rate (alternatively referred to as frame rate) of, for example, 60 pictures per second or 60 frames per second. Uncompressed video has specific bitrate requirements for streaming or data processing. For example, video with a pixel resolution of 1920×1080, a frame rate of 60 frames/second, and a chroma sub sampling of 4:2:0 at 8 bit per pixel per color channel requires close to 1.5 Gbit/s bandwidth. An hour of such video requires more than 600 GBytes of storage space.

One purpose of video coding and decoding can be the reduction of redundancy in the uncompressed input video signal, through compression. Compression can help reduce the aforementioned bandwidth and/or storage space requirements, in some cases, by two orders of magnitude or more. Both lossless compression and lossy compression, as well as a combination thereof can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application albeit some information loss. In the case of video, lossy compression is widely employed in many applications. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

A video encoder and decoder can utilize techniques from several broad categories and steps, including, for example, motion compensation, Fourier transform, quantization, and entropy coding.

Video codec technologies can include techniques known as intra coding. In intra coding, sample values are represented without reference to samples or other data from previously reconstructed reference pictures. In some video codecs, a picture is spatially subdivided into blocks of samples. When all blocks of samples are coded in intra mode, that picture can be referred to as an intra picture. Intra pictures and their derivatives such as independent decoder refresh pictures, can be used to reset the decoder state and can, therefore, be used as the first picture in a coded video bitstream and a video session, or as a still image. The samples of a block after intra prediction can then be subject to a transform into frequency domain, and the transform coefficients so generated can be quantized before entropy coding. Intra prediction represents a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as that known from, for example, MPEG-2 generation coding technologies, does not use intra prediction. However, some newer video compression technologies include techniques that attempt coding/decoding of blocks based on, for example, surrounding sample data and/or metadata that are obtained during the encoding and/or decoding of spatially neighboring, and that precede in decoding order the blocks of data being intra coded or decoded. Such techniques are henceforth called "intra prediction" techniques. Note that in at least some cases, intra prediction uses reference data only from the current picture under reconstruction and not from other reference pictures.

There can be many different forms of intra prediction. When more than one of such techniques are available in a given video coding technology, the technique in use can be referred to as an intra prediction mode. One or more intra prediction modes may be provided in a particular codec. In certain cases, modes can have submodes and/or may be associated with various parameters, and mode/submode information and intra coding parameters for blocks of video can be coded individually or collectively included in mode codewords. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). Generally, for intra prediction, a predictor block can be formed using neighboring sample values that have become available. For example, available values of particular set of neighboring samples along certain direction and/or lines may be copied into the predictor block. A reference to the direction in use can be coded in the bitstream or may itself be predicted.

Referring to FIG. 1A, depicted in the lower right is a subset of nine predictor directions specified in H.265's 33 possible intra predictor directions (corresponding to the 33 angular modes of the 35 intra modes specified in H.265). The point where the arrows converge (101) represents the sample being predicted. The arrows represent the direction from which neighboring samples are used to predict the sample at 101. For example, arrow (102) indicates that sample (101) is predicted from a neighboring sample or samples to the upper right, at a 45 degree angle from the horizontal direction. Similarly, arrow (103) indicates that sample (101) is predicted from a neighboring sample or samples to the lower left of sample (101), in a 22.5 degree angle from the horizontal direction.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are example reference samples that follow a similar numbering scheme. A reference sample is labelled with an R, its Y position (e.g., row index) and X position (column index) relative to block (104). In both H.264 and H.265, prediction samples adjacently neighboring the block under reconstruction are used.

Intra picture prediction of block 104 may begin by copying reference sample values from the neighboring samples according to a signaled prediction direction. For example, assuming that the coded video bitstream includes signaling that, for this block 104, indicates a prediction direction of arrow (102)—that is, samples are predicted from a prediction sample or samples to the upper right, at a 45-degree angle from the horizontal direction. In such a case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has continued to develop. In H.264 (year 2003), for example, nine different direction are available for intra prediction. That increased to 33 in H.265 (year 2013), and JEM/VVC/BMS, at the time of this disclosure, can support up to 65 directions. Experimental studies have been conducted to help identify the most suitable intra prediction directions, and certain techniques in the entropy coding may be used to encode those most suitable directions in a small number of bits, accepting a certain bit penalty for directions. Further, the directions themselves can sometimes be predicted from neighboring directions used in the intra prediction of the neighboring blocks that have been decoded.

FIG. 1B shows a schematic (180) that depicts 65 intra prediction directions according to JEM to illustrate the increasing number of prediction directions in various encoding technologies developed over time.

The manner for mapping of bits representing intra prediction directions to the prediction directions in the coded video bitstream may vary from video coding technology to video coding technology; and can range, for example, from simple direct mappings of prediction direction to intra prediction mode, to codewords, to complex adaptive schemes involving most probable modes, and similar techniques. In all cases, however, there can be certain directions for intro prediction that are statistically less likely to occur in video content than certain other directions. As the goal of video compression is the reduction of redundancy, those less likely directions will, in a well-designed video coding technology, may be represented by a larger number of bits than more likely directions.

Inter picture prediction, or inter prediction may be based on motion compensation. In motion compensation, sample data from a previously reconstructed picture or part thereof (reference picture), after being spatially shifted in a direction indicated by a motion vector (MV henceforth), may be used for a prediction of a newly reconstructed picture or picture part (e.g., a block). In some cases, the reference picture can be the same as the picture currently under reconstruction. MVs may have two dimensions X and Y, or three dimensions, with the third dimension being an indication of the reference picture in use (akin to a time dimension).

In some video compression techniques, a current MV applicable to a certain area of sample data can be predicted from other MVs, for example from those other MVs that are related to other areas of the sample data that are spatially adjacent to the area under reconstruction and precede the current MV in decoding order. Doing so can substantially reduce the overall amount of data required for coding the MVs by relying on removing redundancy in correlated MVs, thereby increasing compression efficiency. MV prediction can work effectively, for example, because when coding an input video signal derived from a camera (known as natural video) there is a statistical likelihood that areas larger than the area to which a single MV is applicable move in a similar direction in the video sequence and, therefore, can in some cases be predicted using a similar motion vector derived from MVs of neighboring area. That results in the actual MV for a given area to be similar or identical to the MV predicted from the surrounding MVs. Such an MV in turn may be represented, after entropy coding, in a smaller number of bits than what would be used if the MV is coded directly rather than predicted from the neighboring MV(s). In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 specifies, described below is a technique henceforth referred to as "spatial merge".

Specifically, referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block uses.

AOMedia Video 1 (AV1) is an open video coding format designed for video transmissions over the Internet. It was developed as a successor to VP9 by building on the codebase of VP9, and incorporating additional techniques. The AV1 bitstream specification includes a reference video codec, such as the H.265 or High Efficiency Video Coding (HEVC) standard or Versatile Video Coding (VVC).

SUMMARY

Embodiments of the disclosure provide methods and apparatuses for cross-component sample offset (CCSO), local sample offset (LSO), and generalized sample offset (GSO). Adaptive loop filtering (ALF) uses reconstructed samples of a first color component as input (e.g., Y or Cb or Cr). For CCSO, the output is applied on a second color component which is a different color component of the first color component. For LSO, the output is applied on the first color component. For GSO, a combined ALF may be generalized for CCSO and LSO by considering a delta value between neighboring samples of a collocated (or current) sample and also considering a level value of the collocated (or current) sample. At least one of the CCSO, the LSO, or the GSO may be enabled for a frame based on a syntax value included in a coded video stream.

In one embodiment, a method includes: receiving a coded video stream comprising a syntax element indicating whether a sample offset filtering process is applied to a frame in the coded video stream at a block level; determining that at least one of: a generalized sample offset (GSO), a local sample offset (LSO), or a cross component sample offset (CCSO) is enabled for the frame based on the syntax element being a predefined value; and decoding the coded video stream by applying the at least one of the GSO, the LSO, or the CCSO at the block level.

In another embodiment, an apparatus for decoding a video stream includes a memory storing a plurality of instructions; and a processor configured to execute the plurality of instructions, and upon execution of the plurality of instructions, is configured to: receive a coded video stream comprising a syntax element indicating whether a sample offset filtering process is applied to a frame in the coded video stream at a block level; determine that at least one of: a generalized sample offset (GSO), a local sample offset (LSO), or a cross component sample offset (CCSO) is enabled for the frame at the block level based on the syntax element being a predefined value; and decode the coded video stream by application of the at least one of the GSO, the LSO, or the CCSO at the block level.

In another embodiment, a non-transitory computer readable storage medium storing a plurality of instructions executable by a processor, wherein upon execution by the processor, the plurality of instructions is configured to cause the processor to: receive a coded video stream comprising a syntax element indicating whether a sample offset filtering process is applied to a frame in the coded video stream at a block level; determine that at least one of: a generalized sample offset (GSO), a local sample offset (LSO), or a cross component sample offset (CCSO) is enabled for the frame based on the syntax element being a predefined value; and decode the coded video stream by application of the at least one of the GSO, the LSO, or the CCSO at the block level.

In some other embodiments, a device for processing video information is disclosed. The device may include a circuitry configured to perform any one of the method implementations above.

Embodiments of the disclosure also provide non-transitory computer-readable mediums storing instructions which when executed by a computer for video decoding and/or encoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which:

FIG. 15 shows a scheme for partitioning a coding block into multiple transform blocks and coding order of the transform blocks according to example embodiments of the disclosure;

FIG. 16 shows another scheme for partitioning a coding block into multiple transform blocks and coding order of the transform block according to example embodiments of the disclosure;

FIG. 18 shows an example adaptive loop filter (ALF) shape;

FIG. 26 shows an example location of chroma samples relative to luma samples;

FIG. 31 shows example inputs of cross-component sample offset (CCSO);

DETAILED DESCRIPTION OF EMBODIMENTS

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part on context. In addition, the term "based on" or "determined by" may be understood as not necessarily intended to convey an exclusive set of factors and may, instead, allow for existence of additional factors not necessarily expressly described, again, depending at least in part on context.

Figure 1A:
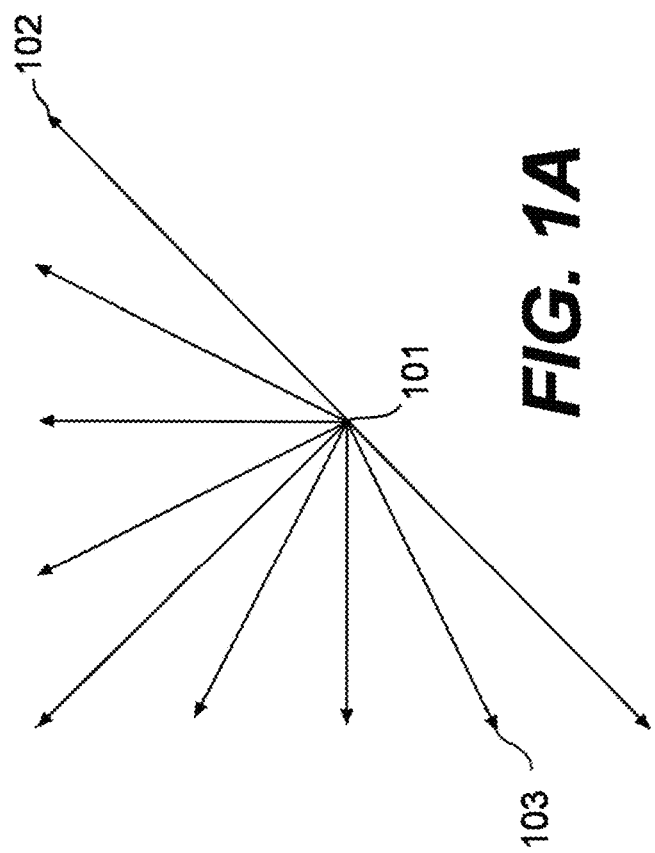
FIG. 1A shows a schematic illustration of an exemplary subset of intra prediction directional modes.
Figure 1B:
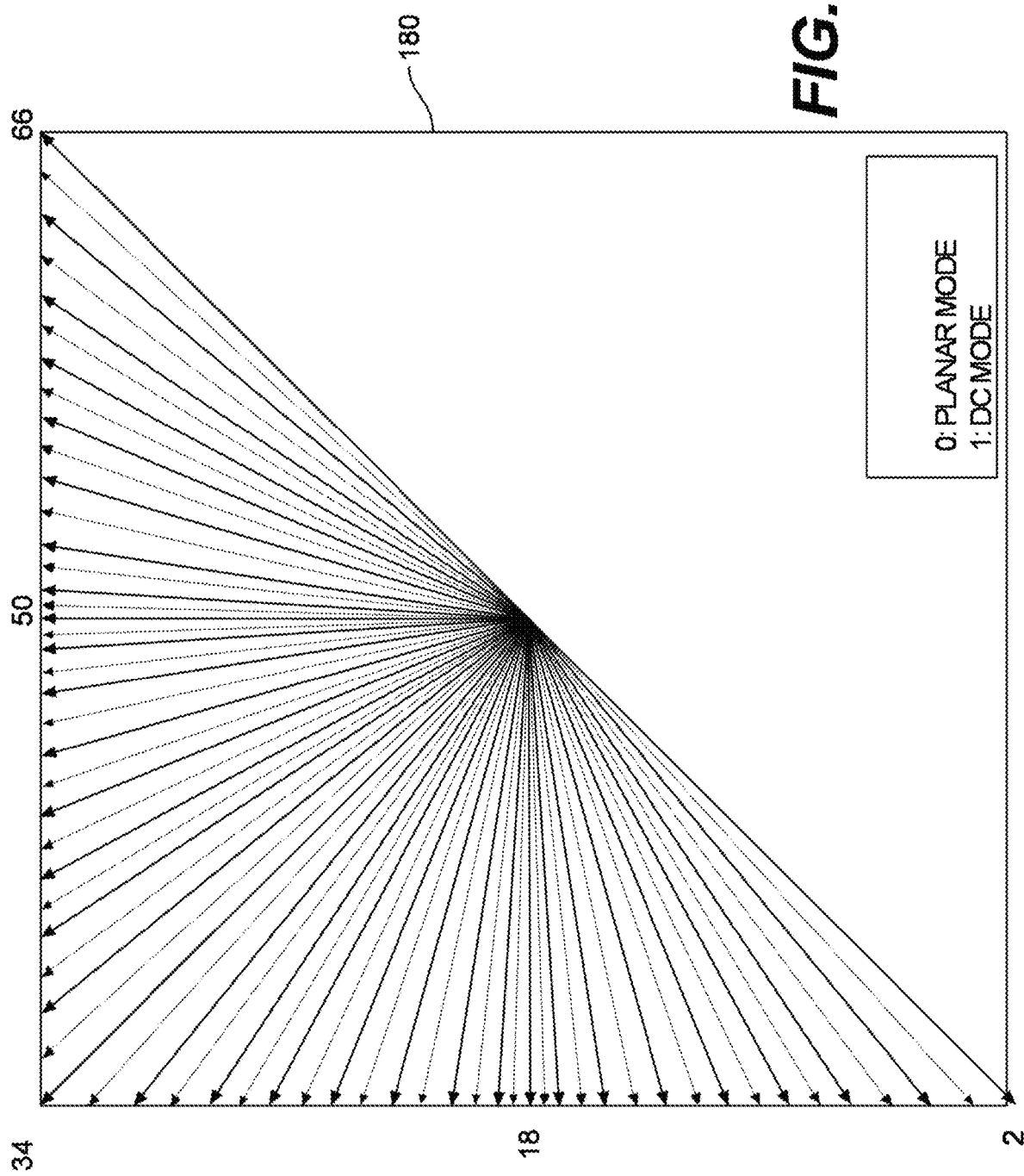
FIG. 1B shows an illustration of exemplary intra prediction directions.
Figure 2:
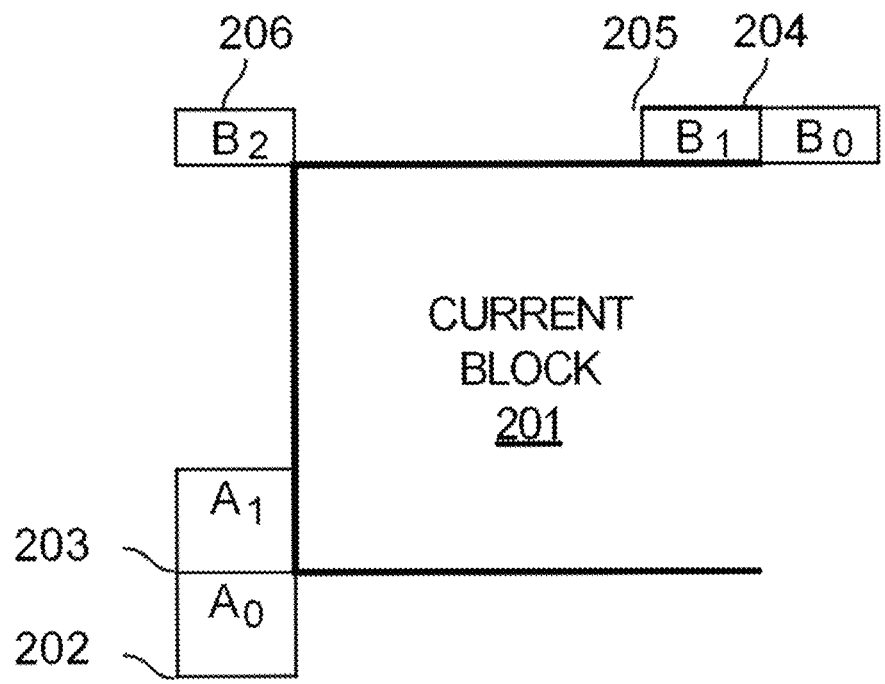
FIG. 2 shows a schematic illustration of a current block and its surrounding spatial merge candidates for motion vector prediction in one example.
Figure 3:
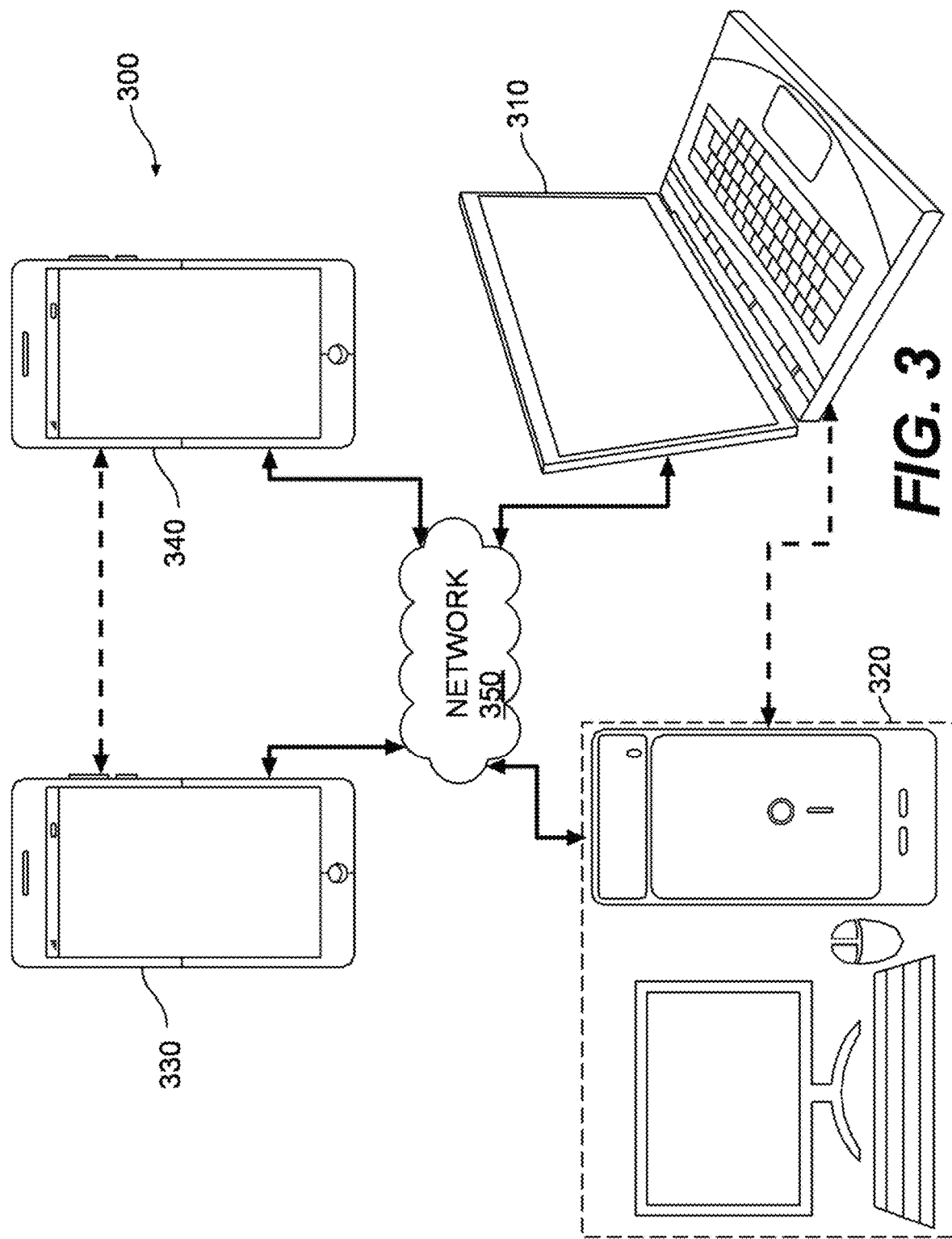
FIG. 3 shows a schematic illustration of a simplified block diagram of a communication system (300) in accordance with an example embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the example of FIG. 3, the first pair of terminal devices (310) and (320) may perform unidirectional transmission of data. For example, the terminal device (310) may code video data (e.g., of a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display the video pictures according to the recovered video data. Unidirectional data transmission may be implemented in media serving applications and the like.

In another example, the communication system (300) includes a second pair of terminal devices (330) and (340) that perform bidirectional transmission of coded video data that may be implemented, for example, during a videoconferencing application. For bidirectional transmission of data, in an example, each terminal device of the terminal devices (330) and (340) may code video data (e.g., of a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display the video pictures at an accessible display device according to the recovered video data.

In the example of FIG. 3, the terminal devices (310), (320), (330) and (340) may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (350) represents any number or types of networks that convey coded video data among the terminal devices (310), (320), (330) and (340), including for example wireline (wired) and/or wireless communication networks. The communication network (350) may exchange data in circuit-switched, packet-switched, and/or other types of channels. Representative networks include telecommunications networks, local area networks, wide area networks and/or the Internet. For the purposes of the present discussion, the architecture and topology of the network (350) may be immaterial to the operation of the present disclosure unless explicitly explained herein.

Figure 4:
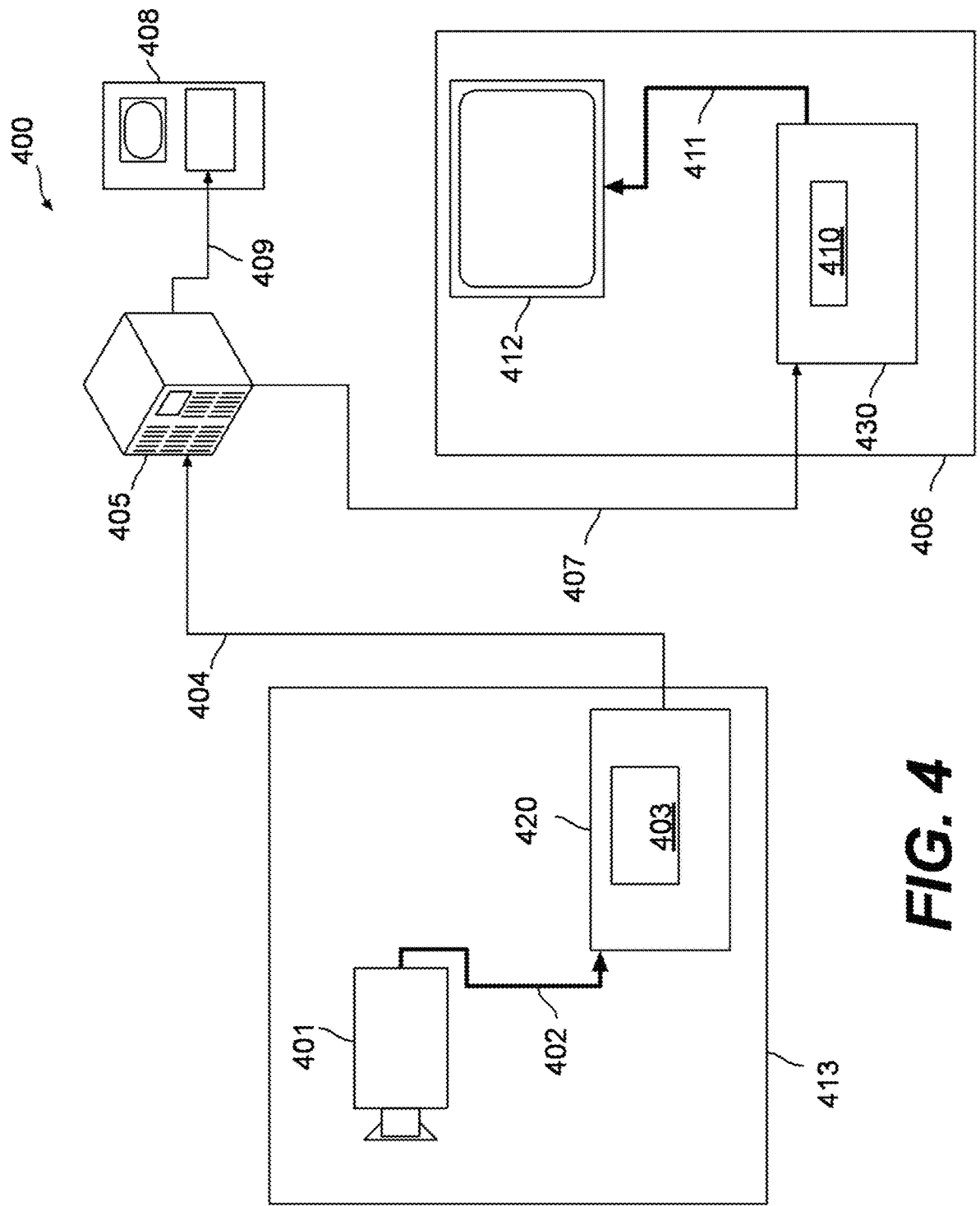
FIG. 4 shows a schematic illustration of a simplified block diagram of a communication system (400) in accordance with an example embodiment.

FIG. 4 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

A video streaming system may include a video capture subsystem (413) that can include a video source (401), e.g., a digital camera, for creating a stream of video pictures or images (402) that are uncompressed. In an example, the stream of video pictures (402) includes samples that are recorded by a digital camera of the video source 401. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize a lower data volume when compared to the stream of uncompressed video pictures (402), can be stored on a streaming server (405) for future use or directly to downstream video devices (not shown). One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that are uncompressed and that can be rendered on a display (412) (e.g., a display screen) or other rendering devices (not depicted). The video decoder 410 may be configured to perform some or all of the various functions described in this disclosure. In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC, and other video coding standards.

It is noted that the electronic devices (420) and (430) can include other components (not shown). For example, the electronic device (420) can include a video decoder (not shown) and the electronic device (430) can include a video encoder (not shown) as well.

Figure 5:
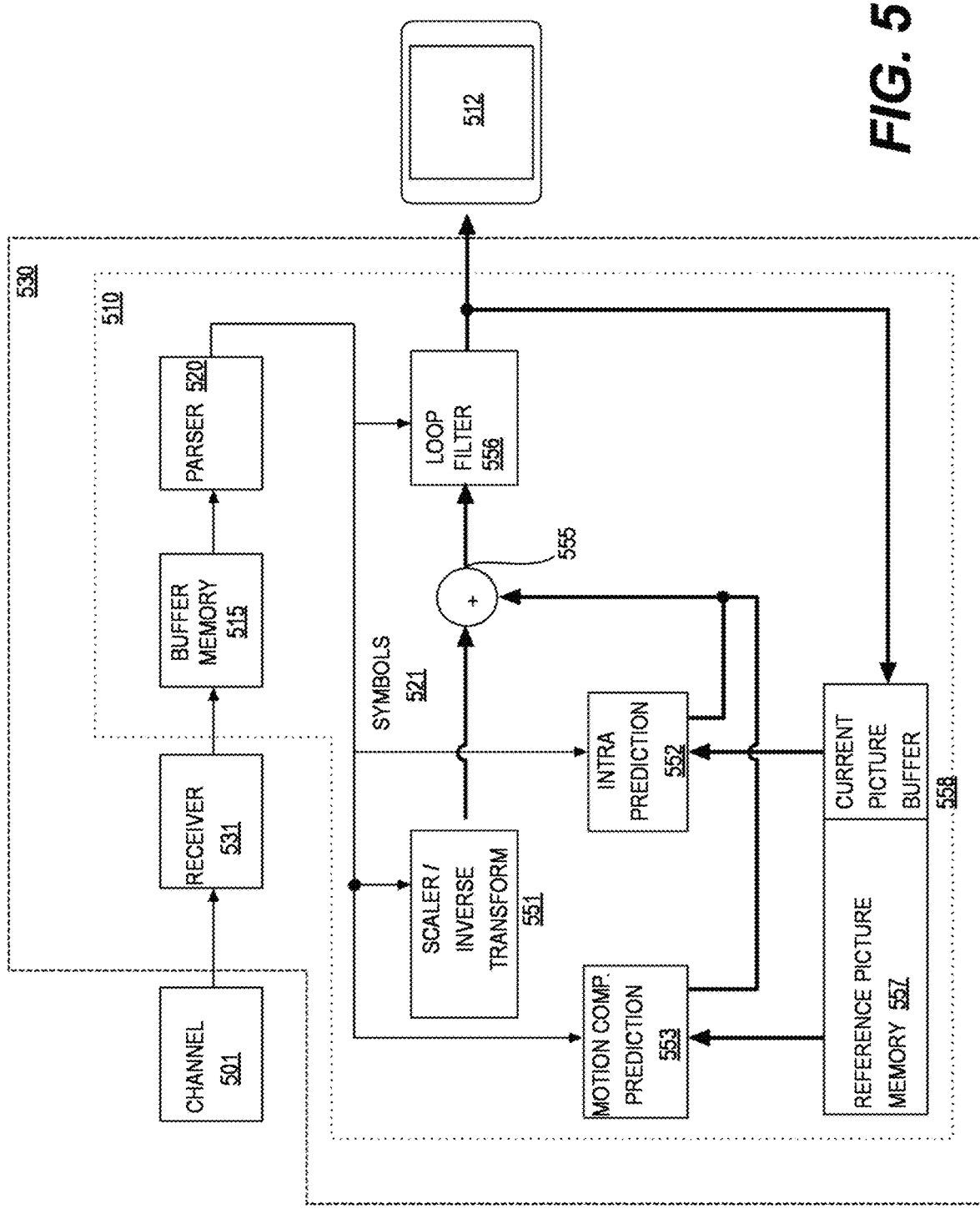
FIG. 5 shows a schematic illustration of a simplified block diagram of a video decoder in accordance with an example embodiment.

FIG. 5 shows a block diagram of a video decoder (510) according to any embodiment of the present disclosure below. The video decoder (510) can be included in an electronic device (530). The electronic device (530) can include a receiver (531) (e.g., receiving circuitry). The video decoder (510) can be used in place of the video decoder (410) in the example of FIG. 4.

The receiver (531) may receive one or more coded video sequences to be decoded by the video decoder (510). In the same or another embodiment, one coded video sequence may be decoded at a time, where the decoding of each coded video sequence is independent from other coded video sequences. Each video sequence may be associated with multiple video frames or images. The coded video sequence may be received from a channel (501), which may be a hardware/software link to a storage device which stores the encoded video data or a streaming source which transmits the encoded video data. The receiver (531) may receive the encoded video data with other data such as coded audio data and/or ancillary data streams, that may be forwarded to their respective processing circuitry (not depicted). The receiver (531) may separate the coded video sequence from the other data. To combat network jitter, a buffer memory (515) may be disposed in between the receiver (531) and an entropy decoder/parser (520) ("parser (520)" henceforth). In certain applications, the buffer memory (515) may be implemented as part of the video decoder (510). In other applications, it can be outside of and separate from the video decoder (510) (not depicted). In still other applications, there can be a buffer memory (not depicted) outside of the video decoder (510) for the purpose of, for example, combating network jitter, and there may be another additional buffer memory (515) inside the video decoder (510), for example to handle playback timing. When the receiver (531) is receiving data from a store/forward device of sufficient bandwidth and controllability, or from an isosynchronous network, the buffer memory (515) may not be needed, or can be small. For use on best-effort packet networks such as the Internet, the buffer memory (515) of sufficient size may be required, and its size can be comparatively large. Such buffer memory may be implemented with an adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as display (512) (e.g., a display screen) that may or may not an integral part of the electronic device (530) but can be coupled to the electronic device (530), as is shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received by the parser (520). The entropy coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the subgroups. The subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients (e.g., Fourier transform coefficients), quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different processing or functional units depending on the type of the coded video picture or parts thereof (such as: inter and intra picture, inter and intra block), and other factors. The units that are involved and how they are involved may be controlled by the subgroup control information that was parsed from the coded video sequence by the parser (520). The flow of such subgroup control information between the parser (520) and the multiple processing or functional units below is not depicted for simplicity.

Beyond the functional blocks already mentioned, the video decoder (510) can be conceptually subdivided into a number of functional units as described below. In a practical implementation operating under commercial constraints, many of these functional units interact closely with each other and can, at least partly, be integrated with one another. However, for the purpose of describing the various functions of the disclosed subject matter with clarity, the conceptual subdivision into the functional units is adopted in the disclosure below.

A first unit may include the scaler/inverse transform unit (551). The scaler/inverse transform unit (551) may receive a quantized transform coefficient as well as control information, including information indicating which type of inverse transform to use, block size, quantization factor/parameters, quantization scaling matrices, and the lie as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block, i.e., a block that does not use predictive information from previously reconstructed pictures, but can use predictive information from previously reconstructed parts of the current picture. Such predictive information can be provided by an intra picture prediction unit (552). In some cases, the intra picture prediction unit (552) may generate a block of the same size and shape of the block under reconstruction using surrounding block information that is already reconstructed and stored in the current picture buffer (558). The current picture buffer (558) buffers, for example, partly reconstructed current picture and/or fully reconstructed current picture. The aggregator (555), in some implementations, may add, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for inter-picture prediction. After motion compensating the fetched samples in accordance with the symbols (521) pertaining to the block, these samples can be added by the aggregator (555) to the output of the scaler/inverse transform unit (551) (output of unit 551 may be referred to as the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y components (shift), and reference picture components (time). Motion compensation may also include interpolation of sample values as fetched from the reference picture memory (557) when sub-sample exact motion vectors are in use, and may also be associated with motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values. Several type of loop filters may be included as part of the loop filter unit (556) in various orders, as will be described in further detail below.

The output of the loop filter unit (556) can be a sample stream that can be output to the rendering device (512) as well as stored in the reference picture memory (557) for use in future inter-picture prediction.

Certain coded pictures, once fully reconstructed, can be used as reference pictures for future inter-picture prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology adopted in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools from all the tools available in the video compression technology or standard as the only tools available for use under that profile. To be standard-compliant, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In some example embodiments, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
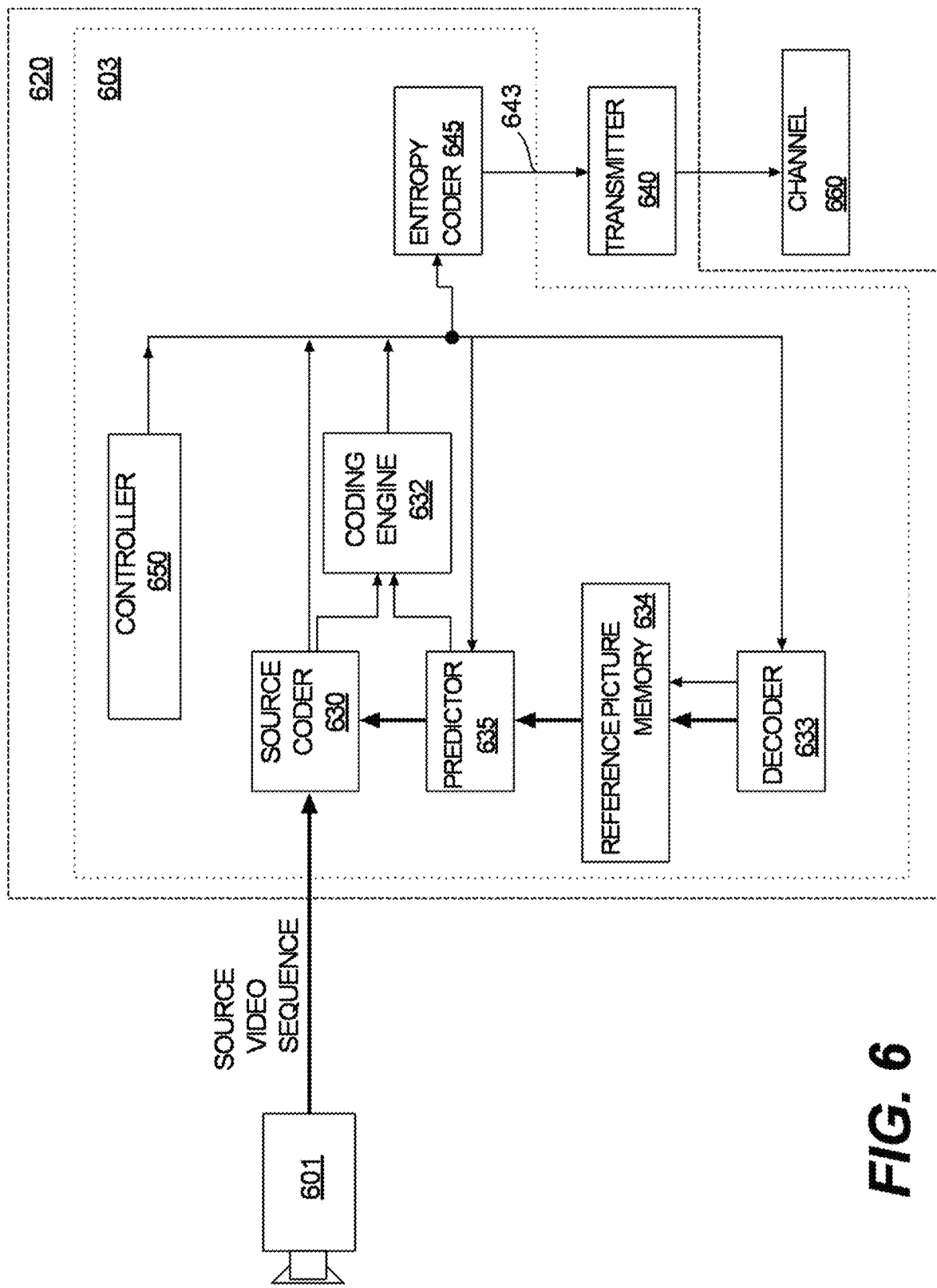
FIG. 6 shows a schematic illustration of a simplified block diagram of a video encoder in accordance with an example embodiment.

FIG. 6 shows a block diagram of a video encoder (603) according to an example embodiment of the present disclosure. The video encoder (603) may be included in an electronic device (620). The electronic device (620) may further include a transmitter (640) (e.g., transmitting circuitry). The video encoder (603) can be used in place of the video encoder (403) in the example of FIG. 4.

The video encoder (603) may receive video samples from a video source (601) (that is not part of the electronic device (620) in the example of FIG. 6) that may capture video image(s) to be coded by the video encoder (603). In another example, the video source (601) may be implemented as a portion of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 YCrCb, RGB, XYZ . . . ), and any suitable sampling structure (for example YCrCb 4:2:0, YCrCb 4:4:4). In a media serving system, the video source (601) may be a storage device capable of storing previously prepared video. In a videoconferencing system, the video source (601) may be a camera that captures local image information as a video sequence. Video data may be provided as a plurality of individual pictures or images that impart motion when viewed in sequence. The pictures themselves may be organized as a spatial array of pixels, wherein each pixel can comprise one or more samples depending on the sampling structure, color space, and the like being in use. A person having ordinary skill in the art can readily understand the relationship between pixels and samples. The description below focuses on samples.

According to some example embodiments, the video encoder (603) may code and compress the pictures of the source video sequence into a coded video sequence (643) in real time or under any other time constraints as required by the application. Enforcing appropriate coding speed constitutes one function of a controller (650). In some embodiments, the controller (650) may be functionally coupled to and control other functional units as described below. The coupling is not depicted for simplicity. Parameters set by the controller (650) can include rate control related parameters (picture skip, quantizer, lambda value of rate-distortion optimization techniques, . . . ), picture size, group of pictures (GOP) layout, maximum motion vector search range, and the like. The controller (650) can be configured to have other suitable functions that pertain to the video encoder (603) optimized for a certain system design.

In some example embodiments, the video encoder (603) may be configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder would create even though the embedded decoder 633 process coded video steam by the source coder 630 without entropy coding (as any compression between symbols and coded video bitstream in entropy coding may be lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used to improve coding quality.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633) in the encoder.

An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (630) may perform motion compensated predictive coding, which codes an input picture predictively with reference to one or more previously coded picture from the video sequence that were designated as "reference pictures." In this manner, the coding engine (632) codes differences (or residue) in the color channels between pixel blocks of an input picture and pixel blocks of reference picture(s) that may be selected as prediction reference(s) to the input picture. The term "residue" and its adjective form "residual" may be used interchangeably.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end (remote) video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compression of the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640)

may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person having ordinary skill in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample coding blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures. The source pictures or the intermediate processed pictures may be subdivided into other types of blocks for other purposes. The division of coding blocks and the other types of blocks may or may not follow the same manner, as described in further detail below.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data may accordingly conform to a syntax specified by the video coding technology or standard being used.

In some example embodiments, the transmitter (640) may transmit additional data with the encoded video. The source coder (630) may include such data as part of the coded video sequence. The additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) utilizes spatial correlation in a given picture, and inter-picture prediction utilizes temporal or other correlation between the pictures. For example, a specific picture under encoding/decoding, which is referred to as a current picture, may be partitioned into blocks. A block in the current picture, when similar to a reference block in a previously coded and still buffered reference picture in the video, may be coded by a vector that is referred to as a motion vector. The motion vector points to the reference block in the reference picture, and can have a third dimension identifying the reference picture, in case multiple reference pictures are in use.

In some example embodiments, a bi-prediction technique can be used for inter-picture prediction. According to such bi-prediction technique, two reference pictures, such as a first reference picture and a second reference picture that both proceed the current picture in the video in decoding order (but may be in the past or future, respectively, in display order) are used. A block in the current picture can be coded by a first motion vector that points to a first reference block in the first reference picture, and a second motion vector that points to a second reference block in the second reference picture. The block can be jointly predicted by a combination of the first reference block and the second reference block.

Further, a merge mode technique may be used in the inter-picture prediction to improve coding efficiency.

According to some example embodiments of the disclosure, predictions, such as inter-picture predictions and intra-picture predictions are performed in the unit of blocks. For example, a picture in a sequence of video pictures is partitioned into coding tree units (CTU) for compression, the CTUs in a picture may have the same size, such as 64×64 pixels, 32×32 pixels, or 16×16 pixels. In general, a CTU may include three parallel coding tree blocks (CTBs): one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels. Each of the one or more of the 32×32 block may be further split into 4 CUs of 16×16 pixels. In some example embodiments, each CU may be analyzed during encoding to determine a prediction type for the CU among various prediction types such as an inter prediction type or an intra prediction type. The CU may be split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. The split of a CU into PU (or PBs of different color channels) may be performed in various spatial pattern. A luma or chroma PB, for example, may include a matrix of values (e.g., luma values) for samples, such as 8×8 pixels, 16×16 pixels, 8×16 pixels, 16×8 samples, and the like.

Figure 7:
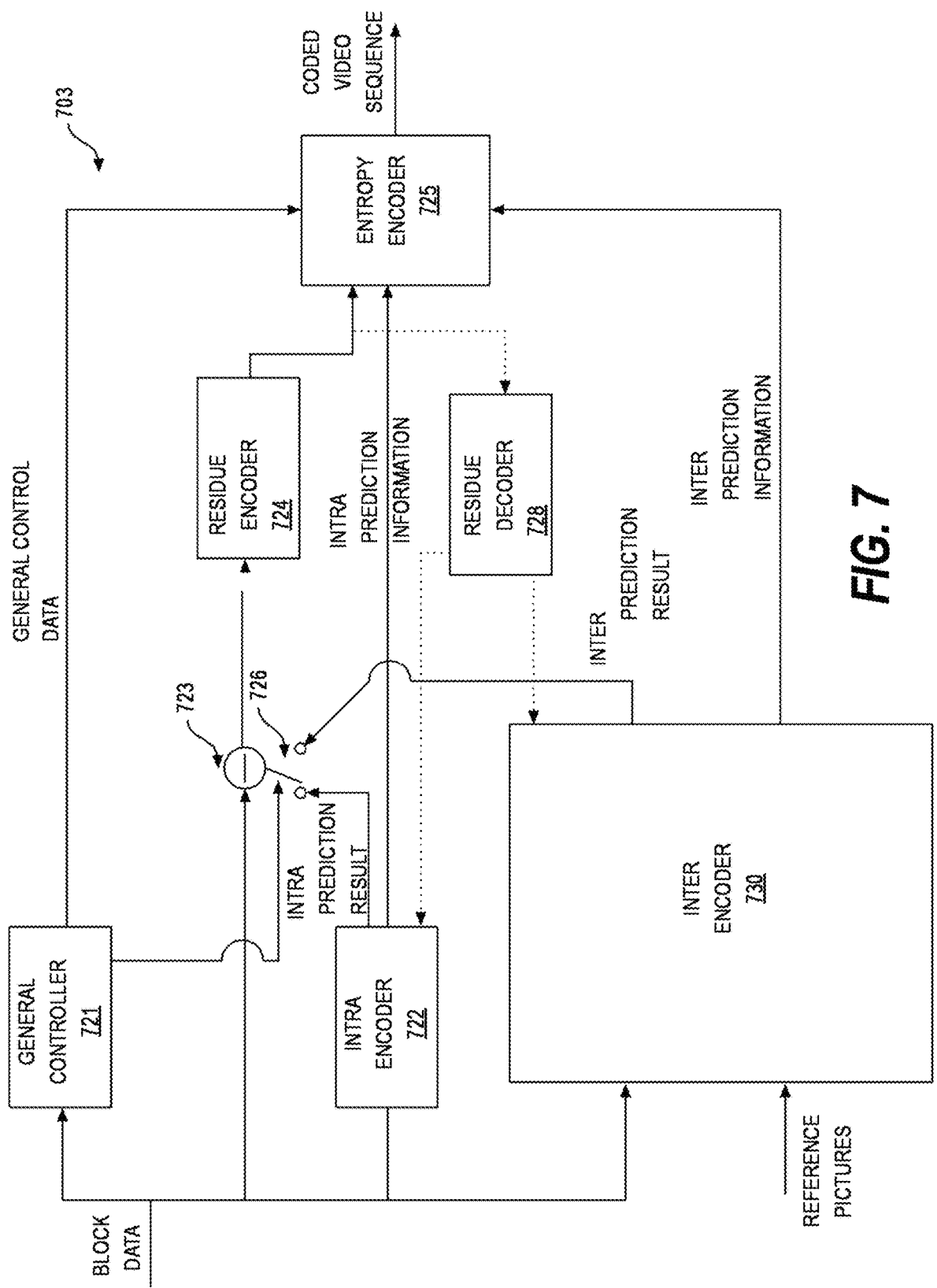
FIG. 7 shows a block diagram of a video encoder in accordance with another example embodiment.

FIG. 7 shows a diagram of a video encoder (703) according to another example embodiment of the disclosure. The video encoder (703) is configured to receive a processing block (e.g., a prediction block) of sample values within a current video picture in a sequence of video pictures, and encode the processing block into a coded picture that is part of a coded video sequence. The example video encoder (703) may be used in place of the video encoder (403) in the FIG. 4 example.

For example, the video encoder (703) receives a matrix of sample values for a processing block, such as a prediction block of 8×8 samples, and the like. The video encoder (703) then determines whether the processing block is best coded using intra mode, inter mode, or bi-prediction mode using, for example, rate-distortion optimization (RDO). When the processing block is determined to be coded in intra mode, the video encoder (703) may use an intra prediction technique to encode the processing block into the coded picture; and when the processing block is determined to be coded in inter mode or bi-prediction mode, the video encoder (703) may use an inter prediction or bi-prediction technique, respectively, to encode the processing block into the coded picture. In some example embodiments, a merge mode may be used as a submode of the inter picture prediction where the motion vector is derived from one or more motion vector predictors without the benefit of a coded motion vector component outside the predictors. In some other example embodiments, a motion vector component applicable to the subject block may be present. Accordingly, the video encoder (703) may include components not explicitly shown in FIG. 7, such as a mode decision module, to determine the perdition mode of the processing blocks.

In the example of FIG. 7, the video encoder (703) includes an inter encoder (730), an intra encoder (722), a residue calculator (723), a switch (726), a residue encoder (724), a general controller (721), and an entropy encoder (725) coupled together as shown in the example arrangement in FIG. 7.

The inter encoder (730) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information using the decoding unit 633 embedded in the example encoder 620 of FIG. 6 (shown as residual decoder 728 of FIG. 7, as described in further detail below).

The intra encoder (722) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques). The intra encoder (722) may calculates intra prediction results (e.g., predicted block) based on the intra prediction information and reference blocks in the same picture.

The general controller (721) may be configured to determine general control data and control other components of the video encoder (703) based on the general control data. In an example, the general controller (721) determines the prediction mode of the block, and provides a control signal to the switch (726) based on the prediction mode. For example, when the prediction mode is the intra mode, the general controller (721) controls the switch (726) to select the intra mode result for use by the residue calculator (723), and controls the entropy encoder (725) to select the intra prediction information and include the intra prediction information in the bitstream; and when the predication mode for the block is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) may be configured to calculate a difference (residue data) between the received block and prediction results for the block selected from the intra encoder (722) or the inter encoder (730). The residue encoder (724) may be configured to encode the residue data to generate transform coefficients. For example, the residue encoder (724) may be configured to convert the residue data from a spatial domain to a frequency domain to generate the transform coefficients. The transform coefficients are then subject to quantization processing to obtain quantized transform coefficients. In various example embodiments, the video encoder (703) also includes a residual decoder (728). The residual decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures.

The entropy encoder (725) may be configured to format the bitstream to include the encoded block and perform entropy coding. The entropy encoder (725) is configured to include in the bitstream various information. For example, the entropy encoder (725) may be configured to include the general control data, the selected prediction information (e.g., intra prediction information or inter prediction information), the residue information, and other suitable information in the bitstream. When coding a block in the merge submode of either inter mode or bi-prediction mode, there may be no residue information.

Figure 8:
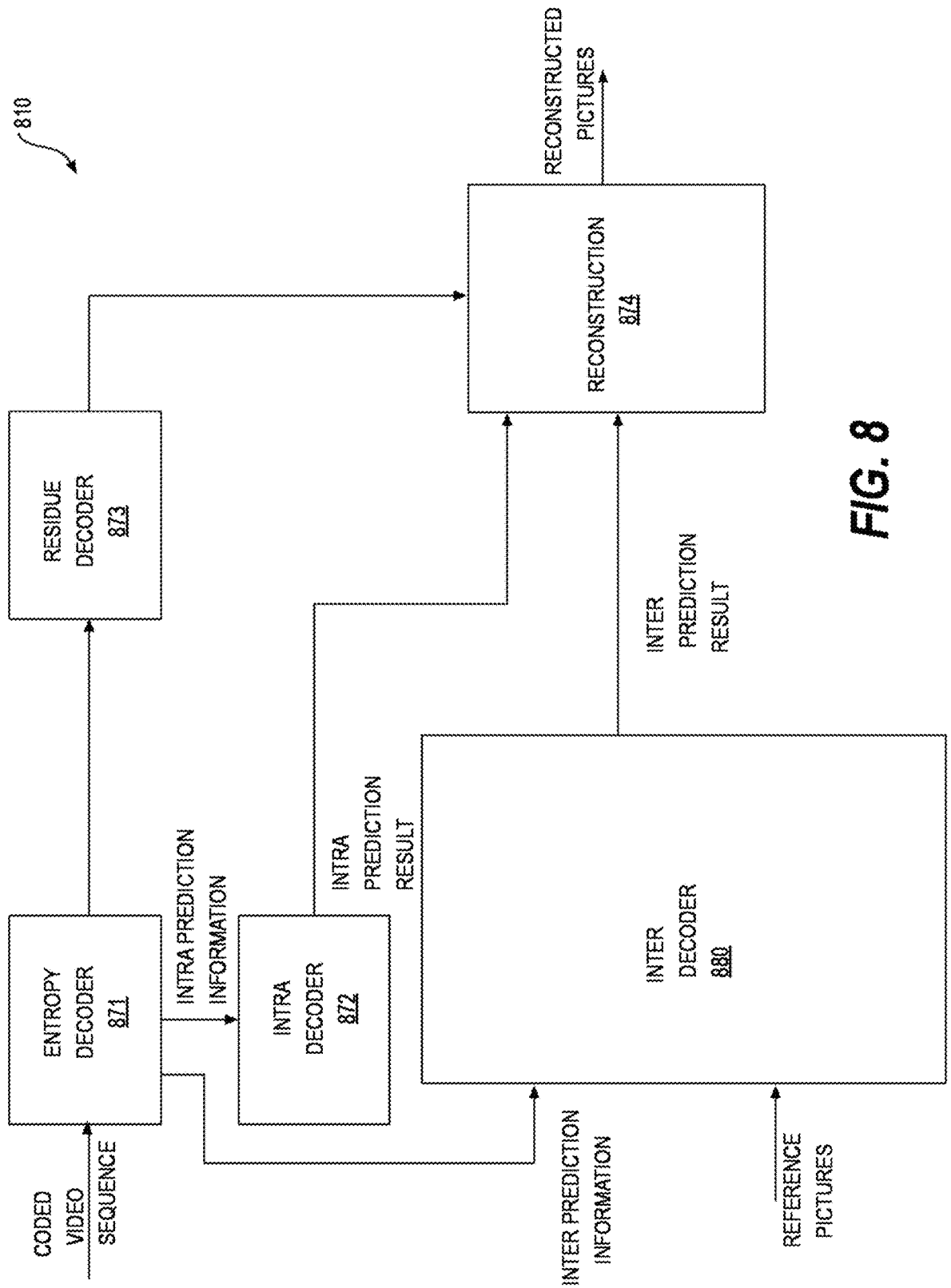
FIG. 8 shows a block diagram of a video decoder in accordance with another example embodiment.

FIG. 8 shows a diagram of an example video decoder (810) according to another embodiment of the disclosure. The video decoder (810) is configured to receive coded pictures that are part of a coded video sequence, and decode the coded pictures to generate reconstructed pictures. In an example, the video decoder (810) may be used in place of the video decoder (410) in the example of FIG. 4.

In the example of FIG. 8, the video decoder (810) includes an entropy decoder (871), an inter decoder (880), a residual decoder (873), a reconstruction module (874), and an intra decoder (872) coupled together as shown in the example arrangement of FIG. 8.

The entropy decoder (871) can be configured to reconstruct, from the coded picture, certain symbols that represent the syntax elements of which the coded picture is made up. Such symbols can include, for example, the mode in which a block is coded (e.g., intra mode, inter mode, bi-predicted mode, merge submode or another submode), prediction information (e.g., intra prediction information or inter prediction information) that can identify certain sample or metadata used for prediction by the intra decoder (872) or the inter decoder (880), residual information in the form of, for example, quantized transform coefficients, and the like. In an example, when the prediction mode is the inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residual decoder (873).

The inter decoder (880) may be configured to receive the inter prediction information, and generate inter prediction results based on the inter prediction information.

The intra decoder (872) may be configured to receive the intra prediction information, and generate prediction results based on the intra prediction information.

The residual decoder (873) may be configured to perform inverse quantization to extract de-quantized transform coefficients, and process the de-quantized transform coefficients to convert the residual from the frequency domain to the spatial domain. The residual decoder (873) may also utilize certain control information (to include the Quantizer Parameter (QP)) which may be provided by the entropy decoder (871) (data path not depicted as this may be low data volume control information only).

The reconstruction module (874) may be configured to combine, in the spatial domain, the residual as output by the residual decoder (873) and the prediction results (as output by the inter or intra prediction modules as the case may be) to form a reconstructed block forming part of the reconstructed picture as part of the reconstructed video. It is noted that other suitable operations, such as a deblocking operation and the like, may also be performed to improve the visual quality.

It is noted that the video encoders (403), (603), and (703), and the video decoders (410), (510), and (810) can be implemented using any suitable technique. In some example embodiments, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT).

The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

Figure 9:
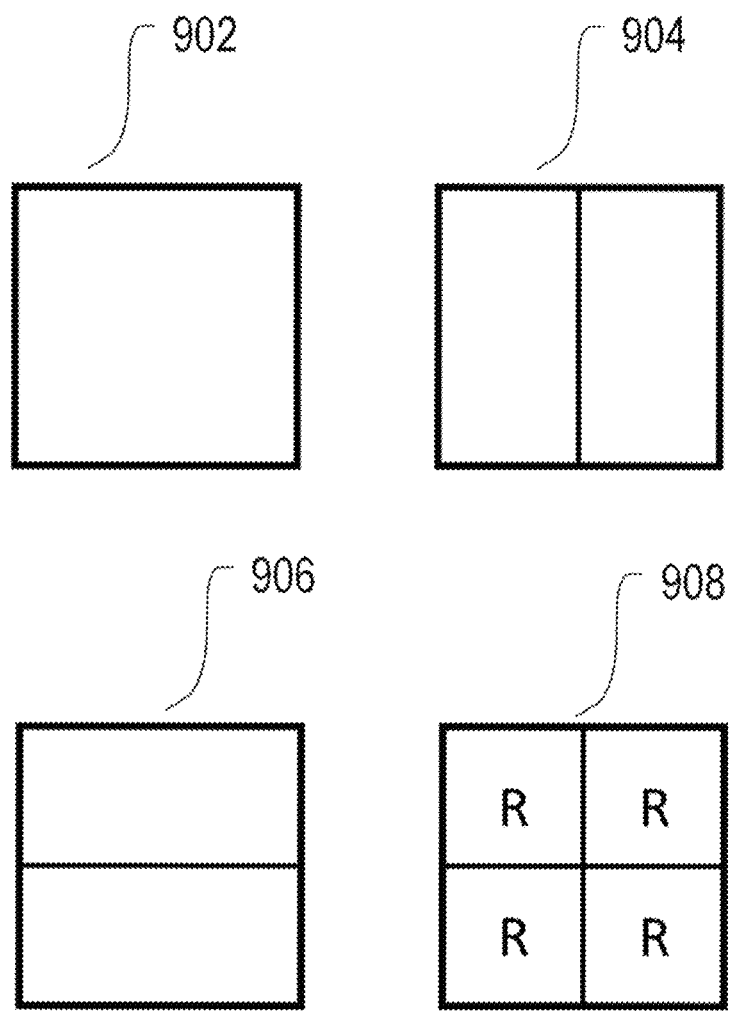
FIG. 9 shows a scheme of coding block partitioning according to example embodiments of the disclosure.

In some example implementations, a predetermined partitioning pattern may be applied to a base block. As shown in FIG. 9, an example 4-way partition tree may start from a first predefined level (e.g., 64×64 block level or other sizes, as a base block size) and a base block may be partitioned hierarchically down to a predefined lowest level (e.g., 4×4 level). For example, a base block may be subject to four predefined partitioning options or patterns indicated by 902, 904, 906, and 908, with the partitions designated as R being allowed for recursive partitioning in that the same partition options as indicated in FIG. 9 may be repeated at a lower scale until the lowest level (e.g., 4×4 level). In some implementations, additional restrictions may be applied to the partitioning scheme of FIG. 9. In the implementation of FIG. 9, rectangular partitions (e.g., 1:2/2:1 rectangular partitions) may be allowed but they may not be allowed to be recursive, whereas square partitions are allowed to be recursive. The partitioning following FIG. 9 with recursion, if needed, generates a final set of coding blocks. A coding tree depth may be further defined to indicate the splitting depth from the root node or root block. For example, the coding tree depth for the root node or root block, e.g. a 64×64 block, may be set to 0, and after the root block is further split once following FIG. 9, the coding tree depth is increased by 1. The maximum or deepest level from 64×64 base block to a minimum partition of 4×4 would be 4 (starting from level 0) for the scheme above. Such partitioning scheme may apply to one or more of the color channels. Each color channel may be partitioned independently following the scheme of FIG. 9 (e.g., partitioning pattern or option among the predefined patterns may be independently determined for each of the color channels at each hierarchical level). Alternatively, two or more of the color channels may share the same hierarchical pattern tree of FIG. 9 (e.g., the same partitioning pattern or option among the predefined patterns may be chosen for the two or more color channels at each hierarchical level).

Figure 10:
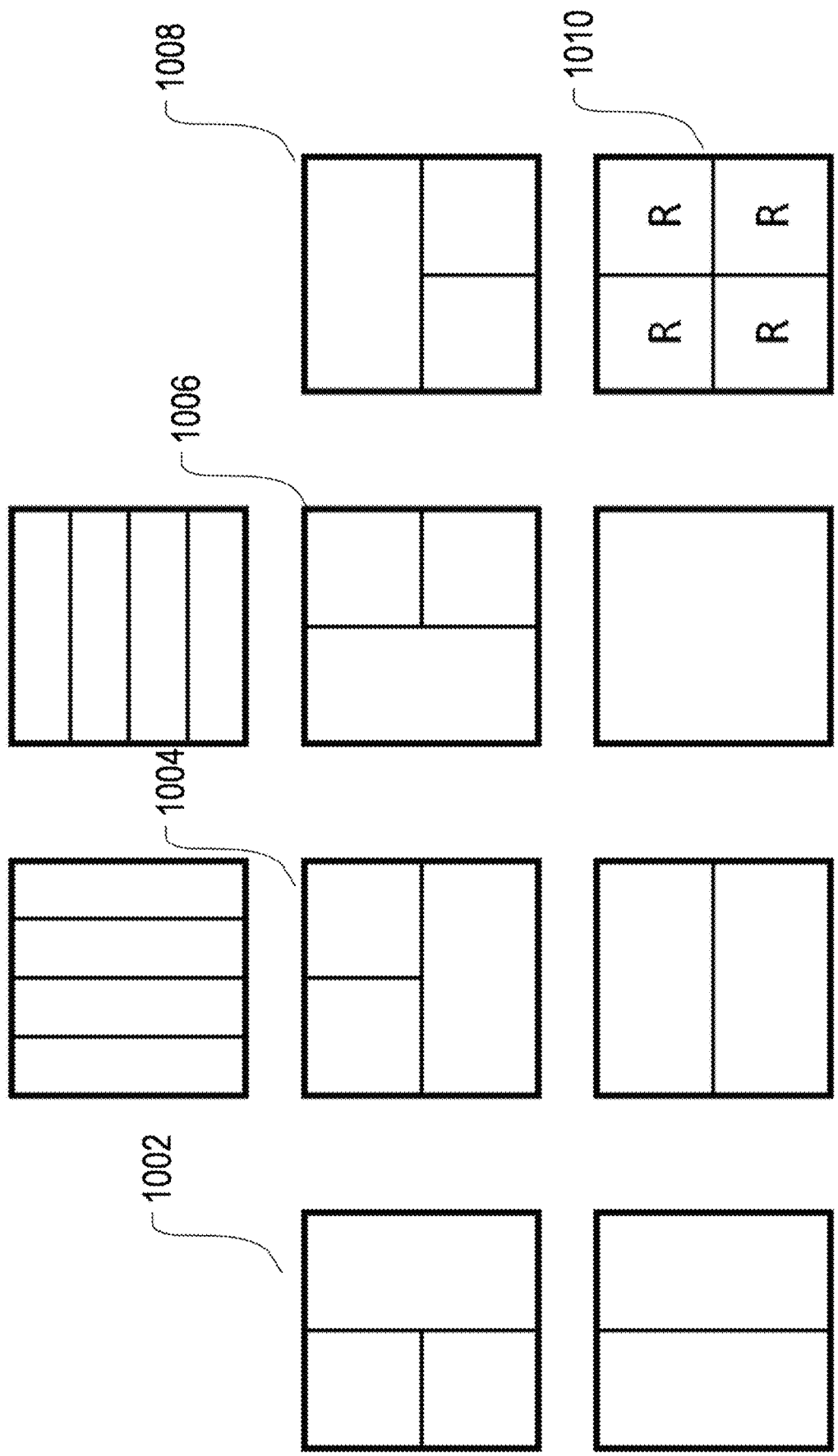
FIG. 10 shows another scheme of coding block partitioning according to example embodiments of the disclosure.

FIG. 10 shows another example predefined partitioning pattern allowing recursive partitioning to form a partitioning tree. As shown in FIG. 10, an example 10-way partitioning structure or pattern may be predefined. The root block may start at a predefined level (e.g. from a base block at 128×128 level, or 64×64 level). The example partitioning structure of FIG. 10 includes various 2:1/1:2 and 4:1/1:4 rectangular partitions. The partition types with 3 subpartitions indicated 1002, 1004, 1006, and 1008 in the second row of FIG. 10 may be referred to "T-type" partitions. The "T-Type" partitions 1002, 1004, 1006, and 1008 may be referred to as Left T-Type, Top T-Type, Right T-Type and Bottom T-Type. In some example implementations, none of the rectangular partitions of FIG. 10 is allowed to be further subdivided. A coding tree depth may be further defined to indicate the splitting depth from the root node or root block. For example, the coding tree depth for the root node or root block, e.g., a 128×128 block, may be set to 0, and after the root block is further split once following FIG. 10, the coding tree depth is increased by 1. In some implementations, only the all-square partitions in 1010 may be allowed for recursive partitioning into the next level of the partitioning tree following pattern of FIG. 10. In other words, recursive partitioning may not be allowed for the square partitions within the T-type patterns 1002, 1004, 1006, and 1008. The partitioning procedure following FIG. 10 with recursion, if needed, generates a final set of coding blocks. Such scheme may apply to one or more of the color channels. In some implementations, more flexibility may be added to the use of partitions below 8×8 level. For example, 2×2 chroma inter prediction may be used in certain cases.

In some other example implementations for coding block partitioning, a quadtree structure may be used for splitting a base block or an intermediate block into quadtree partitions. Such quadtree splitting may be applied hierarchically and recursively to any square shaped partitions. Whether a base block or an intermediate block or partition is further quadtree split may be adapted to various local characteristics of the base block or intermediate block/partition. Quadtree partitioning at picture boundaries may be further adapted. For example, implicit quadtree split may be performed at picture boundary so that a block will keep quadtree splitting until the size fits the picture boundary.

In some other example implementations, a hierarchical binary partitioning from a base block may be used. For such a scheme, the base block or an intermediate level block may be partitioned into two partitions. A binary partitioning may be either horizontal or vertical. For example, a horizontal binary partitioning may split a base block or intermediate block into equal right and left partitions. Likewise, a vertical binary partitioning may split a base block or intermediate block into equal upper and lower partitions. Such binary partitioning may be hierarchical and recursive. Decision may be made at each of the base block or intermediate block whether the binary partitioning scheme should continue, and if the scheme does continue further, whether a horizontal or vertical binary partitioning should be used. In some implementations, further partitioning may stop at a predefined lowest partition size (in either one or both dimensions). Alternatively, further partitioning may stop once a predefined partitioning level or depth from the base block is reached. In some implementations, the aspect ratio of a partition may be restricted. For example, the aspect ratio of a partition may not be smaller than 1:4 (or larger than 4:1). As such, a vertical strip partition with vertical to horizontal aspect ratio of 4:1, may only be further binary partitioned vertically into an upper and lower partitions each having a vertical to horizontal aspect ratio of 2:1.

Figure 13:
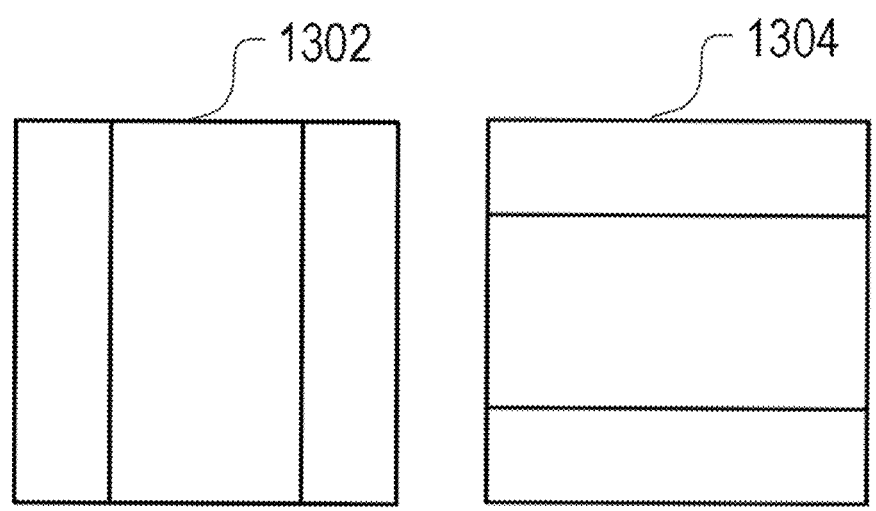
FIG. 13 shows an example ternary partitioning scheme.

In yet some other examples, a ternary partitioning scheme may be used for partitioning a base block or any intermediate block, as shown in FIG. 13. The ternary pattern may be implemented vertical, as shown in 1302 of FIG. 13, or horizontal, as shown in 1304 of FIG. 13. While the example split ratio in FIG. 13, either vertically or horizontally, is shown as 1:2:1, other ratios may be predefined. In some implementations, two or more different ratios may be predefined. Such ternary partitioning scheme may be used to complement the quadtree or binary partitioning structures in that such triple-tree partitioning is capable of capturing objects located in block center in one contiguous partition while quadtree and binary-tree are always splitting along block center and thus would split the object into separate partitions. In some implementations, the width and height of the partitions of the example triple trees are always power of 2 to avoid additional transforms.

Figure 14:
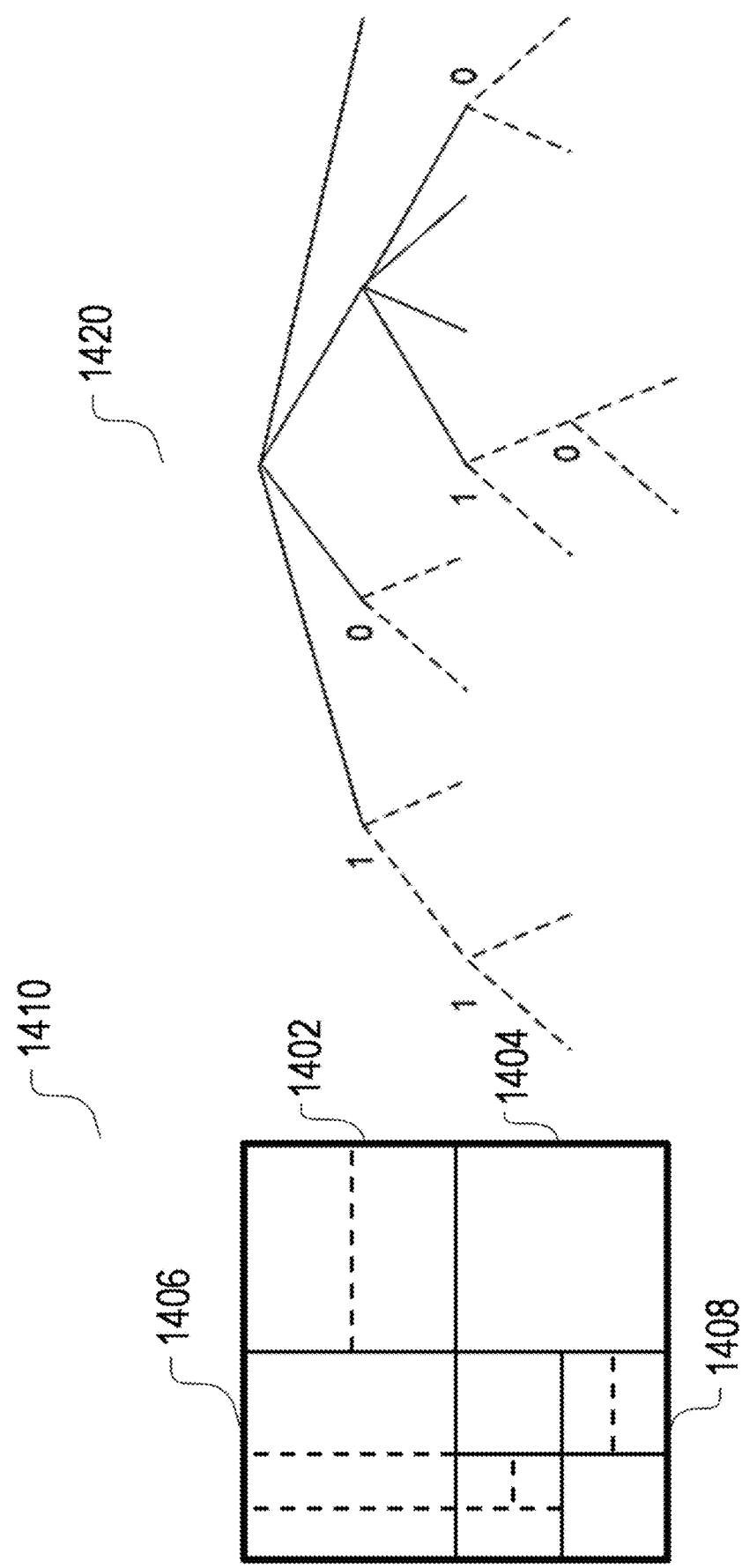
FIG. 14 shows an example quadtree binary tree coding block partitioning scheme.

The above partitioning schemes may be combined in any manner at different partitioning levels. As one example, the quadtree and the binary partitioning schemes described above may be combined to partition a base block into a quadtree-binary-tree (QTBT) structure. In such a scheme, a base block or an intermediate block/partition may be either quadtree split or binary split, subject to a set of predefined conditions, if specified. A particular example is illustrated in FIG. 14. In the example of FIG. 14, a base block is first quadtree split into four partitions, as shown by 1402, 1404, 1406, and 1408. Thereafter, each of the resulting partitions is either quadtree partitioned into four further partitions (such as 1408), or binarily split into two further partitions (either horizontally or vertically, such as 1402 or 1406, both being symmetric, for example) at the next level, or non-split (such as 1404). Binary or quadtree splitting may be allowed recursively for square shaped partitions, as shown by the overall example partition pattern of 1410 and the corresponding tree structure/representation in 1420, in which the solid lines represent quadtree splitting, and the dashed lines represent binary splitting. Flags may be used for each binary splitting node (non-leaf binary partitions) to indicate whether the binary splitting is horizontal or vertical. For example, as shown in 1420, consistent with the partitioning structure of 1410, flag "0" may represent horizontal binary splitting, and flag "1" may represent vertical binary splitting. For the quadtree-split partition, there is no need to indicate the splitting type since quadtree splitting always splits a block or a partition both horizontally and vertically to produce 4 sub-blocks/partitions with an equal size. In some implementations, flag "1" may represent horizontal binary splitting, and flag "0" may represent vertical binary splitting.

In some example implementations of the QTBT, the quadtree and binary splitting ruleset may be represented by the following predefined parameters and the corresponding functions associated therewith:
  CTU size: the root node size of a quadtree (size of a base block)
  MinQTSize: the minimum allowed quadtree leaf node size
  MaxBTSize: the maximum allowed binary tree root node size
  MaxBTDepth: the maximum allowed binary tree depth
  MinBTSize: the minimum allowed binary tree leaf node size In some example implementations of the QTBT partitioning structure, the CTU size may be set as 128×128 luma samples with two corresponding 64×64 blocks of chroma samples (when an example chroma sub-sampling is considered and used), the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from its minimum allowed size of 16×16 (i.e., the MinQTSize) to 128×128 (i.e., the CTU size). If a node is 128×128, it will not be first split by the binary tree since the size exceeds the MaxBTSize (i.e., 64×64). Otherwise, nodes which do not exceed MaxBTSize could be partitioned by the binary tree. In the example of FIG. 14, the base block is 128×128. The basic block can only be quadtree split, according to the predefined ruleset. The base block has a partitioning depth of 0. Each of the resulting four partitions are 64×64, not exceeding MaxBTSize, may be further quadtree or binary-tree split at level 1. The process continues. When the binary tree depth reaches MaxBTDepth (i.e., 4), no further splitting may be considered. When the binary tree node has width equal to MinBTSize (i.e., 4), no further horizontal splitting may be considered. Similarly, when the binary tree node has height equal to MinBTSize, no further vertical splitting is considered.

In some example implementations, the QTBT scheme above may be configured to support a flexibility for the luma and chroma to have the same QTBT structure or separate QTBT structures. For example, for P and B slices, the luma and chroma CTBs in one CTU may share the same QTBT structure. However, for I slices, the luma CTBs maybe partitioned into CBs by a QTBT structure, and the chroma CTBs may be partitioned into chroma CBs by another QTBT structure. This means that a CU may be used to refer to different color channels in an I slice, e.g., the I slice may consist of a coding block of the luma component or coding blocks of two chroma components, and a CU in a P or B slice may consist of coding blocks of all three colour components.

In some other implementations, the QTBT scheme may be supplemented with ternary scheme described above. Such implementations may be referred to as multi-type-tree (MTT) structure. For example, in addition to binary splitting of a node, one of the ternary partition patterns of FIG. 13 may be chosen. In some implementations, only square nodes may be subject to ternary splitting. An additional flag may be used to indicate whether a ternary partitioning is horizontal or vertical.

The design of two-level or multi-level tree such as the QTBT implementations and QTBT implementations supplemented by ternary splitting may be mainly motivated by complexity reduction. Theoretically, the complexity of traversing a tree is $T^D$, where T denotes the number of split types, and D is the depth of tree. A tradeoff may be made by using multiple types (T) while reducing the depth (D).

In some implementations, a CB may be further partitioned. For example, a CB may be further partitioned into multiple prediction blocks (PBs) for purposes of intra or inter-frame prediction during coding and decoding processes. In other words, a CB may be further divided into different subpartitions, where individual prediction decision/configuration may be made. In parallel, a CB may be further partitioned into a plurality of transform blocks (TBs) for purposes of delineating levels at which transform or inverse transform of video data is performed. The partitioning scheme of a CB into PBs and TBs may or may not be the same. For example, each partitioning scheme may be performed using its own procedure based on, for example, the various characteristics of the video data. The PB and TB partitioning schemes may be independent in some example implementations. The PB and TB partitioning schemes and boundaries may be correlated in some other example implementations. I some implementations, for example, TBs may be partitioned after PB partitions, and in particular, each PB, after being determined following partitioning of a coding block, may then be further partitioned into one or more TBs. For example, in some implementations, a PB may be split into one, two, four, or other number of TBs.

In some implementations, for partitioning of a base block into coding blocks and further into prediction blocks and/or transform blocks, the luma channel and the chroma channels may be treated differently. For example, in some implementations, partitioning of a coding block into prediction blocks and/or transform blocks may be allowed for the luma channel, whereas such partitioning of a coding block into prediction blocks and/or transform blocks may not be allowed for the chroma channel(s). In such implementations, transform and/or prediction of luma blocks thus may be performed only at the coding block level. For another example, minimum transform block size for luma channel and chroma channel(s) may be different, e.g., coding blocks for luma channel may be allowed to be partitioned into smaller transform and/or prediction blocks than the chroma channels. For yet another example, the maximum depth of partitioning of a coding block into transform blocks and/or prediction blocks may be different between the luma channel and the chroma channels, e.g., coding blocks for luma channel may be allowed to be partitioned into deeper transform and/or prediction blocks than the chroma channel(s). For a specific example, luma coding blocks may be partitioned into transform blocks of multiple sizes that can be represented by a recursive partition going down by up to 2 levels, and transform block shapes such as square, 2:1/1:2, and 4:1/1:4 and transform block size from 4×4 to 64×64 may be allowed. For chroma blocks, however, only the largest possible transform blocks specified for the luma blocks may be allowed.

In some example implementations for partitioning of a coding block into PBs, the depth, the shape, and/or other characteristics of the PB partitioning may depend on whether the PB is intra or inter coded.

The partitioning of a coding block (or a prediction block) into transform blocks may be implemented in various example schemes, including but not limited to quadtree splitting and predefined pattern splitting, recursively or non-recursively, and with additional consideration for transform blocks at the boundary of the coding block or prediction block. In general, the resulting transform blocks may be at different split levels, may not be of the same size, and may not need to be square in shape (e.g., they can be rectangular with some allowed sizes and aspect ratios). Further examples are descried in further detail below in relation to FIGS. 15, 16 and 17.

In some other implementations, however, the CBs obtained via any of the partitioning schemes above may be used as a basic or smallest coding block for prediction and/or transform. In other words, no further splitting is performed for perform inter-prediction/intra-prediction purposes and/or for transform purposes. For example, CBs obtained from the QTBT scheme above may be directly used as the units for performing predictions. Specifically, such a QTBT structure removes the concepts of multiple partition types, i.e. it removes the separation of the CU, PU and TU, and supports more flexibility for CU/CB partition shapes as described above. In such QTBT block structure, a CU/CB can have either a square or rectangular shape. The leaf nodes of such QTBT are used as units for prediction and transform processing without any further partitioning. This means that the CU, PU and TU have the same block size in such example QTBT coding block structure.

The various CB partitioning schemes above and the further partitioning of CBs into PBs and/or TBs (including no PB/TB partitioning) may be combined in any manner. The following particular implementations are provided as non-limiting examples.

A specific example implementation of coding block and transform block partitioning is described below. In such an example implementation, a base block may be split into coding blocks using recursive quadtree splitting, or a predefined splitting pattern described above (such as those in FIG. 9 and FIG. 10). At each level, whether further quadtree splitting of a particular partition should continue may be determined by local video data characteristics. The resulting CBs may be at various quadtree splitting levels, and of various sizes. The decision on whether to code a picture area using inter-picture (temporal) or intra-picture (spatial) prediction may be made at the CB level (or CU level, for all three-color channels). Each CB may be further split into one, two, four, or other number of PBs according to predefined PB splitting type. Inside one PB, the same prediction process may be applied and the relevant information may be transmitted to the decoder on a PB basis. After obtaining the residual block by applying the prediction process based on the PB splitting type, a CB can be partitioned into TBs according to another quadtree structure similar to the coding tree for the CB. In this particular implementation, a CB or a TB may but does not have to be limited to square shape. Further in this particular example, a PB may be square or rectangular shape for an inter-prediction and may only be square for intra-prediction. A coding block may be split into, e.g., four square-shaped TBs. Each TB may be further split recursively (using quadtree split) into smaller TBs, referred to as Residual Quadtree (RQT).

Figure 11:
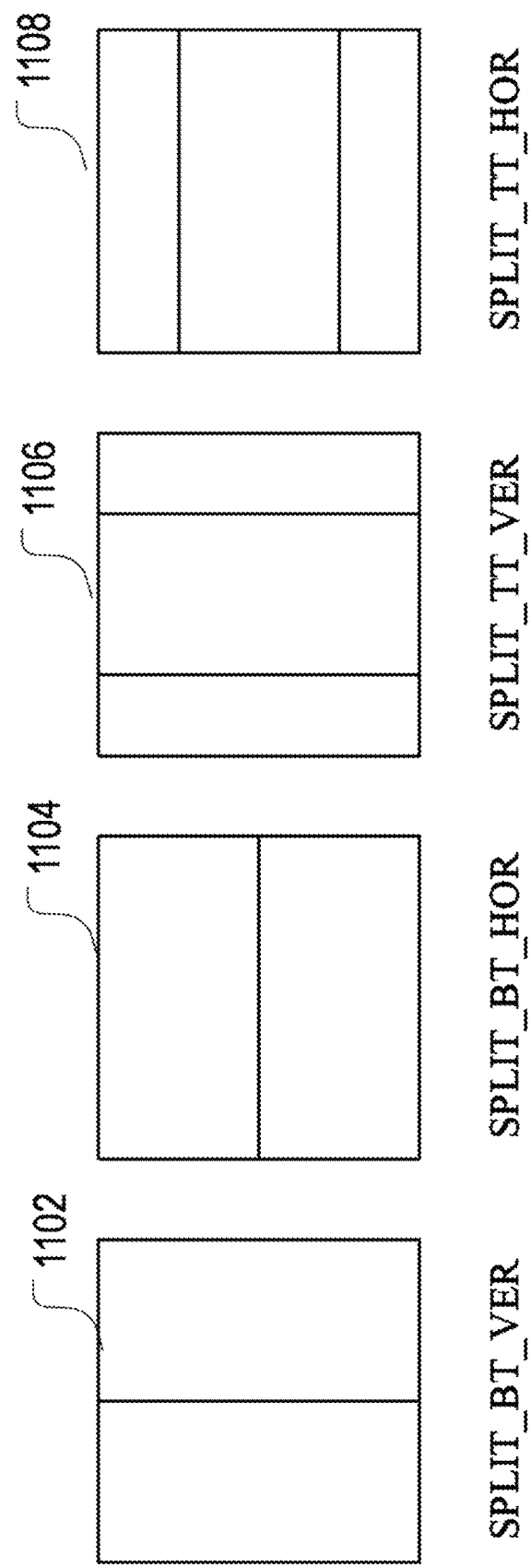
FIG. 11 shows another scheme of coding block partitioning according to example embodiments of the disclosure.

Another example implementation for partitioning of a base block into CBs, PBs and or TBs is further described below. For example, rather than using a multiple partition unit types such as those shown in FIG. 9 or FIG. 10, a quadtree with nested multi-type tree using binary and ternary splits segmentation structure (e.g., the QTBT or QTBT with ternary splitting as descried above) may be used. The separation of the CB, PB and TB (i.e., the partitioning of CB into PBs and/or TBs, and the partitioning of PBs into TBs) may be abandoned except when needed for CBs that have a size too large for the maximum transform length, where such CBs may need further splitting. This example partitioning scheme may be designed to support more flexibility for CB partition shapes so that the prediction and transform can both be performed on the CB level without further partitioning. In such a coding tree structure, a CB may have either a square or rectangular shape. Specifically, a coding tree block (CTB) may be first partitioned by a quadtree structure. Then the quadtree leaf nodes may be further partitioned by a nested multi-type tree structure. An example of the nested multi-type tree structure using binary or ternary splitting is shown in FIG. 11. Specifically, the example multi-type tree structure of FIG. 11 includes four splitting types, referred to as vertical binary splitting (SPLIT_BT_VER) (1102), horizontal binary splitting (SPLIT_BT_HOR) (1104), vertical ternary splitting (SPLIT_TT_VER) (1106), and horizontal ternary splitting (SPLIT_TT_HOR) (1108). The CBs then correspond to leaves of the multi-type tree. In this example implementation, unless the CB is too large for the maximum transform length, this segmentation is used for both prediction and transform processing without any further partitioning. This means that, in most cases, the CB, PB and TB have the same block size in the quadtree with nested multi-type tree coding block structure. The exception occurs when maximum supported transform length is smaller than the width or height of the colour component of the CB. In some implementations, in addition to the binary or ternary splitting, the nested patterns of FIG. 11 may further include quadtree splitting.

Figure 12:
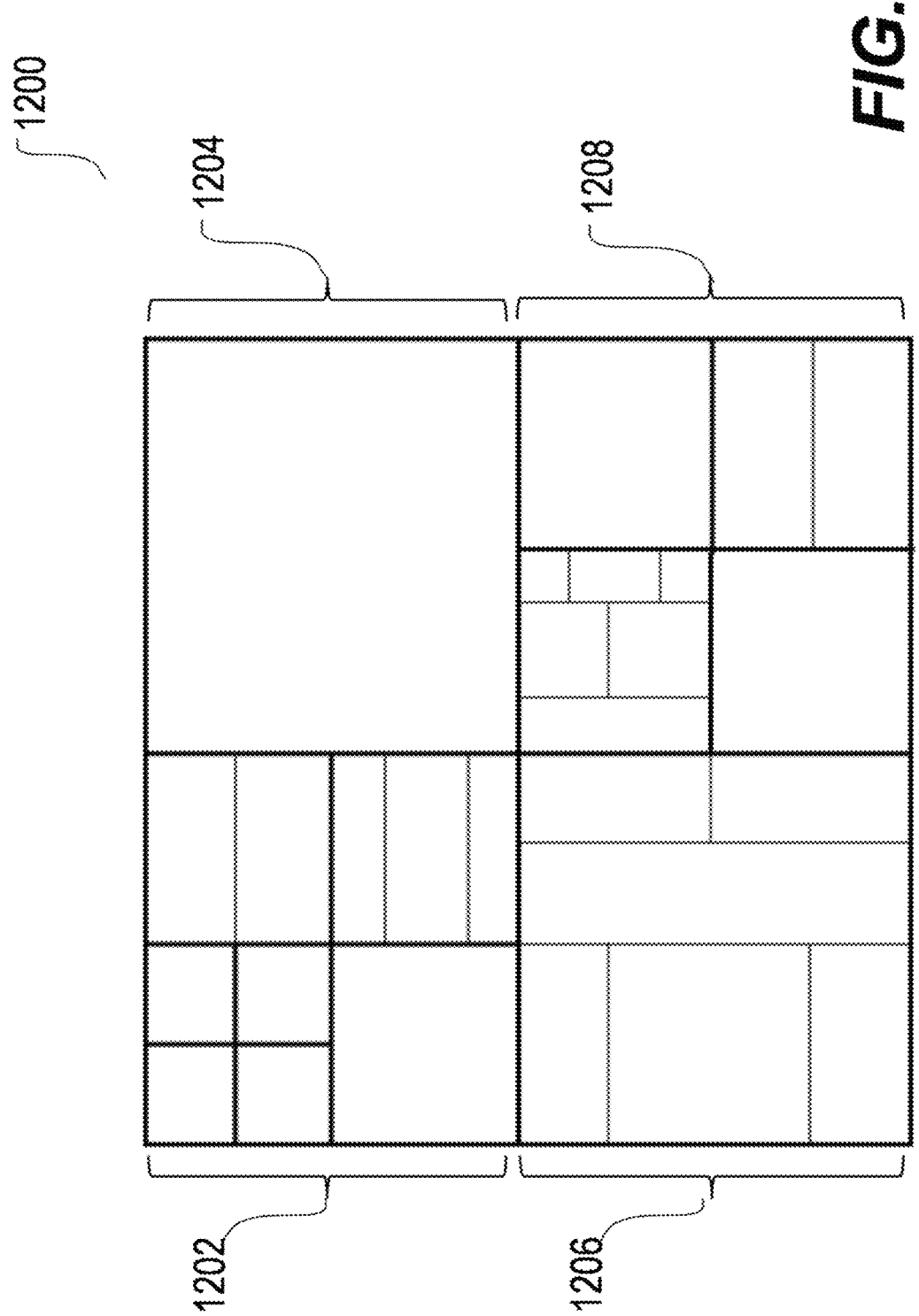
FIG. 12 shows an example partitioning of a base block into coding blocks according to an example partitioning scheme.

One specific example for the quadtree with nested multi-type tree coding block structure of block partition (including quadtree, binary, and ternary splitting options) for one base block is shown in FIG. 12. In more detail, FIG. 12 shows that the base block 1200 is quadtree split into four square partitions 1202, 1204, 1206, and 1208. Decision to further use the multi-type tree structure of FIG. 11 and quadtree for further splitting is made for each of the quadtree-split partitions. In the example of FIG. 12, partition 1204 is not further split. Partitions 1202 and 1208 each adopt another quadtree split. For partition 1202, the second level quadtree-split top-left, top-right, bottom-left, and bottom-right partitions adopts third level splitting of quadtree, horizontal binary splitting 1104 of FIG. 11, non-splitting, and horizontal ternary splitting 1108 of FIG. 11, respectively. Partition 1208 adopts another quadtree split, and the second level quadtree-split top-left, top-right, bottom-left, and bottom-right partitions adopts third level splitting of vertical ternary splitting 1106 of FIG. 11, non-splitting, non-splitting, and horizontal binary splitting 1104 of FIG. 11, respectively. Two of the subpartitions of the third-level top-left partition of 1208 are further split according to horizontal binary splitting 1104 and horizontal ternary splitting 1108 of FIG. 11, respectively. Partition 1206 adopts a second level split pattern following the vertical binary splitting 1102 of FIG. 11 into two partitions which are further split in a third-level according to horizontal ternary splitting 1108 and vertical binary splitting 1102 of the FIG. 11. A fourth level splitting is further applied to one of them according to horizontal binary splitting 1104 of FIG. 11.

For the specific example above, the maximum luma transform size may be 64×64 and the maximum supported chroma transform size could be different from the luma at, e.g., 32×32. Even though the example CBs above in FIG. 12 are generally not further split into smaller PBs and/or TBs, when the width or height of the luma coding block or chroma coding block is larger than the maximum transform width or height, the luma coding block or chroma coding block may be automatically split in the horizontal and/or vertical direction to meet the transform size restriction in that direction.

In the specific example for partitioning of a base block into CBs above, and as descried above, the coding tree scheme may support the ability for the luma and chroma to have a separate block tree structure. For example, for P and B slices, the luma and chroma CTBs in one CTU may share the same coding tree structure. For I slices, for example, the luma and chroma may have separate coding block tree structures. When separate block tree structures are applied, luma CTB may be partitioned into luma CBs by one coding tree structure, and the chroma CTBs are partitioned into chroma CBs by another coding tree structure. This means that a CU in an I slice may consist of a coding block of the luma component or coding blocks of two chroma components, and a CU in a P or B slice always consists of coding blocks of all three colour components unless the video is monochrome.

When a coding block is further partitioned into multiple transform blocks, the transform blocks therein may be order in the bitstream following various order or scanning manners. Example implementations for partitioning a coding block or prediction block into transform blocks, and a coding order of the transform blocks are described in further detail below. In some example implementations, as descried above, a transform partitioning may support transform blocks of multiple shapes, e.g., 1:1 (square), 1:2/2:1, and 1:4/4:1, with transform block sizes ranging from, e.g., 4×4 to 64×64. In some implementations, if the coding block is smaller than or equal to 64×64, the transform block partitioning may only apply to luma component, such that for chroma blocks, the transform block size is identical to the coding block size. Otherwise, if the coding block width or height is greater than 64, then both the luma and chroma coding blocks may be implicitly split into multiples of min (W, 64)×min (H, 64) and min (W, 32)×min (H, 32) transform blocks, respectively.

In some example implementations of transform block partitioning, for both intra and inter coded blocks, a coding block may be further partitioned into multiple transform blocks with a partitioning depth up to a predefined number of levels (e.g., 2 levels). The transform block partitioning depth and sizes may be related. For some example implementations, a mapping from the transform size of the current depth to the transform size of the next depth is shown in the following in Table 1.

TABLE 1

Transform partition size setting

| Transform Size of Current Depth | Transform Size of Next Depth |
|---|---|
| TX_4 × 4 | TX_4 × 4 |
| TX_8 × 8 | TX_4 × 4 |
| TX_16 × 16 | TX_8 × 8 |
| TX_32 × 32 | TX_16 × 16 |
| TX_64 × 64 | TX_32 × 32 |
| TX_4 × 8 | TX_4 × 4 |
| TX_8 × 4 | TX_4 × 4 |
| TX_8 × 16 | TX_8 × 8 |
| TX_16 × 8 | TX_8 × 8 |
| TX_16 × 32 | TX_16 × 16 |
| TX_32 × 16 | TX_16 × 16 |
| TX_32 × 64 | TX_32 × 32 |
| TX_64 × 32 | TX_32 × 32 |
| TX_4 × 16 | TX_4 × 8 |
| TX_16 × 4 | TX_8 × 4 |
| TX_8 × 32 | TX_8 × 16 |
| TX_32 × 8 | TX_16 × 8 |
| TX_16 × 64 | TX_16 × 32 |
| TX_64 × 16 | TX_32 × 16 |

Based on the example mapping of Table 1, for 1:1 square block, the next level transform split may create four 1:1 square sub-transform blocks. Transform partition may stop, for example, at 4×4. As such, a transform size for a current depth of 4×4 corresponds to the same size of 4×4 for the next depth. In the example of Table 1, for 1:2/2:1 non-square block, the next level transform split may create two 1:1 square sub-transform blocks, whereas for 1:4/4:1 non-square block, the next level transform split may create two 1:2/2:1 sub transform blocks.

In some example implementations, for luma component of an intra coded block, additional restriction may be applied with respect to transform block partitioning. For example, for each level of transform partitioning, all the sub-transform blocks may be restricted to having equal size. For example, for a 32×16 coding block, level 1 transform split creates two 16×16 sub-transform blocks, level 2 transform split creates eight 8×8 sub-transform blocks. In other words, the second level splitting must be applied to all first level sub blocks to keep the transform units at equal sizes. An example of the transform block partitioning for intra coded square block following Table 1 is shown in FIG. 15, together with coding order illustrated by the arrows. Specifically, 1502 shows the square coding block. A first-level split into 4 equal sized transform blocks according to Table 1 is shown in 1504 with coding order indicated by the arrows. A second-level split of all of the first-level equal sized blocks into 16 equal sized transform blocks according to Table 1 is shown in 1506 with coding order indicated by the arrows.

In some example implementations, for luma component of inter coded block, the above restriction for intra coding may not be applied. For example, after the first level of transform splitting, any one of sub-transform block may be further split independently with one more level. The resulting transform blocks thus may or may not be of the same size. An example split of an inter coded block into transform locks with their coding order is show in FIG. 16. In the Example of FIG. 16, the inter coded block 1602 is split into transform blocks at two levels according to Table 1. At the first level, the inter coded block is split into four transform blocks of equal size. Then only one of the four transform blocks (not all of them) is further split into four sub-transform blocks, resulting in a total of 7 transform blocks having two different sizes, as shown by 1604. The example coding order of these 7 transform blocks is shown by the arrows in 1604 of FIG. 16.

In some example implementations, for chroma component(s), some additional restriction for transform blocks may apply. For example, for chroma component(s) the transform block size can be as large as the coding block size, but not smaller than a predefined size, e.g., 8×8.

In some other example implementations, for the coding block with either width (W) or height (H) being greater than 64, both the luma and chroma coding blocks may be implicitly split into multiples of min (W, 64)×min (H, 64) and min (W, 32)×min (H, 32) transform units, respectively. Here, in the present disclosure, a "min (a, b)" may return a smaller value between a and b.

Figure 17:
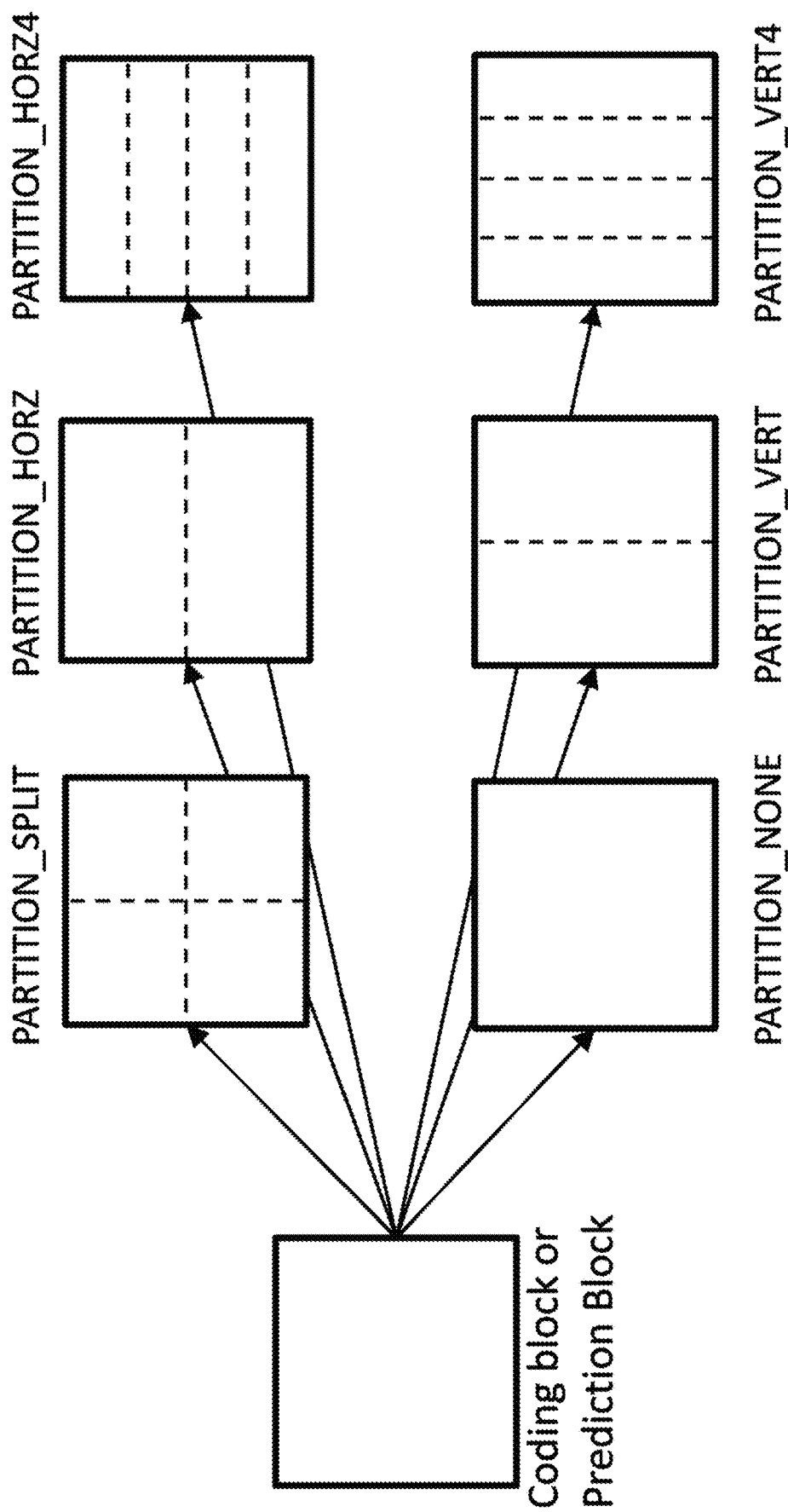
FIG. 17 shows another scheme for partitioning a coding block into multiple transform blocks according to example embodiments of the disclosure.

FIG. 17 further shows another alternative example scheme for partitioning a coding block or prediction block into transform blocks. As shown in FIG. 17, instead of using recursive transform partitioning, a predefined set of partitioning types may be applied to a coding block according a transform type of the coding block. In the particular example shown in FIG. 17, one of the 6 example partitioning types may be applied to split a coding block into various number of transform blocks. Such scheme of generating transform block partitioning may be applied to either a coding block or a prediction block.

In more detail, the partitioning scheme of FIG. 17 provides up to 6 example partition types for any given transform type (transform type refers to the type of, e.g., primary transform, such as ADST and others). In this scheme, every coding block or prediction block may be assigned a transform partition type based on, for example, a rate-distortion cost. In an example, the transform partition type assigned to the coding block or prediction block may be determined based on the transform type of the coding block or prediction block. A particular transform partition type may correspond to a transform block split size and pattern, as shown by the 6 transform partition types illustrated in FIG. 17. A correspondence relationship between various transform types and the various transform partition types may be predefined. An example is shown below with the capitalized labels indicating the transform partition types that may be assigned to the coding block or prediction block based on rate distortion cost:

PARTITION_NONE: Assigns a transform size that is equal to the block size.

PARTITION_SPLIT: Assigns a transform size that is ½ the width of the block size and ½ the height of the block size.

PARTITION_HORZ: Assigns a transform size with the same width as the block size and ½ the height of the block size.

PARTITION_VERT: Assigns a transform size with ½ width of the block size and the same height as the block size.

PARTITION_HORZ4: Assigns a transform size with the same width as the block size and ¼ the height of the block size.

PARTITION_VERT4: Assigns a transform size with ¼ the width of the block size and the same height as the block size.

In the example above, the transform partition types as shown in FIG. 17 all contain uniform transform sizes for the partitioned transform blocks. This is a mere example rather than a limitation. In some other implementations, mixed transform blocks sizes may be used for the partitioned transform blocks in a particular partition type (or pattern).

The PBs (or CBs, also referred to as PBs when not being further partitioned into prediction blocks) obtained from any of the partitioning schemes above may then become the individual blocks for coding via either intra or inter predictions. For inter-prediction for a current PB, a residual between the current block and a prediction block may be generated, coded, and included in the coded bitstream.

Inter-prediction may be implemented, for example, in a single-reference mode or a compound-reference mode. In some implementations, a skip flag may be first included in the bitstream for a current block (or at a higher level) to indicate whether the current block is inter-coded and is not to be skipped. If the current block is inter-coded, then another flag may be further included in the bitstream as a signal to indicate whether the single-reference mode or compound-reference mode is used for the prediction of the current block. For the single-reference mode, one reference block may be used to generate the prediction block for the current block. For the compound-reference mode, two or more reference blocks may be used to generate the prediction block by, for example, weighted average. The compound-reference mode may be referred as more-than-one-reference mode, two-reference mode, or multiple-reference mode. The reference block or reference blocks may be identified using reference frame index or indices and additionally using corresponding motion vector or motion vectors which indicate shift(s) between the reference block(s) and the current blocks in location, e.g., in horizontal and vertical pixels. For example, the inter-prediction block for the current block may be generated from a single-reference block identified by one motion vector in a reference frame as the prediction block in the single-reference mode, whereas for the compound-reference mode, the prediction block may be generated by a weighted average of two reference blocks in two reference frames indicated by two reference frame indices and two corresponding motion vectors. The motion vector(s) may be coded and included in the bitstream in various manners.

In some implementations, an encoding or decoding system may maintain a decoded picture buffer (DPB). Some images/pictures may be maintained in the DPB waiting for being displayed (in a decoding system) and some images/pictures in the DPB may be used as reference frames to enable inter-prediction (in a decoding system or encoding system). In some implementations, the reference frames in the DPB may be tagged as either short-term references or long-term references for a current image being encoded or decoded. For example, short-term reference frames may include frames that are used for inter-prediction for blocks in a current frame or in a predefined number (e.g., 2) of closest subsequent video frames to the current frame in a decoding order. The long-term reference frames may include frames in the DPB that can be used to predict image blocks in frames that are more than the predefined number of frames away from the current frame in the order of decoding. Information about such tags for short and long-term reference frames may be referred to as Reference Picture Set (RPS) and may be added to a header of each frame in the encoded bitstream. Each frame in the encoded video stream may be identified by a Picture Order Counter (POC), which is numbered according to playback sequence in an absolute manner or relevant to a picture group starting from, for example, an I-frame.

In some example implementations, one or more reference picture lists containing identification of short-term and long-term reference frames for inter-prediction may be formed based on the information in the RPS. For example, a single picture reference list may be formed for uni-directional inter-prediction, denoted as L0 reference (or reference list 0) whereas two picture referenced lists may be formed for bi-direction inter-prediction, denoted as L0 (or reference list 0) and L1 (or reference list 1) for each of the two prediction directions. The reference frames included in the L0 and L1 lists may be ordered in various predetermined manners. The lengths of the L0 and L1 lists may be signaled in the video bitstream. Uni-directional inter-prediction may be either in the single-reference mode, or in the compound-reference mode when the multiple references for the generation of prediction block by weighted average in the compound prediction mode are on a same side of the block to be predicted. Bi-directional inter-prediction may only be compound mode in that bi-directional inter-prediction involves at least two reference blocks.

Adaptive Loop Filter

In Versatile Video Coding (VVC), an Adaptive Loop Filter (ALF) with block-based filter adaption is applied. For the luma component, one among many filters is selected for each 4×4 block, based on the direction and activity of local gradients. In one example, there may be 25 filters to select from.

FIG. 18 shows an example adaptive loop filter (ALF) shape. Specifically, FIG. 18 illustrates two diamond filter shapes. The 7×7 diamond shape is applied for luma component and the 5×5 diamond shape is applied for chroma components.

The block classification can be calculated for different examples as follows. For luma component, each 4×4 block is categorized into one out of 25 classes. The classification index C is derived based on its directionality D and a quantized value of activity $\hat{A}$, as follows:

$$C = 5D + \hat{A} \tag{1}$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l}, \quad V_{k,l} = |2R(k,l) - R(k,l-1) - R(k,l+1)| \tag{2}$$

$$g_h = \sum_{k=i-2}^{i+3} \sum_{l=j-2}^{j+3} H_{k,l}, \quad H_{k,l} = |2R(k,l) - R(k-1,l) - R(k+1,l)| \tag{3}$$

$$g_{d1} = \sum_{k=i-2}^{i+3} \sum_{l=j-2}^{j+3} D1_{k,l}, \quad D1_{k,l} = |2R(k,l) - R(k-1,l-1) - R(k+1,l+1)| \tag{4}$$

$$g_{d2} = \sum_{k=i-2}^{i+3} \sum_{j=j-2}^{j+3} D2_{k,l}, \quad D2_{k,l} = |2R(k,l) - R(k-1,l+1) - R(k+1,l-1)| \tag{5}$$

Where indices i and j refer to the coordinates of the upper left sample within the 4×4 block and R(i, j) indicates a reconstructed sample at coordinate (i, j).

Figure 19B:
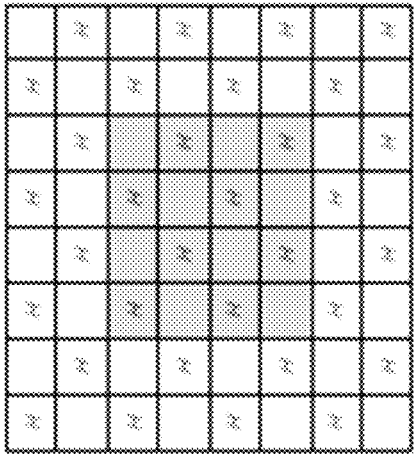
FIG. 19b shows subsampled positions in a Laplacian calculation for a horizontal gradient.
Figure 19D:
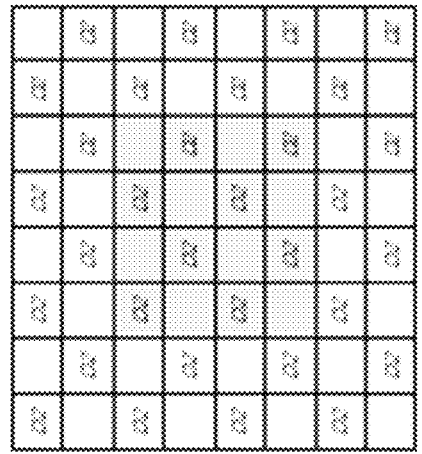
FIG. 19d shows subsampled positions in a Laplacian calculation for another diagonal gradient.
Figure 19A:
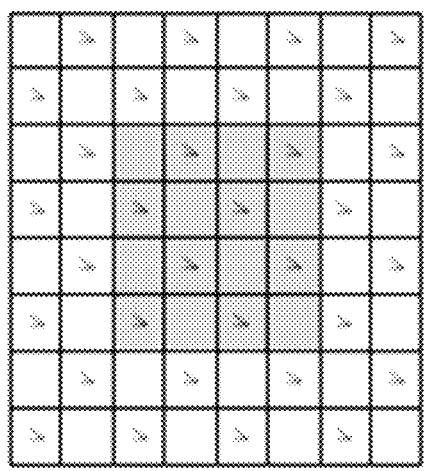
FIG. 19a shows subsampled positions in a Laplacian calculation for a vertical gradient.
Figure 19C:
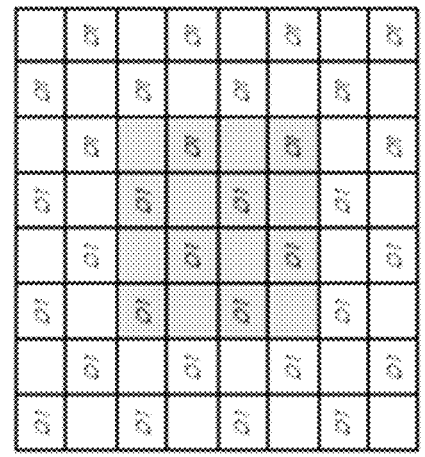
FIG. 19c shows subsampled positions in a Laplacian calculation for a diagonal gradient.

To reduce the complexity of block classification, the subsampled 1-D Laplacian calculation may be applied. As shown in FIGS. 19*a*-19*d*, the same subsampled positions may be used for gradient calculation of all directions. FIG. 19*a* shows subsampled positions in a Laplacian calculation for a vertical gradient. FIG. 19*b* shows subsampled positions in a Laplacian calculation for a horizontal gradient. FIG. 19c shows subsampled positions in a Laplacian calculation for a diagonal gradient. FIG. 19d shows subsampled positions in a Laplacian calculation for another diagonal gradient.

Then D maximum and minimum values of the gradients of horizontal and vertical directions are set as:

$$g_{h,v}^{max} = \max(g_h, g_v), g_{h,v}^{min} = \min(g_h, g_v) \quad (6)$$

The maximum and minimum values of the gradient of two diagonal directions are set as:

$$g_{d1,d2}^{max} = \max(g_{d1}, g_{d2}), g_{d1,d2}^{min} = \min(g_{d1}, g_{d2}) \quad (7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d1,d2}^{max} \leq t_1 \cdot g_{d1,d2}^{min}$ are true, D is set to 0.

Step 2. If $g_{h,v}^{max}/g_{h,v}^{min} > g_{d1,d2}^{max}/g_{d1,d2}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d1,d2}^{max} > t_2 \cdot g_{d1,d2}^{min}$, D is set to 4; otherwise D is set to 3.

The activity value A is calculated as:

$$A = \sum_{k=i-2}^{i+3} \sum_{l=j-2}^{j+3} (V_{k,l} + H_{k,l}) \quad (8)$$

A is further quantized to the range of 0 to 4, inclusively, and the quantized value is denoted as Â. For chroma components in a picture, no classification method is applied. In other words, a single set of ALF coefficients may be applied for each chroma component.

There may be a geometric transformation of filter coefficients and clipping values. Before filtering each 4×4 luma block, geometric transformations such as rotation or diagonal and vertical flipping may be applied to the filter coefficients f(k, l) and to the corresponding filter clipping values c(k, l) depending on gradient values calculated for that block. This may be equivalent to applying these transformations to the samples in the filter support region. This can make different blocks to which ALF is applied more uniformly by aligning their directionality. Three geometric transformations may include diagonal, vertical flip and rotation:

$$\text{Diagonal: } f_D(k,l) = f(l,k), c_D(k,l) = c(l,k), \quad (9)$$

$$\text{Vertical flip: } f_V(k,l) = f(k, K-l-1), c_V(k,l) = c(k, K-l-1) \quad (10)$$

$$\text{Rotation: } f_R(k,l) = f(K-l-1, k), c_R(k,l) = c(K-l-1, k) \quad (11)$$

where K is the size of the filter and $0 \leq k, l \leq K-1$ are coefficients coordinates, such that location (0,0) is at the upper left corner and location (K−1, K−1) is at the lower right corner. The transformations are applied to the filter coefficients f (k, l) and to the clipping values c(k, l) depending on gradient values calculated for that block. The relationship between the transformation and the four gradients of the four directions are summarized in the following Table 2:

TABLE 2

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |

TABLE 2-continued

Mapping of the gradient calculated for one block and the transformations

| Gradient values | Transformation |
|---|---|
| $g_{d1} < g_{d2}$ and $g_h < g_v$ | Vertical flip |
| $g_{d1} < g_{d2}$ and $g_v < g_h$ | Rotation |

In VVC, ALF filter parameters are signaled in adaption parameter set (APS). In one APS, a number of sets of luma filter coefficients and clipping value indexes may be used. For example, there may be 25 sets of luma filters. In addition, a number of sets of chroma filter coefficients and clipping value indexes could be signaled. In one example, there may be up to 8 sets of chroma filter coefficients and clipping value indexes that could be signaled. To reduce bits overhead, filter coefficients of different classification for luma component can be merged. In slice header, the indices of the APSs used for the current slice may be signaled. The signaling of ALF may be coding tree unit (CTU) based.

Clipping value indexes, which are decoded from the APS, allow determining clipping values using a table of clipping values for luma and chroma. These clipping values may be dependent of the internal bit depth. More precisely, the table of clipping values may be obtained by the following formula:

$$\text{AlfClip} = \{\text{round}(2^{B - \alpha * n}) \text{ for } n \in [0 \ldots N-1]\} \quad (12)$$

with B equal to the internal bit depth, α is a pre-defined constant value equal to 2.35, and N equal to 4 which is the number of allowed clipping values in VVC in one embodiment. Table 3 shows the output of equation (12):

TABLE 3

Specification AlfClip depending on bitDepth and clipIdx

| | clipIdx | | | |
|---|---|---|---|---|
| bitDepth | 0 | 1 | 2 | 3 |
| 8 | 255 | 50 | 10 | 2 |
| 9 | 511 | 100 | 20 | 4 |
| 10 | 1023 | 201 | 39 | 8 |
| 11 | 2047 | 402 | 79 | 15 |
| 12 | 4095 | 803 | 158 | 31 |
| 13 | 8191 | 1607 | 315 | 62 |
| 14 | 16383 | 3214 | 630 | 124 |
| 15 | 32767 | 6427 | 1261 | 247 |
| 16 | 65535 | 12855 | 2521 | 495 |

In one slice header example, up to 7 APS indices can be signaled to specify the luma filter sets that are used for the current slice. The filtering process may be further controlled at the coding tree block (CTB) level. A flag may be signaled to indicate whether ALF is applied to a luma CTB. In one example, a luma CTB can choose a filter set among 16 fixed filter sets and the filter sets from APSs. A filter set index is signaled for a luma CTB to indicate which filter set is applied. The 16 fixed filter sets may be pre-defined and hard-coded in both the encoder and the decoder. For chroma component, an APS index is signaled in the slice header to indicate the chroma filter sets being used for the current slice. At CTB level, a filter index is signaled for each chroma CTB if there is more than one chroma filter set in the APS. The filter coefficients may be quantized with norm equal to 128. In order to restrict the multiplication complexity, a bitstream conformance is applied so that the coefficient value of the non-central position may be in the range of −27 to 27−1, inclusive. The central position coefficient is not signaled in the bitstream and is considered as equal to 128.

In a VVC example, the syntaxes and semantics of clipping index and values may be defined as follows: alf_luma_clip_idx[sfIdx][j] specifies the clipping index of the clipping value to use before multiplying by the j-th coefficient of the signalled luma filter indicated by sfIdx. It may be a requirement of bitstream conformance that the values of alf_luma_clip_idx[sfIdx][j] with sfIdx=0 . . . alf_luma_num_filters_signalled_minus1 and j=0 . . . 11 shall be in the range of 0 to 3, inclusive. The luma filter clipping values AlfClipL[adaptation_parameter_set_id] with elements AlfClipL[adaptation_parameter_set_id][filtIdx][j], with filtIdx=0 . . . NumAlfFilters−1 and j=0 . . . 11 are derived as specified in Table 3 depending on bitDepth set equal to BitDepthY and clipIdx set equal to alf_luma_clip_idx[alf_luma_coeff_delta_idx[filtIdx]][j]. alf_chroma_clip_idx[altIdx][j] specifies the clipping index of the clipping value to use before multiplying by the j-th coefficient of the alternative chroma filter with index altIdx. It is a requirement of bitstream conformance that the values of alf_chroma_clip_idx[altIdx][j] with altIdx=0 . . . alf_chroma_num_alt_filters_minus1, j=0 . . . 5 shall be in the range of 0 to 3, inclusive. The chroma filter clipping values AlfClipC[adaptation_parameter_set_id][altIdx] with elements AlfClipC[adaptation_parameter_set_id][altIdx][j], with altIdx=0 . . . alf_chroma_num_alt_filters_minus1, j=0 . . . 5 are derived as specified in Table 3 depending on bitDepth set equal to BitDepthC and clipIdx set equal to alf_chroma_clip_idx[altIdx][j].

The filtering process may be performed in the following example. At decoder side, when ALF is enabled for a CTB, each sample R(i, j) within the CU is filtered, resulting in sample value R'(i, j):

$$R'(i,j)=R(i,j)+((\Sigma_{k\neq 0}\Sigma_{l\neq 0}f(k,l)\times K(R(i+k,j+l)-R(i,j),c(k,l))+64)>>7) \quad (13)$$

where f(k, l) denotes the decoded filter coefficients, K(x, y) is the clipping function and c(k, l) denotes the decoded clipping parameters. The variable k and l vary between −L/2 and L/2 where L denotes the filter length. The clipping function K(x, y)=min(y, max(−y, x)) which corresponds to the function Clip3 (−y, y, x). By incorporating this clipping function, as first proposed in JVET-N0242, this loop filtering method becomes a non-linear process, as known as Non-Linear ALF. The selected clipping values are coded in the "alf_data" syntax element by using a Golomb encoding scheme corresponding to the index of the clipping value in Table 3. This encoding scheme may be the same as the encoding scheme for the filter index.

Figure 20:
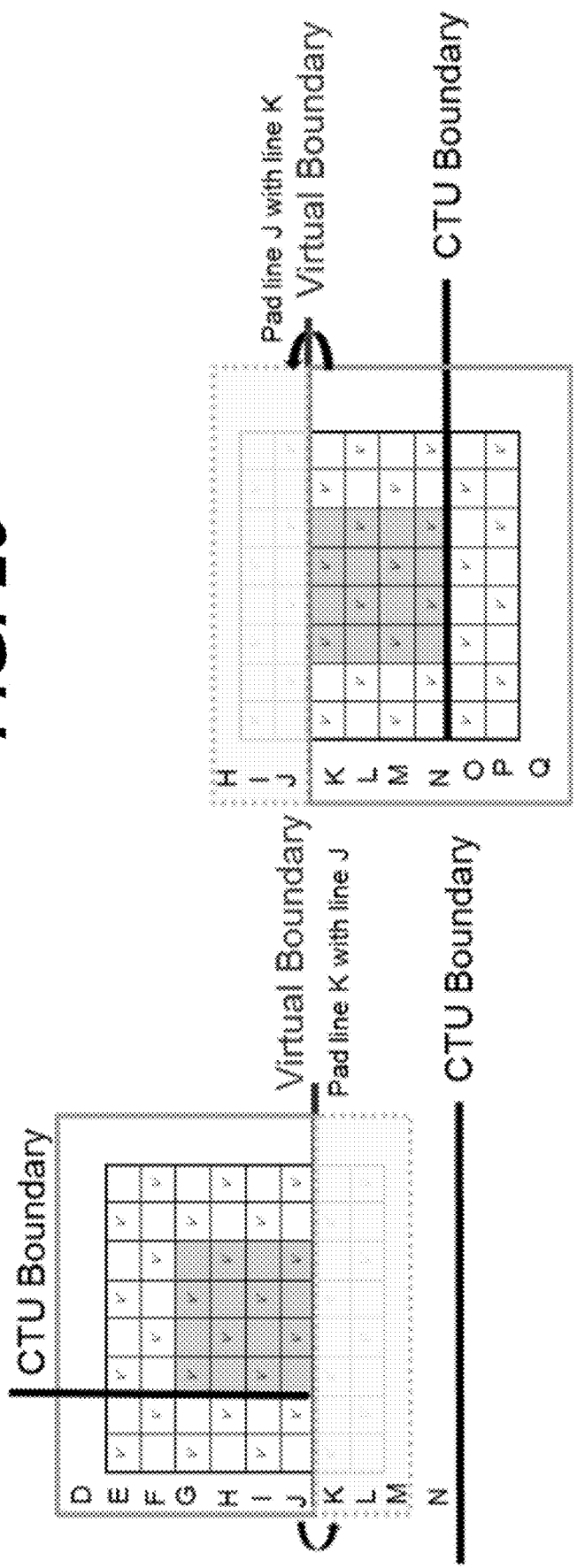
FIG. 20 shows an example of modified block classification at virtual boundaries.

There may be a virtual boundary filtering process for line buffer reduction. To reduce the line buffer requirement of ALF, a modified block classification and filtering may be applied for the samples near horizontal CTU boundaries. Accordingly, a virtual boundary may be defined as a line by shifting the horizontal CTU boundary with "N" samples as shown in FIG. 20. FIG. 20 shows an example of modified block classification at virtual boundaries. In this example, N is equal to 4 for the luma component and 2 for the chroma component.

The modified block classification is applied for the Luma component as depicted in FIG. 20. For the 1D Laplacian gradient calculation of the 4×4 block above the virtual boundary, only the samples above the virtual boundary are used. Similarly, for the 1D Laplacian gradient calculation of the 4×4 block below the virtual boundary, only the samples below the virtual boundary are used. The quantization of activity value A is scaled by taking into account the reduced number of samples used in 1D Laplacian gradient calculation.

Figure 21:
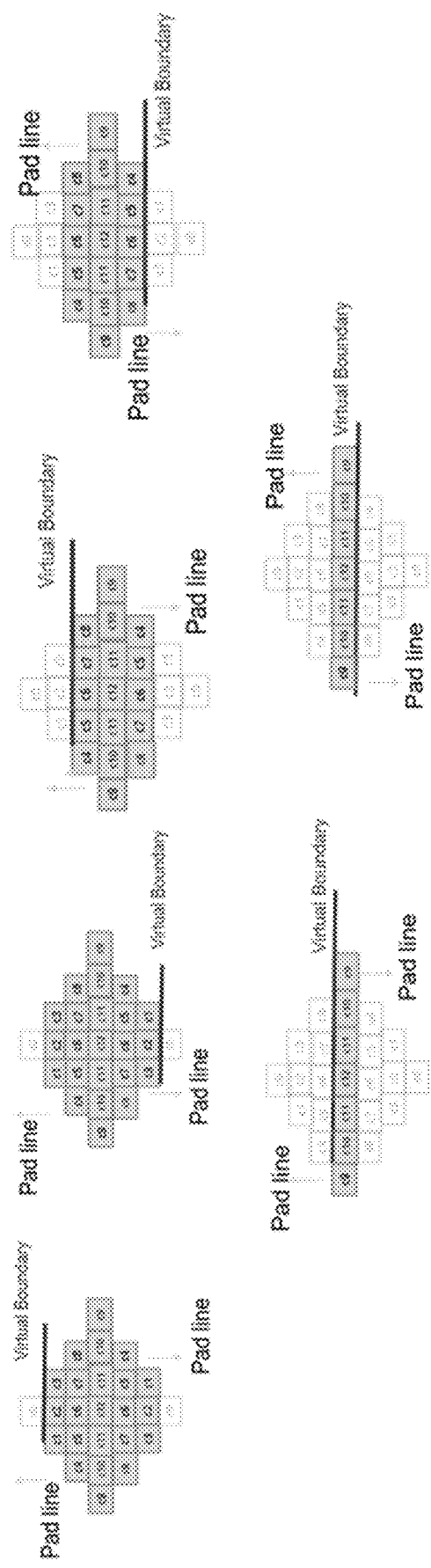
FIG. 21 shows an example of modified adaptive loop filtering for luma component at virtual boundaries.

FIG. 21 shows an example of modified adaptive loop filtering for luma component at virtual boundaries. For filtering processing, symmetric padding operation at the virtual boundaries may be used for both luma and chroma components. As shown in FIG. 21, when the sample being filtered is located below the virtual boundary, the neighboring samples that are located above the virtual boundary are padded. The corresponding samples at the other sides may also be padded, symmetrically.

Figure 22:
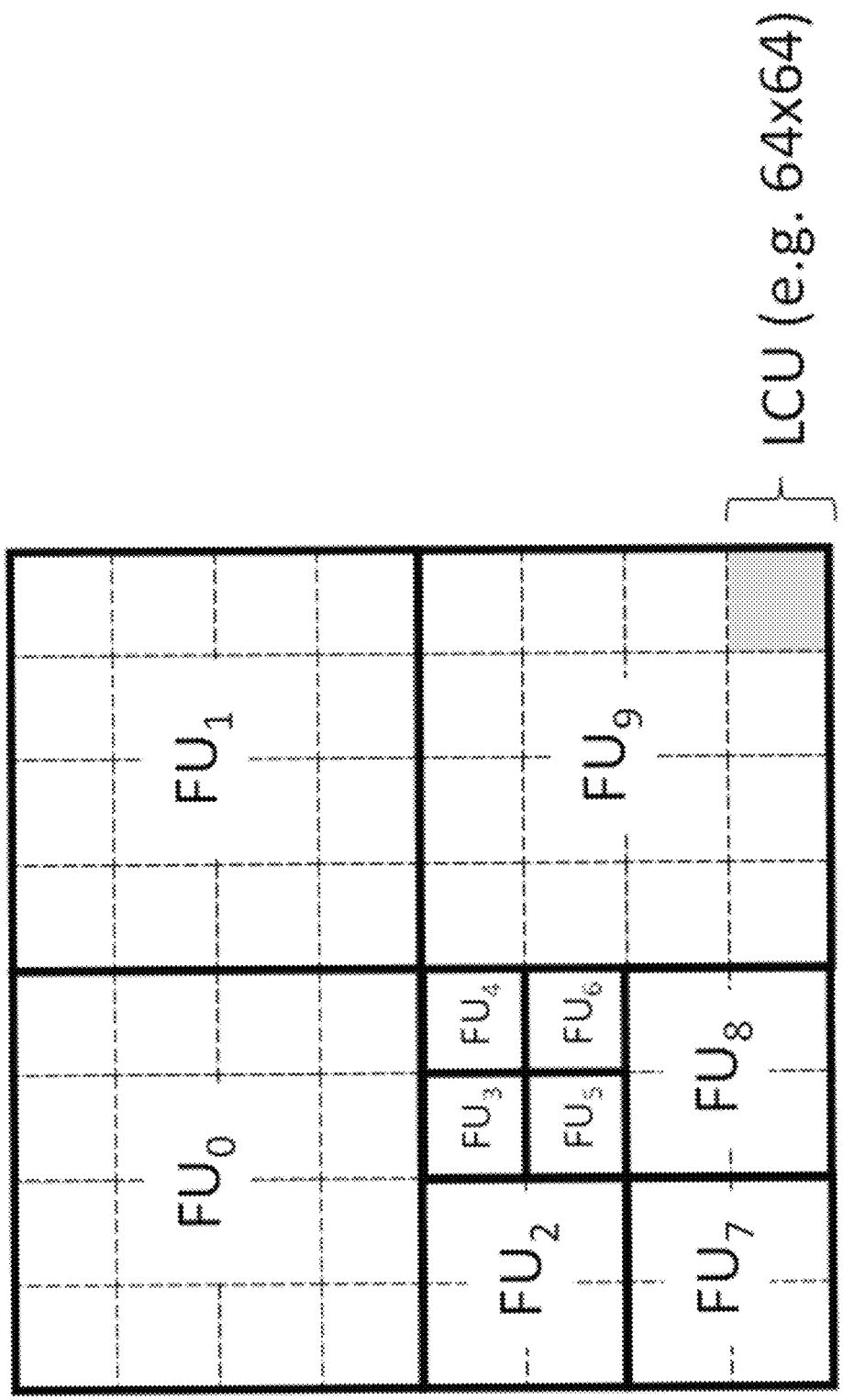
FIG. 22 shows an example of largest coding unit (LCU) aligned picture quadtree splitting.

FIG. 22 shows an example of largest coding unit (LCU) aligned picture quadtree splitting. In order enhance coding efficiency, the coding unit synchronous picture quadtree-based adaptive loop filter may be used. The luma picture may be split into several multi-level quadtree partitions, and each partition boundary is aligned to the boundaries of the largest coding units (LCUs). Each partition has its own filtering process and may be referred to as a filter unit (FU). The two pass encoding flow may include the following. At the first pass, the quadtree split pattern and the best filter of each FU are decided. The filtering distortions are estimated by FFDE during the decision process. According to the decided quadtree split pattern and the selected filters of all FUs, the reconstructed picture is filtered. At the second pass, the CU synchronous ALF on/off control is performed. According to the ALF on/off results, the first filtered picture is partially recovered by the reconstructed picture.

A top-down splitting strategy may be adopted to divide a picture into multi-level quadtree partitions by using a rate-distortion criterion. Each partition may be referred to as a filter unit. The splitting process aligns quadtree partitions with LCU boundaries. The encoding order of FUs follows the z-scan order. For example, in FIG. 22, the picture is split into 10 FUs, and the encoding order is FU0, FU1, FU2, FU3, FU4, FU5, FU6, FU7, FU8, and FU9.

Figure 23:
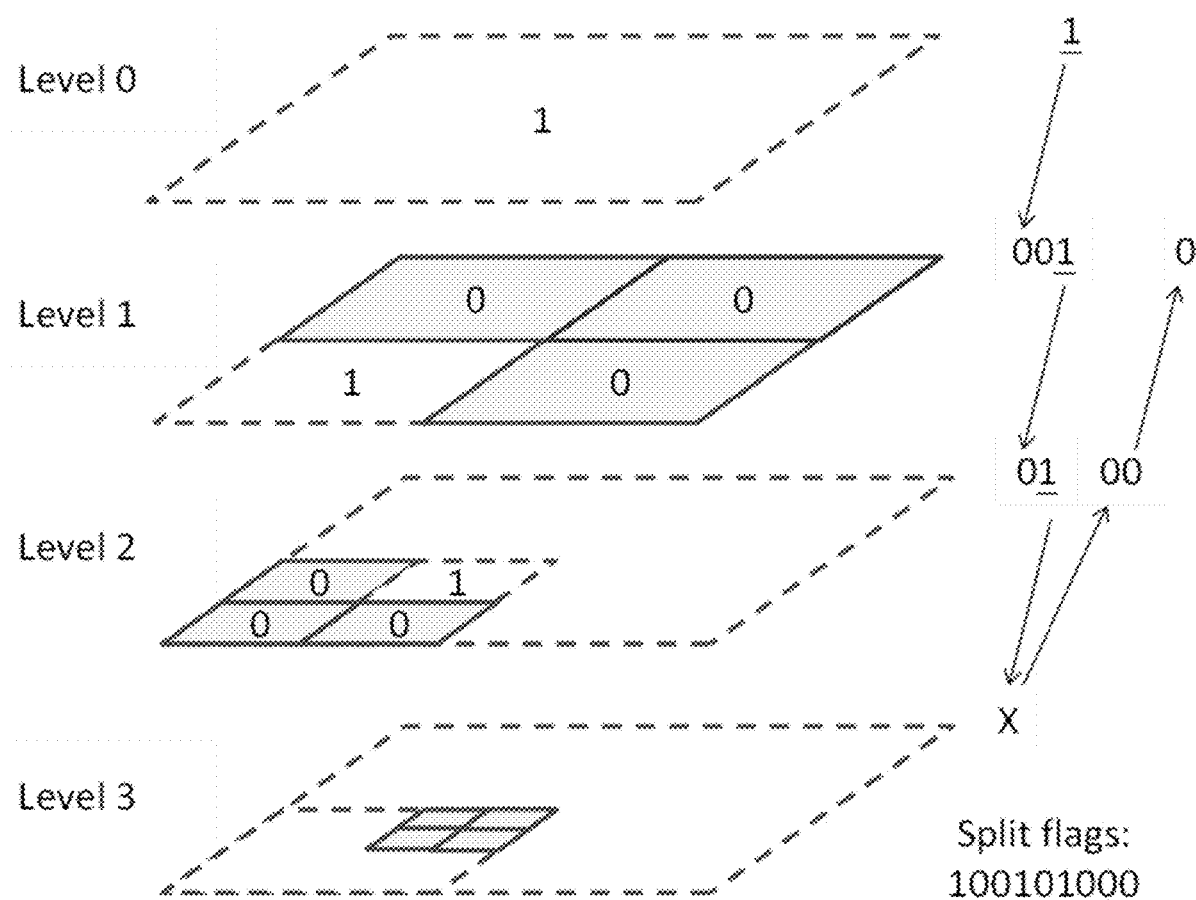
FIG. 23 shows an example of quadtree split flags encoded in the z order.

FIG. 23 shows an example of quadtree split flags encoded in the z order. To indicate the picture quadtree split pattern, split flags are encoded and transmitted in z-order. FIG. 23 shows the quadtree split pattern in correspondence with FIG. 22. The filter of each FU is selected from two filter sets based on the rate-distortion criterion. The first set has 1/2-symmetric square-shaped and rhombus-shaped filters newly derived for the current FU. The second set comes from time-delayed filter buffers; the time-delayed filter buffers store the filters previously derived for FUs of prior pictures. The filter with the minimum rate-distortion cost of these two sets is chosen for the current FU. Similarly, if the current FU is not the smallest FU and can be further split into 4 children FUs, the rate-distortion costs of the 4 children FUs are calculated. By comparing the rate-distortion cost of the split and non-split cases recursively, the picture quadtree split pattern can be decided. In one example, the maximum quadtree split level may be 2, which means the maximum number of FUs is 16. During the quadtree split decision, the correlation values for deriving Wiener coefficients of the 16 FUs at the bottom quadtree level (smallest FUs) can be reused. The rest FUs can derive their Wiener filters from the correlations of the 16 FUs at the bottom quadtree level. Therefore, there may be only one frame buffer access for deriving the filter coefficients of all FUs. After the quadtree split pattern is decided, to further reduce the filtering distortion, the CU synchronous ALF on/off control is performed. By comparing the filtering distortion and non-filtering distortion, the leaf CU can explicitly switch ALF on/off in its local region. The coding efficiency may be further improved by redesigning the filter coefficients according to the ALF on/off results. However, the redesigning process may need additional frame buffer accesses. In a modified encoder design, there may be no redesign process after the CU synchronous ALF on/off decision in order to minimize the number of frame buffer accesses.

Cross-Component Adaptive Loop Filter (CC-ALF)

Figure 24:
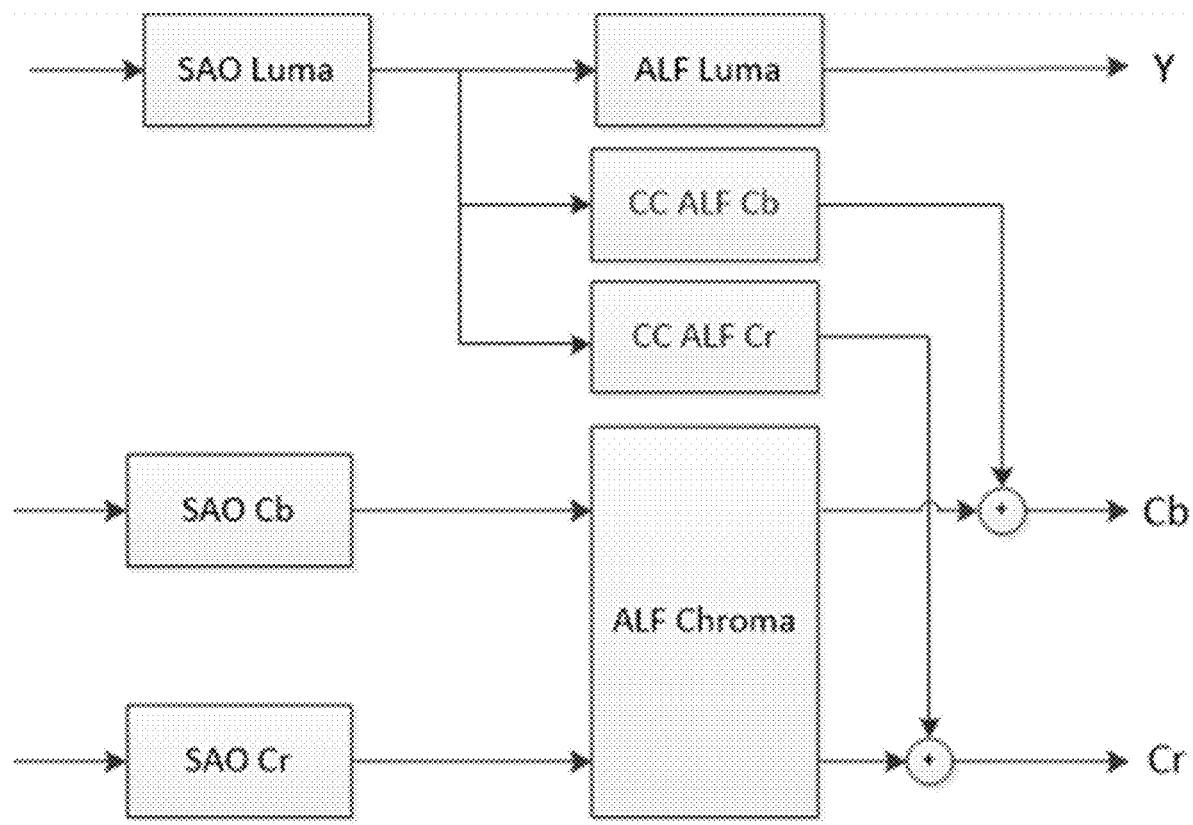
FIG. 24 shows an example of cross-component adaptive loop filter (CC-ALF) placement.

FIG. 24 shows an example of cross-component adaptive loop filter (CC-ALF) placement. CC-ALF may make use of luma sample values to refine each chroma component. FIG. 24 illustrates the placement of CC-ALF with respect to the other loop filters.

Figure 25:
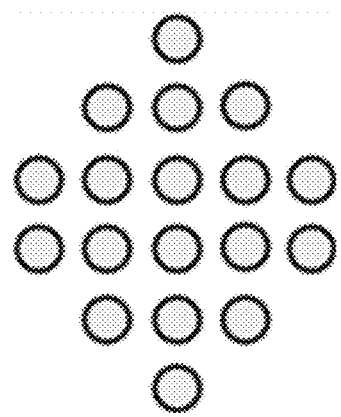
FIG. 25 shows an example of a diamond shaped filter.

FIG. 25 shows an example of a diamond shaped filter. CC-ALF may operate by applying a linear, diamond shaped filter from FIG. 25 to the luma channel for each chroma component. The filter coefficients are transmitted in the APS, scaled by a factor of 210 in one example, and rounded for fixed point representation. The application of the filters is controlled on a variable block size and signaled by a context-coded flag received for each block of samples. The block size along with an CC-ALF enabling flag is received at the slice-level for each chroma component. In one example, the following block sizes (in chroma samples) were supported 16×16, 32×32, 64×64.

Example syntax for CC-ALF may include:

Chroma Sampling Formats

FIG. 26 shows an example location of chroma samples relative to luma samples. FIG. 26 illustrates the indicated relative position of the top-left chroma sample when chroma_format_idc is equal to 1 (4:2:0 chroma format), and chroma_sample_loc_type_top_field or chroma_sample_loc_type_bottom_field is equal to the value of a variable ChromaLocType. The region represented by the top-left 4:2:0 chroma sample (depicted as a large square with a large dot at its center) is shown relative to the region represented by the top-left luma sample (depicted as a small square with a small dot at its center). The regions represented by neighboring luma samples are depicted as small shaded gray squares with small shaded grey dots at their centers.

Directional Enhancement Feature

One objective of the in-loop constrained directional enhancement filter (CDEF) is to filter out coding artifacts while retaining the details of the image. In HEVC, the Sample Adaptive Offset (SAO) algorithm may achieve a similar objective by defining signal offsets for different classes of pixels. Unlike SAO, CDEF is a non-linear spatial filter. The design of the filter has been constrained to be easily vectorizable (i.e. implementable with SIMD operations), which may not be the case for other non-linear filters like the median filter and the bilateral filter. The CDEF

```
if ( slice_cross_component_alf_cb_enabled_flag )
    alf_ctb_cross_component_cb_idc[ xCtb >> CtbLog2SizeY ][ yCtb >> CtbLog2SizeY ]          ae(v)
  if( slice_cross_component_alf_cb_enabled_flag = = 0 || alf_ctb_cross_component_cb_idc[ x
Ctb >> CtbLog2SizeY ][ yCtb >> CtbLog2SizeY ] == 0 )
    if( slice_alf_chroma_idc = = 1 | | slice_alf_chroma_idc = = 3 ) {
      alf_ctb_flag[ 1 ][ xCtb >> CtbLog2SizeY ][ yCtb >> CtbLog2SizeY ]                     ae(v)
      if( alf_ctb_flag[ 1 ][ xCtb >> CtbLog2SizeY ][ yCtb >> CtbLog2SizeY ]
      && aps_alf_chroma_num_alt_filters_minus1 > 0 )
        alf_ctb_filter_alt_idx[ 0 ][ xCtb >> CtbLog2SizeY ][ yCtb >> CtbLog2SizeY ]         ae(v)
    }
if ( slice_cross_component_alf_cr_enabled_flag )
    alf_ctb_cross_component_cr_idc[ xCtb >> CtbLog2SizeY ][ yCtb >> CtbLog2SizeY ]          ae(v)
  if( slice_cross_component_alf_cr_enabled_flag = = 0 || alf_ctb_cross_component_cr_idc[ xC
tb >> CtbLog2SizeY ][ yCtb >> CtbLog2SizeY ] == 0 )
    if( slice_alf_chroma_idc = = 2 | | slice_alf_chroma_idc = = 3 ) {
      alf_ctb_flag[ 2 ][ xCtb >> CtbLog2SizeY ][ yCtb >> CtbLog2SizeY ]                     ae(v)
      if( alf_ctb_flag[ 2 ][ xCtb >> CtbLog2SizeY ][ yCtb >> CtbLog2SizeY ]
      && aps_alf_chroma_num_alt_filters_minus1 > 0 )
        alf_ctb_filter_alt_idx[ 1 ][ xCtb >> CtbLog2SizeY ][ yCtb >> CtbLog2SizeY ]         ae(v)
    }
```

The semantics of CC-ALF related syntaxes may include:

alf_ctb_cross_component_cb_idc[xCtb>>CtbLog2SizeY][yCtb>>CtbLog2SizeY] equal to 0 indicates that the cross component Cb filter is not applied to block of Cb colour component samples at luma location (xCtb, yCtb).

alf_cross_component_cb_idc[xCtb>>CtbLog2SizeY][yCtb>>CtbLog2SizeY] not equal to 0 indicates that the alf_cross_component_cb_idc[xCtb>>CtbLog2SizeY][yCtb>>CtbLog2SizeY]-th cross component Cb filter is applied to the block of Cb colour component samples at luma location (xCtb, yCtb)

alf_ctb_cross_component_cr_idc[xCtb>>CtbLog2SizeY][yCtb>>CtbLog2SizeY] equal to 0 indicates that the cross component Cr filter is not applied to block of Cr colour component samples at luma location (xCtb, yCtb).

alf_cross_component_cr_idc[xCtb>>CtbLog2SizeY][yCtb>>CtbLog2SizeY] not equal to 0 indicates that the alf_cross_component_cr_idd[xCtb>>CtbLog2SizeY][yCtb>>CtbLog2SizeY]-th cross component Cr filter is applied to the block of Cr colour component samples at luma location (xCtb, yCtb)

design originates from the following observations. The amount of ringing artifacts in a coded image tends to be roughly proportional to the quantization step size. The amount of detail is a property of the input image, but the smallest detail retained in the quantized image tends to also be proportional to the quantization step size. For a given quantization step size, the amplitude of the ringing is generally less than the amplitude of the details.

CDEF works by identifying the direction of each block and then adaptively filtering along the identified direction and to a lesser degree along directions rotated 45 degrees from the identified direction. The filter strengths are signaled explicitly, which allows a high degree of control over the blurring. An efficient encoder search is designed for the filter strengths. CDEF is based on two previously proposed in-loop filters and the combined filter was adopted for the emerging AV1 codec.

Figure 27:
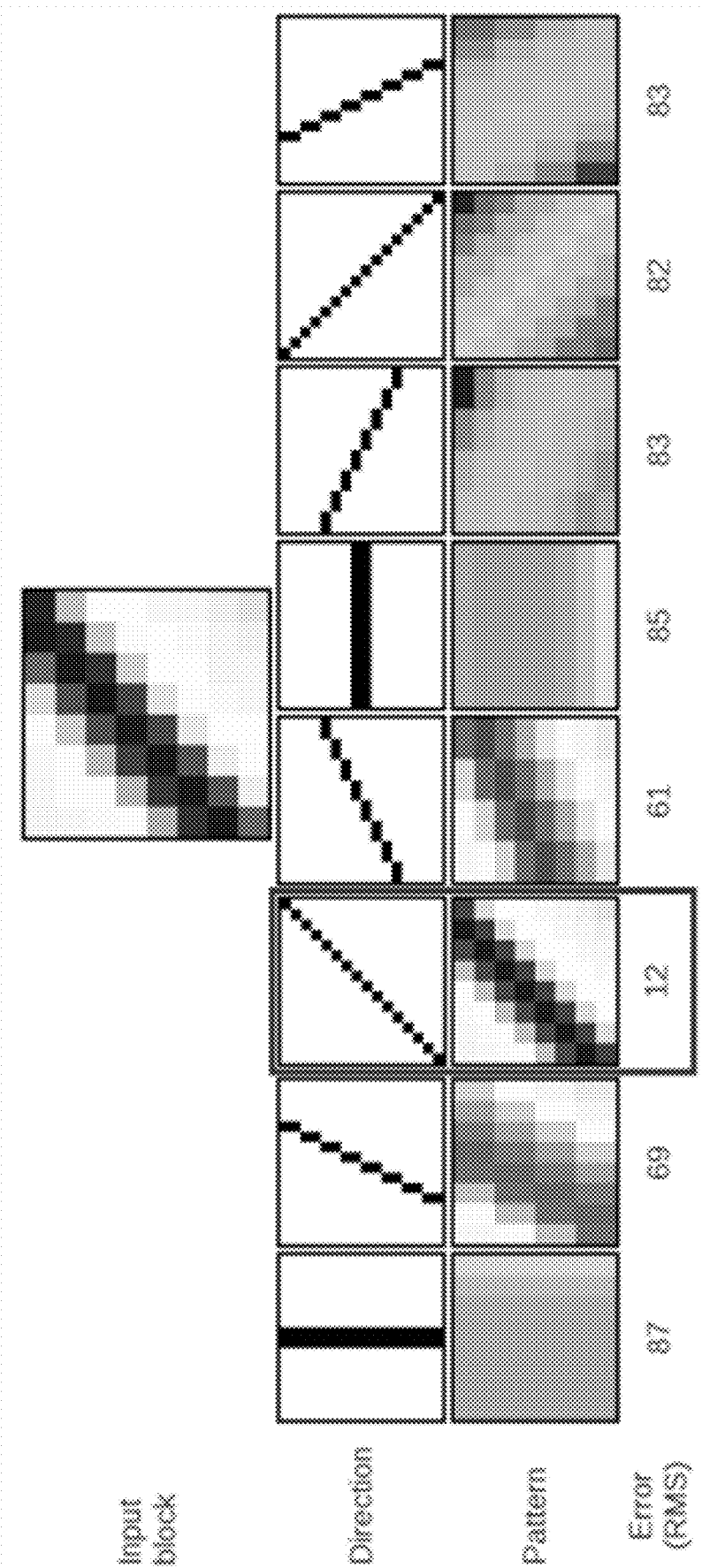
FIG. 27 shows an example of direction search.

FIG. 27 shows an example of direction search. The direction search operates on the reconstructed pixels, just after the deblocking filter. Since those pixels are available to the decoder, the directions require no signaling. The search operates on 8×8 blocks, which are small enough to adequately handle non-straight edges, while being large enough to reliably estimate directions when applied to a quantized image. Having a constant direction over an 8×8 region also makes vectorization of the filter easier. For each block we determine the direction that best matches the pattern in the block by minimizing the sum of squared differences (SSD) between the quantized block and the closest perfectly directional block. A perfectly directional block is a block where all of the pixels along a line in one direction have the same value. FIG. 27 is one example of direction search for an 8×8 block.

There may be a non-linear low-pass directional filter. One reason for identifying the direction is to align the filter taps along that direction to reduce ringing while preserving the directional edges or patterns. However, directional filtering alone sometimes cannot sufficiently reduce ringing. It may also be desired to use filter taps on pixels that do not lie along the main direction. To reduce the risk of blurring, these extra taps are treated more conservatively. For this reason, CDEF defines primary taps and secondary taps. The complete 2-D CDEF filter may be expressed as $$y(i, j) = x(i, j) + \text{round}\left(\sum_{m,n} w_{d,m,n}^{(p)} f(x(m, n) - x(i, j), S^{(p)}, D) + \sum_{m,n} w_{d,m,n}^{(s)} f(x(m, n) - x(i, j), S^{(s)}, D)\right), \quad (14)$$

where D is the damping parameter, $S^{(p)}$ and $S^{(s)}$ are the strengths of the primary and secondary taps, respectively, and round(•) rounds ties away from zero, $w_k$ are the filter weights and f(d, S, D) is a constraint function operating on the difference between the filtered pixel and each of the neighboring pixels. For small differences, f(d, S, D)=d, making the filter behave like a linear filter. When the difference is large, f(d, S, D)=0, which effectively ignores the filter tap.

Loop Restoration

A set of in-loop restoration schemes are proposed for use in video coding post deblocking, to generally denoise and enhance the quality of edges, beyond the traditional deblocking operation. These schemes are switchable within a frame per suitably sized tile. The specific schemes described are based on separable symmetric Wiener filters and dual self-guided filters with subspace projection. Because content statistics can vary substantially within a frame, these tools are integrated within a switchable framework where different tools can be triggered in different regions of the frame.

There may be a separable symmetric wiener filter used as a restoration tool. Every pixel in a degraded frame could be reconstructed as a non-causal filtered version of the pixels within a w×w window around it where w=2r+1 is odd for integer r. If the 2D filter taps are denoted by a w2×1 element vector F in column-vectorized form, a straightforward LMMSE optimization leads to filter parameters being given by F=H−1 M, where H=E[XXT] is the autocovariance of x, the column-vectorized version of the w2 samples in the w×w window around a pixel, and M=E[YXT] is the cross correlation of x with the scalar source sample y, to be estimated. The encoder can estimate H and M from realizations in the deblocked frame and the source and send the resultant filter F to the decoder. However, that would not only incur a substantial bit rate cost in transmitting w2 taps, but also non-separable filtering will make decoding prohibitively complex. Therefore, several additional constraints are imposed on the nature of F. First, F is constrained to be separable so that the filtering can be implemented as separable horizontal and vertical w-tap convolutions. Second, each of the horizontal and vertical filters are constrained to be symmetric. Third, the sum of both the horizontal and vertical filter coefficients is assumed to sum to 1.

There may be dual self-guided filtering with subspace projection for image filtering where a local linear model:

$$y = Fx + G \quad (15)$$

which is used to compute the filtered output y from an unfiltered sample x, where F and G are determined based on the statistics of the degraded image and a guidance image in the neighborhood of the filtered pixel. If the guide image is the same as the degraded image, the resultant so-called self-guided filtering has the effect of edge preserving smoothing. The specific form of self-guided filtering we propose depends on two parameters: a radius r and a noise parameter e, and is enumerated as follows:

1. Obtain mean µ and variance $\sigma^2$ of pixels in a (2r+1)× (2r+1) window around every pixel. This can be implemented efficiently with box filtering based on integral imaging.
2. Compute for every pixel: $f = \sigma^2/(\sigma^2+e)$; $g=(1-f)\mu$
3. Compute F and G for every pixel as averages off and g values in a 3×3 window around the pixel for use.

Filtering may be controlled by r and e, where a higher r implies a higher spatial variance and a higher e implies a higher range variance.

Figure 28:
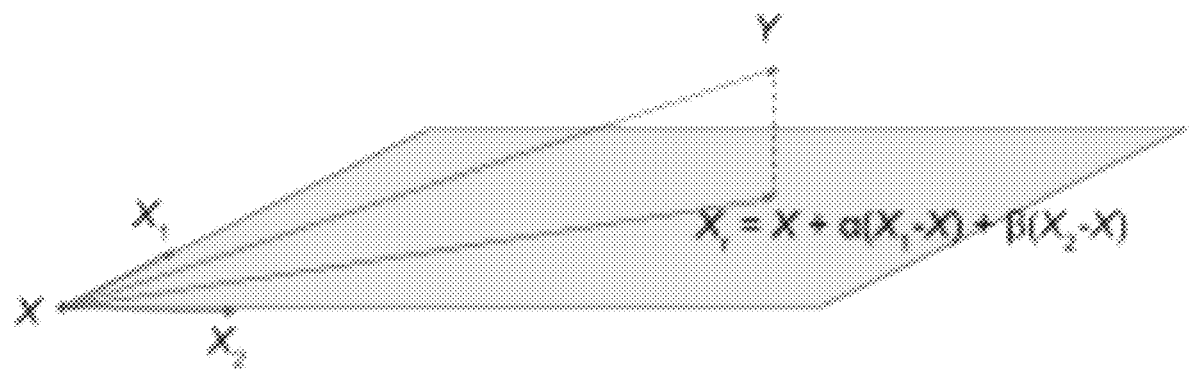
FIG. 28 shows an example of subspace projection.

FIG. 28 shows an example of subspace projection. The principle of subspace projection is illustrated diagrammatically in FIG. 28. Even though none of the cheap restorations X1, X2 are close to the source Y, appropriate multipliers {α, β} can bring them much closer to the source as long as they are moving somewhat in the right direction.

Cross-Component Sample Offset (CCSO)

A loop filtering approach may include Cross-Component Sample Offset (CCSO) to reduce distortion of reconstructed samples. In CCSO, given processed input reconstructed samples of a first color component, a non-linear mapping is used to derive output offset, and the output offset is added on the reconstruction sample of another color component in the filtering process of the proposed CCSO.

Figure 29:
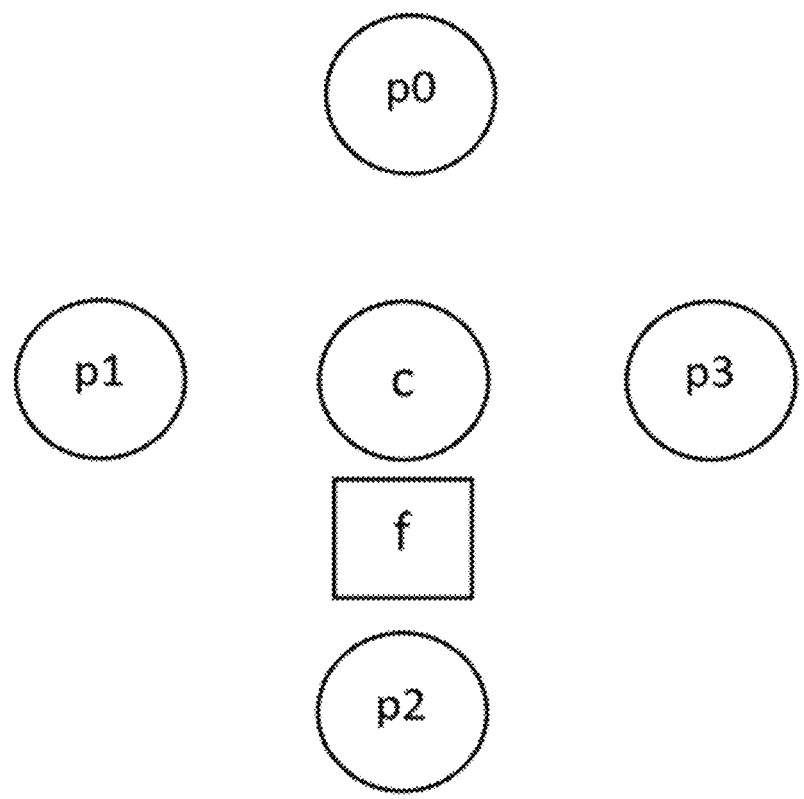
FIG. 29 shows an example of a filter support area.

FIG. 29 shows an example of a filter support area. The input reconstructed samples are from a first color component located in filter support area. As shown in FIG. 29, the filter support area includes four reconstructed samples: p0, p1, p2, p3. The four input reconstructed samples follow a cross-shape in vertical and horizontal direction. The center sample (denoted by c) in the first color component and the sample to be filtered in the second color component are co-located. When processing the input reconstructed samples, following steps are applied:

Step 1: The delta value between p0-p3 and c are computed first, denoted as m0, m1, m2, and m3.

Step 2: The delta value m0-m3 are further quantized, the quantized values are denoted as d0, d1, d2, d3. The quantized value can be −1, 0, 1 based on the following quantization process:

a. $d = -1$, if $m < -N$; (16)

b. $d = 0$, if $-N <= m <= N$; (17)

c. $d = 1$, if $m > N$. (18)

where N is called quantization step size, example values of N are 4, 8, 12, 16.

Variables d0-d3 may be used to identify one combination of the non-linear mapping. In this example, CCSO has four filter taps d0-d3, and each filter tap may have one of the three quantized values, so there are $3^4=81$ combinations in total. Table 4 (below) shows the 81 example combinations, the last column represents the output offset value for each combination. Example offset values are integers, such as 0, 1, −1, 3, −3, 5, −5, −7.

TABLE 4

Sample combinations identified by d0-d3

| Combination | d0 | d1 | d2 | d3 | Offset |
|---|---|---|---|---|---|
| 0 | −1 | −1 | −1 | −1 | s0 |
| 1 | −1 | −1 | −1 | 0 | s1 |
| 2 | −1 | −1 | −1 | 1 | s2 |
| 3 | −1 | −1 | 0 | −1 | s3 |
| 4 | −1 | −1 | 0 | 0 | s4 |
| 5 | −1 | −1 | 0 | 1 | s5 |
| 6 | −1 | −1 | 1 | −1 | s6 |
| 7 | −1 | −1 | 1 | 0 | s7 |
| 8 | −1 | −1 | 1 | 1 | s8 |
| 9 | −1 | 0 | −1 | −1 | s9 |
| 10 | −1 | 0 | −1 | 0 | s10 |
| 11 | −1 | 0 | −1 | 1 | s11 |
| 12 | −1 | 0 | 0 | −1 | s12 |
| 13 | −1 | 0 | 0 | 0 | s13 |
| 14 | −1 | 0 | 0 | 1 | s14 |
| 15 | −1 | 0 | 1 | −1 | s15 |
| 16 | −1 | 0 | 1 | 0 | s16 |
| 17 | −1 | 0 | 1 | 1 | s17 |
| 18 | −1 | 1 | −1 | −1 | s18 |
| 19 | −1 | 1 | −1 | 0 | s19 |
| 20 | −1 | 1 | −1 | 1 | s20 |
| 21 | −1 | 1 | 0 | −1 | s21 |
| 22 | −1 | 1 | 0 | 0 | s22 |
| 23 | −1 | 1 | 0 | 1 | s23 |
| 24 | −1 | 1 | 1 | −1 | s24 |
| 25 | −1 | 1 | 1 | 0 | s25 |
| 26 | −1 | 1 | 1 | 1 | s26 |
| 27 | 0 | −1 | −1 | −1 | s27 |
| 28 | 0 | −1 | −1 | 0 | s28 |
| 29 | 0 | −1 | −1 | 1 | s29 |
| 30 | 0 | −1 | 0 | −1 | s30 |
| 31 | 0 | −1 | 0 | 0 | s31 |
| 32 | 0 | −1 | 0 | 1 | s32 |
| 33 | 0 | −1 | 1 | −1 | s33 |
| 34 | 0 | −1 | 1 | 0 | s34 |
| 35 | 0 | −1 | 1 | 1 | s35 |
| 36 | 0 | 0 | −1 | −1 | s36 |
| 37 | 0 | 0 | −1 | 0 | s37 |
| 38 | 0 | 0 | −1 | 1 | s38 |
| 39 | 0 | 0 | 0 | −1 | s39 |
| 40 | 0 | 0 | 0 | 0 | s40 |
| 41 | 0 | 0 | 0 | 1 | s41 |
| 42 | 0 | 0 | 1 | −1 | s42 |
| 43 | 0 | 0 | 1 | 0 | s43 |
| 44 | 0 | 0 | 1 | 1 | s44 |
| 45 | 0 | 1 | −1 | −1 | s45 |
| 46 | 0 | 1 | −1 | 0 | s46 |
| 47 | 0 | 1 | −1 | 1 | s47 |
| 48 | 0 | 1 | 0 | −1 | s48 |
| 49 | 0 | 1 | 0 | 0 | s49 |
| 50 | 0 | 1 | 0 | 1 | s50 |
| 51 | 0 | 1 | 1 | −1 | s51 |
| 52 | 0 | 1 | 1 | 0 | s52 |
| 53 | 0 | 1 | 1 | 1 | s53 |
| 54 | 1 | −1 | −1 | −1 | s54 |
| 55 | 1 | −1 | −1 | 0 | s55 |
| 56 | 1 | −1 | −1 | 1 | s56 |
| 57 | 1 | −1 | 0 | −1 | s57 |
| 58 | 1 | −1 | 0 | 0 | s58 |
| 59 | 1 | −1 | 0 | 1 | s59 |
| 60 | 1 | −1 | 1 | −1 | s60 |
| 61 | 1 | −1 | 1 | 0 | s61 |
| 62 | 1 | −1 | 1 | 1 | s62 |
| 63 | 1 | 0 | −1 | −1 | s63 |
| 64 | 1 | 0 | −1 | 0 | s64 |
| 65 | 1 | 0 | −1 | 1 | s65 |
| 66 | 1 | 0 | 0 | −1 | s66 |
| 67 | 1 | 0 | 0 | 0 | s67 |
| 68 | 1 | 0 | 0 | 1 | s68 |
| 69 | 1 | 0 | 1 | −1 | s69 |
| 70 | 1 | 0 | 1 | 0 | s70 |
| 71 | 1 | 0 | 1 | 1 | s71 |
| 72 | 1 | 1 | −1 | −1 | s72 |
| 73 | 1 | 1 | −1 | 0 | s73 |
| 74 | 1 | 1 | −1 | 1 | s74 |
| 75 | 1 | 1 | 0 | −1 | s75 |
| 76 | 1 | 1 | 0 | 0 | s76 |
| 77 | 1 | 1 | 0 | 1 | s77 |
| 78 | 1 | 1 | 1 | −1 | s78 |
| 79 | 1 | 1 | 1 | 0 | s79 |
| 80 | 1 | 1 | 1 | 1 | s80 |

The final filtering process of CCSO is applied as follows:

$$f'=\text{clip}(f+s), \quad (19)$$

where f is the reconstructed sample to be filtered, and s is the output offset value retrieved from Table 4, the filtered sample value f' is further clipped into the range associated with bit-depth.

Local sample offset (LSO) is another example offset embodiment. In LSO, the similar filtering approach in CCSO is applied, but the output offsets are applied on a color component that is the same color component of which the reconstructed samples are used as the input to the filtering process.

In an alternative embodiment, a simplified CCSO design may be adopted into the reference software of AV2, i.e., AVM for CWG-B022.

Figure 30:
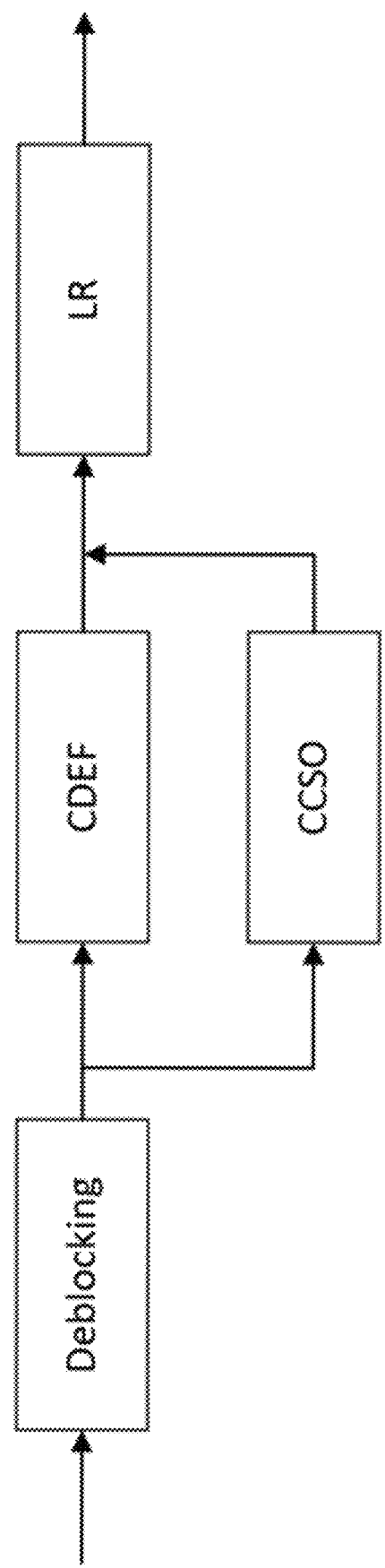
FIG. 30 shows an example loop filter pipeline.

FIG. 30 shows an example loop filter pipeline. CCSO is a loop filter process that is performed in parallel to CDEF in the loop filter pipeline, i.e., the input is same with CDEF, and the output is applied on CDEF filtered samples, as illustrated in FIG. 30. It is noted that CCSO may be applied only on chroma color components.

FIG. 31 shows example inputs of cross-component sample offset (CCSO). The CCSO filter is applied on chroma reconstructed sample, denoted as rc. The co-located luma reconstructed sample of rc is denoted as rl. An example of CCSO filter is shown in FIG. 31. In CCSO, a set of 3-tap filters are used. The input luma reconstructed samples located at the three filter taps include rl in the center, and two neighboring samples $p_0$ and $p_1$.

Given $p_i$ and rl, where i=0, 1, following steps are applied to process the input samples:

The delta value between $p_i$ and rl is computed first, denoted as $m_i$

The delta value $m_i$ is quantized as $d_i$, using the following quantization process:
  $d_i$ is set equal to −1 when m is less than $-Q_{CCSO}$
  $d_i$ is set equal to 0 when m is between $-Q_{CCSO}$ and $Q_{CCSO}$, inclusive
  $d_i$ is set equal to 1 when m is greater than $Q_{CCSO}$ In the above steps, $Q_{CCSO}$ is called quantization step size, $Q_{CCSO}$ can be 8, 16, 32, 64.

After $d_0$ and $d_1$ are calculated, the offset value (denoted as s) is derived using the look-up table (LUT) of CCSO. The LUT of CCSO is shown in Table 5. Each combination of $d_0$ and $d_1$ is used to identify a row in the LUT to retrieve the offset value. The offset values are integers including 0, 1, −1, 3, −3, 5, −5 and −7.

TABLE 5

The look-up table (LUT) used in CCSO

| combination index | d0 | d1 | offset |
|---|---|---|---|
| 0 | −1 | −1 | s0 |
| 1 | −1 | 0 | s1 |
| 2 | −1 | 1 | s2 |
| 3 | 0 | −1 | s3 |
| 4 | 0 | 0 | s4 |
| 5 | 0 | 1 | s5 |
| 6 | 1 | −1 | s6 |
| 7 | 1 | 0 | s7 |
| 8 | 1 | 1 | s8 |

Finally, the derived offset of CCSO is applied on chroma colour component as follows:

$$rc' = clip(rc+s), \quad (20)$$

where rc is the reconstructed sample to be filtered by CCSO, and s is the derived offset value retrieved from the LUT, the filtered sample value rc' is further clipped into the range specified by the bit depth.

Figure 32:
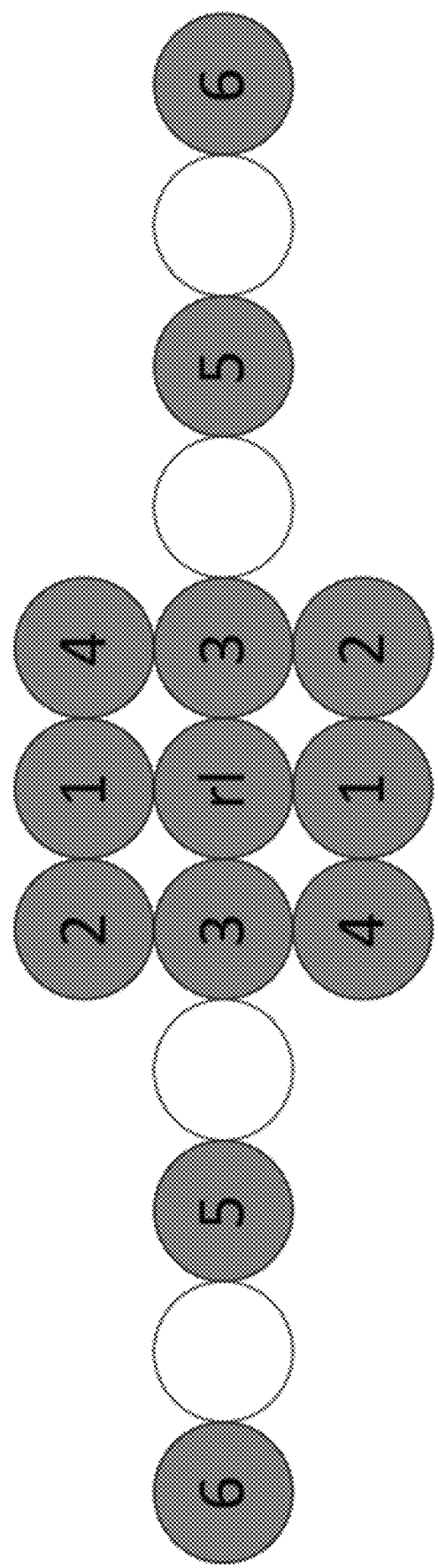
FIG. 32 shows example filter shapes in cross-component sample offset (CCSO)

FIG. 32 shows example filter shapes in cross-component sample offset (CCSO). In CCSO, there are six optional filter shapes, denoted as $f_i$, i=1 . . . 6, as shown in FIG. 32. These six filter shapes are switchable at frame level, and the selection is signaled by a syntax ext_filter_support using 3-bit fixed length code.

Signaling of cross-component sample offset (CCSO) may be performed at both frame-level and block-level. At frame-level, the signals may include:
  A 1-bit flag indicating whether CCSO is applied
  A 3-bit syntax ext_filter_support indicating the selection of CCSO filter shape
  A 2-bit index indicating the selection of quantization step size
  Nine 3-bit offset values used in the LUT
At 128×128 chroma block-level, a flag is signaled to indicate whether the CCSO filter is enabled or not.

Sample Adaptive Offset (SAO)

In HEVC, Sample Adaptive Offset (SAO) is applied to the reconstruction signal after the deblocking filter by using the offset values given in the slice header. For luma samples, the encoder decides on whether the SAO is applied for current slice. If SAO is enabled, the current picture allows recursive splitting into four sub-regions and each region can select one of six SAO types as shown in Table 6. SAO classifies reconstructed pixels into categories and reduces the distortion by adding an offset to pixels of each category in current region. Edge properties are used for pixel classification in SAO types 1-4, and pixel intensity is used for pixel classification in SAO types 5-6.

TABLE 6

Specification of SAO type

| SAO type | sample adaptive offset type to be used | Number of categories |
|---|---|---|
| 0 | None | 0 |
| 1 | 1-D 0-degree pattern edge offset | 4 |
| 2 | 1-D 90-degree pattern edge offset | 4 |

TABLE 6-continued

Specification of SAO type

| SAO type | sample adaptive offset type to be used | Number of categories |
|---|---|---|
| 3 | 1-D 135-degree pattern edge offset | 4 |
| 4 | 1-D 45-degree pattern edge offset | 4 |
| 5 | central bands band offset | 16 |
| 6 | side bands band offset | 16 |

Band offset (BO) classifies all pixels of a region into multiple bands where each band contains pixels in the same intensity interval. The intensity range is equally divided into 32 intervals from zero to the maximum intensity value (e.g. 255 for 8-bit pixels), and each interval has an offset. Next, the 32 bands are divided into two groups. One group consists of the central 16 bands, while the other group consists of the rest 16 bands. Only offsets in one group are transmitted. Regarding the pixel classification operation in BO, the five most significant bits of each pixel can be directly used as the band index.

Figure 33:
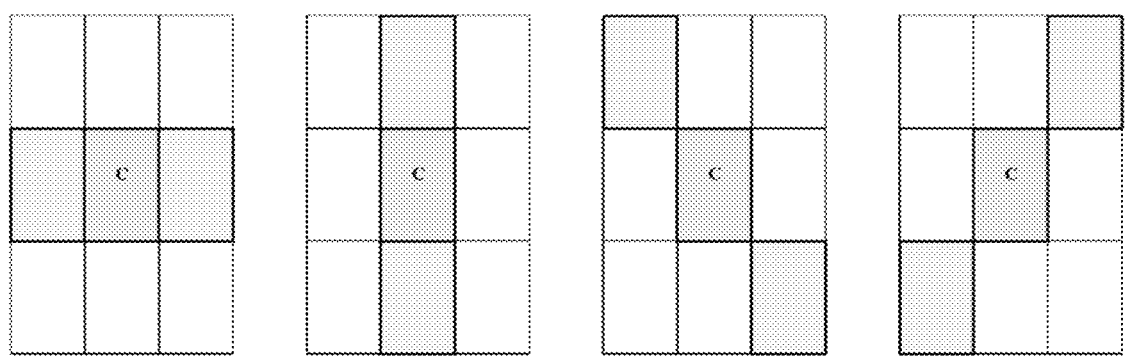
FIG. 33 shows example pixel patterns.

FIG. 33 shows example pixel patterns. Edge offset (EO) uses four 1-D 3-pixel patterns for pixel classification with consideration of edge directional information, as shown in FIG. 33. Each region of a picture can select one pattern to classify pixels into multiple categories by comparing each pixel with its two neighboring pixels. The selection will be sent in bit-stream as side information. Table 7 shows the pixel classification rule for EO.

TABLE 7

Pixel classification rule for edge offset (EO)

| Category | Condition |
|---|---|
| 1 | c < 2 neighbors |
| 2 | c < 1 neighbor && c == 1 neighbor |
| 3 | c > 1 neighbor && c == 1 neighbor |
| 4 | c > 2 neighbors |
| 0 | None of the above |

The SAO on the decoder side may be operated LCU-independently so that the line buffers can be saved. In order to achieve this, pixels of the top and bottom rows in each LCU may not be SAO processed when the 90-degree, 135-degree, and 45-degree classification patterns are chosen. Pixels of the leftmost and rightmost columns in each LCU may not be SAO processed when the 0-degree, 135-degree, and 45-degree patterns are chosen.

The following Table 8 illustrates example syntaxes that may need to be signaled for a CTU if the parameters are not merged from neighboring CTU:

TABLE 8

Sample adaptive offset VLC syntax

| | Descriptor |
|---|---|
| sao_offset_vlc( rx, ry, cIdx ) { | |
|   sao_type_idx[ cIdx ][ rx ][ ry ] | ue(v) |
|   if( sao_type_idx[ cIdx ][ rx ][ ry ] = =5 ) { | |
|     sao_band_position[ cIdx ][ rx ][ ry ] | u(5) |
|     for( i = 0; i < 4; i++ ) | |
|       sao_offset[ cIdx ][ rx ][ ry ][ i ] | se(v) |
|   } else if( sao_type_idx[ cIdx ][ rx ][ ry ] != 0 ) | |

TABLE 8-continued

Sample adaptive offset VLC syntax

| | Descriptor |
|---|---|
| for( i = 0; i < 4; i++ )  sao_offset[ cIdx ][ rx ][ ry ][ i ] | ue(v) |
| } | |

Cross-Component Sample Offset (CCSO) and Local Sample Offset (LSO) can utilize the value of pixel to be filtered for selecting offset value on one color component. However, further extending those inputs for offset selection may significantly increase the overhead of signaling of CCSO and LSO, which may limit/reduce the coding performance, especially for smaller resolution sequences.

As described, CCSO is defined as a filtering process which uses the reconstructed samples of a first color component as input (e.g., Y or Cb or Cr), and the output is applied on a second color component which is a different color component of the first color component. An example filter shape of CCSO is shown in FIG. 29. The LSO is a filtering process which uses the reconstructed samples of a first color component as input (e.g., Y or Cb or Cr), and the output is applied on the same first color component. Accordingly, a difference between LSO and CCSO is different inputs.

As described below and illustrated in FIG. 34, a generalized design for CCSO and LSO is presented by not only considering the delta value between neighboring samples of collocated (or current) sample, as considered in CCSO and LSO, but also considering the level value of the collocated (or current) sample itself.

Figure 34:
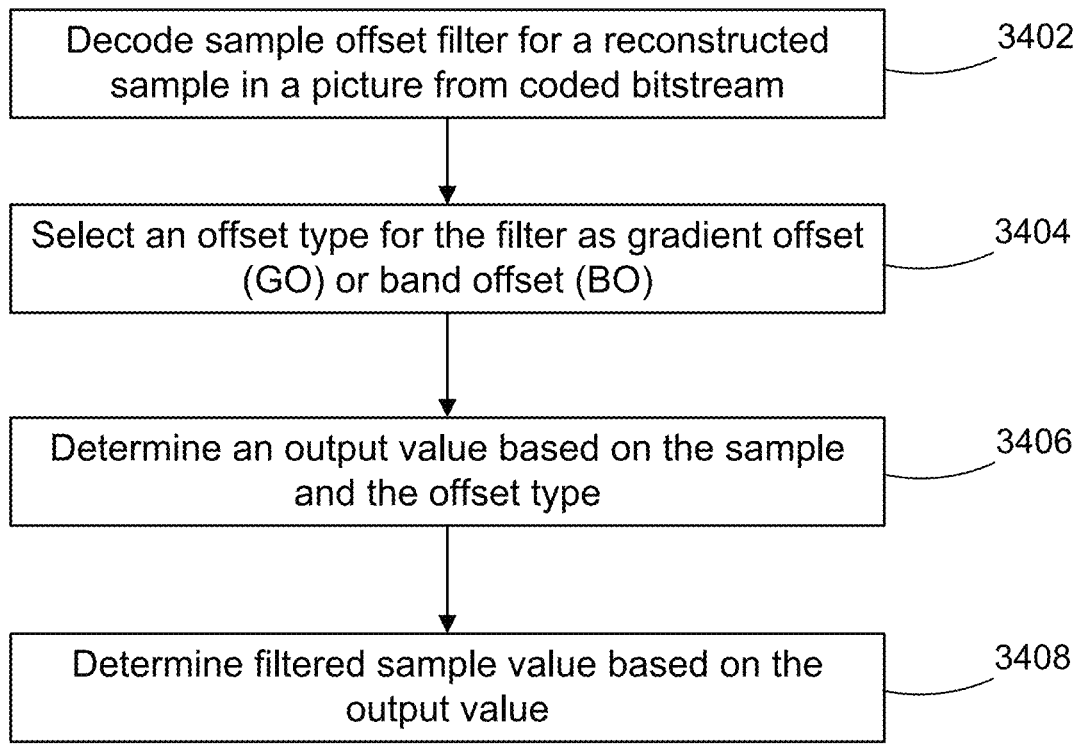
FIG. 34 shows a flow chart of a method according to an example embodiment of the disclosure.

FIG. 34 shows a flow chart of a method according to an example embodiment of the disclosure. In block 3402, coded information for a reconstructed sample of a current component in a current picture from a coded video bitstream is decoded. The coded information indicates a sample offset filter to be applied to the reconstructed sample. The sample offset filter may include two types of offset values in one example, a gradient offset (GO) and a band offset (BO). In block 3404, the offset type is selected to be used with the sample offset filter. In block 3406, an output value of the sample offset filter is determined based on the first reconstructed samples and the selected offset type. In block 3408, a filtered sample value of the reconstructed sample of the current component is determined based on the reconstructed sample and the output value of the sample offset filter. Further embodiments are described below.

A generalized sample offset (GSO) method may include two types of offset values for CCSO and LSO, including a gradient offset (GO) and band offset (BO). The selection of the offset type can be either signaled or implicitly derived.

In one embodiment, the gradient offset may be an offset derived using the delta value between neighboring samples and a co-located sample of a different color component (in the case of CCSO) or the delta value between neighboring samples and the current sample to be filtered (in the case of CCSO or LSO).

In one embodiment, the band offset may be an offset derived using the value of co-located sample of a different color component or the current sample to be filtered. The band may be used to determine the offset value. In one example, the value of co-located sample of a different color component or the current sample to be filtered may be denoted as a variable v, and the BO value is derived using v>>s, where >> indicates right shift operation, s is a predefined value specifying the interval of sample values that use the same band offset. In one example, the value of s can vary for different color components. In another example, the value of co-located sample of a different color component or the current sample to be filtered is denoted as a variable v, and a band index bi is derived using a predefined lookup table, wherein the input of the lookup table is v and the output value is a band index bi, and the BO value is derived using the band index bi.

In one embodiment, when a combination of GO and BO is applied (e.g. used at the same time), the offset is derived using both 1) the delta value between neighboring samples and co-located sample of a different color component (in the case of CCSO) or the delta value between neighboring samples and the current sample to be filtered (in the case of CCSO or LSO); and 2) the value of co-located sample of a different color component or the current sample to be filtered.

In one embodiment, the application of GO or BO is signaled. This signaling may be applied in high-level syntax. As a few examples, the signaling may include VPS, PPS, SPS, Slice header, picture header, frame header, superblock header, CTU header, tile header.

In another embodiment, whether GO or BO is signaled in at block level, the said block level includes, but is not limited to coding unit (block) level, prediction block level, transform block level, or filtering unit level. This example includes signaling at the block level to identify GO or BO.

In another embodiment, GO or BO is signaled using a flag. A flag is first signaled to indicate whether LSO and/or CCSO is applied for one or multiple color components, then another flag is signaled to indicate whether GO or BO is applied. For example, a flag is first signaled to indicate whether LSO and/or CCSO is applied for one or multiple color components, then another flag is signaled to indicate whether GO is applied jointly with BO, where BO is always applied regardless whether GO is applied or not. In another example, a flag is first signaled to indicate whether LSO and/or CCSO is applied for one or multiple color components, then another flag is signaled to indicate whether BO is applied jointly with GO, where GO is always applied regardless whether BO is applied or not.

In some embodiments, the signal may be derived for determining whether to use GO or BO or a combination of them. It may be implicitly derived using coded information, including but not limited to reconstructed sample of current color component and/or a different color component, whether the current block is intra or inter coded, whether the current picture is a key (or intra) picture, whether the current sample (or block) is coded by a specific prediction mode (such as a specific intra or inter prediction mode, a transform selection mode, the quantization parameter.

As described, LSO may be similar to CCSO, but the output offsets are applied on a color component that is the same as the color component of which the reconstructed samples are used as the input to the filtering process. GSO is a generalized design that considers two types of offset values, including a gradient offset (GO), which considers a delta value between neighboring samples of a collocated or current sample, and a band offset (BO), which considers the level value of the current sample itself.

Additionally, the signaling aspects CCSO, LSO, and GSO may be categorized into a frame level and a block level. At the frame level, the enabling of CCSO, LSO, and/or GSO may be signaled (such as by using a 1-bit flag), and/or the offset value(s) of the LUT may be signaled (such as by using three-bits each). At the block level, for an M×N block, a flag is signaled to indicate the enabling of CCSO, LSO, and/or GSO for a current block. In various embodiments, the values of M and N each may include, but are not limited to, 16, 32, 64, 128, or 256. As used herein, the term block refers to a region of the frame.

The following describes adaptive application of GSO.

As described, CCSO is defined as a filtering process which uses the reconstructed samples of a first color component as input (e.g., Y or Cb or Cr), and the output is applied on a second color component that is a different color component than the first color component. An example filter shape of CCSO is shown in FIG. 29. In addition, LSO is a filtering process which uses the reconstructed samples of a first color component as input (e.g., Y or Cb or Cr), and the output is applied on the same first color component. GSO is a filtering process which can be considered as a generalized design for CCSO and LSO and utilizes the delta value between neighboring samples of a collocated (or current) sample, as in CCSO and LSO, and also considers the level value of the current sample. Two types of offset values are used in GSO, namely: Gradient offset (GO), which corresponds to the delta value between neighboring samples of a collocated or current sample, and a Band offset (BO), which corresponding to the level value of the current sample itself.

Figure 35:
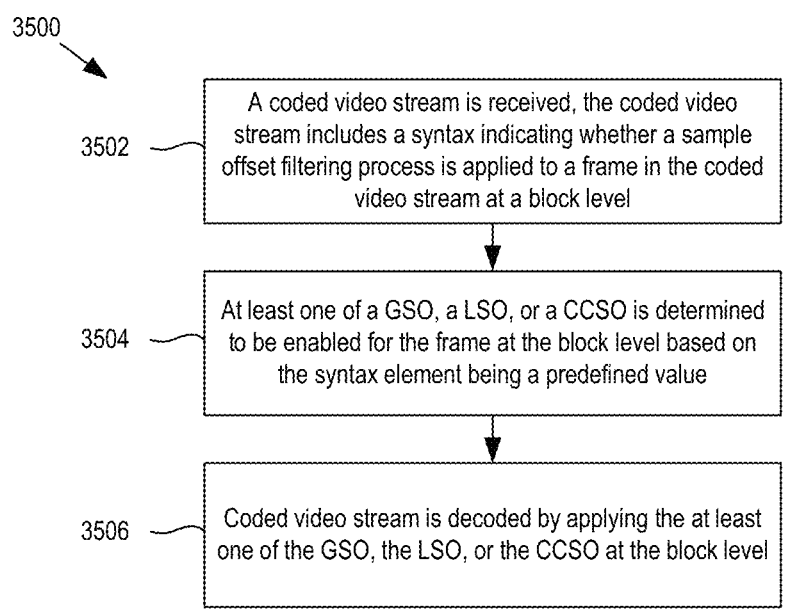
FIG. 35 shows a flow chart of another method according to an example embodiment of the disclosure.

FIG. 35 shows a flow chart of a method 3500 according to an example embodiment of the disclosure. The example method 3500 may be performed by an apparatus configured to decode a video stream, such as the video decoder (510) or the video decoder (810) described above. At least some of the actions in the method of FIG. 35 may be performed by a loop filter, such as the loop filter (556) in FIG. 5.

At block 3502, a coded video stream (e.g., a bitstream) is received. The coded video stream includes a syntax element that indicates whether a sample offset filtering process is applied to a frame in the coded video stream at a block level. At block 3504, at least one of: a GSO, a LSO, or a CCSO is determined to be enabled for the frame at the block level based on the syntax element being a predefined value. The predefined value may be one of a plurality of predefined values. Each of the plurality of predefined values may indicate whether a particular sample offset process (GSO, LSO, or CCSO), or a particular combination of two or more sample offset processes (two or more of GSO, LSO, CCSO) is enabled. Accordingly, in some embodiments, at block 3504, at least the GSO is determined to be enabled. In addition or alternatively, at least the LSO is determined to be enabled. In addition or alternatively, at least the CCSO is determined to be enabled. At block 3506, the coded video stream may be decoded by applying the at least one of the GSO, the LSO, or the CCSO at the block level. For example, the at least one of the GSO, the LSO, or the CCSO that is applied at block 3506 may correspond to, or be based on, the GSO, the LSO, and/or the CCSO that is determined to be enabled at block 3504. That is, if GSO is determined to be enabled at block 3504, then GSO may be applied at block 3506; if LSO is determined to be enabled at block 3504, then LSO may be applied at block 3506; and if CCSO is determined to be enabled at block 3504, then CCSO may be applied at block 3506. For at least some embodiments of the method 3500, a block size of the frame in the coded video stream is different for a luma component and a chroma component in the corresponding frame.

In some embodiments, applying the at least one of the GSO, the LSO, or the CCSO at block 3506 includes applying the GSO, where a first block size of a luma component is the same as or smaller than a second block size of the chroma component. For example, the granularity of application of GSO is finer for the luma component compared to the chroma component. As an example, M×N used for luma GSO is 128×128 or smaller when that of chroma is 128×128. The values of M and N may include but are not limited to 16, 32, 64, 128, or 256.

In some embodiments, the method 3500 may further include receiving a signal indicating a first block-level flag for a luma component having a first block size that is the same as or smaller than a second block size of a chroma component when a second block-level flag for the chroma component having the second block size is signaled. For example, the granularity of signaling a block-level flag is finer for a luma component compared to a chroma component. As an example, the block level flag is signaled for block sizes 128×128 or smaller when that of chroma component is signaled for 128×128 size blocks.

In some embodiments, a block-level flag indicating whether one of CCSO, LSO, or GSO is enabled or disabled, such as for application to a block, may also indicate whether another of CCSO, LSO, or GSO is enabled or disabled for the block. For example, a block-level flag indicating that CCSO is enabled for the chroma component of a block may also indicate that LSO is enabled for the luma component of the block. Likewise, a block-level flag indicating that LSO is enabled for the luma component of a block may also indicate that CCSO is enabled for the chroma component of the block. As an example, a block-level flag indicating whether CCSO is enabled or applied for a block may depend on a block level flag indicating whether LSO is enabled or applied for the block, and/or a block-level flag indicating whether LSO is applied for a block may depend on a block level flag indicating whether CCSO is applied for the block. In addition or alternatively, a block-level flag indicating whether CCSO or LSO is applied for a block can be used as a context for signaling a block-level flag to indicate whether LSO or CCSO, respectively, is applied for the block.

In some embodiments, the method 3500 may further include receiving, in a high-level syntax, a signal indicating a granularity of at least one of a chroma component or a luma component for application of the GSO, wherein the high-level syntax comprises: a video parameter set (VPS), a picture parameter set (PPS), a sequence parameter setting (SPS), an adaptation parameter set (APS), a frame header, a slice header, a picture header, a tile header, a superblock header, or a coding tree unit (CTU) header. For example, the granularity of application of GSO for the luma component and/or for the chroma component can be signaled in a high-level syntax that includes, but not limited to, VPS, PPS, SPS, APS, frame header, slice header, picture header, tile header, superblock header, and/or CTU header.

In some embodiments, the syntax element is or includes a high-level syntax, the GSO is enabled by the high-level syntax, and method 3500 may further include receiving a signal comprising an additional high-level syntax to indicate a maximum number of bands used for a band offset. For example, when GSO is enabled by a high-level syntax, an additional high-level syntax is signaled to indicate the maximum number of bands used for BO. For some of these embodiments, the high-level syntax includes, but is not limited to, VPS, PPS, SPS, APS, frame header, slice header, picture header, tile header, superblock header, and/or CTU header.

In some embodiments, a block-level flag enables the GSO for a block, and the method 3500 may further include receiving a signal comprising an additional high-level syntax to indicate a number of bands used for a band offset (BO) in the block. For example, when the block level flag enables GSO for a block, an additional block level syntax is signaled to indicate the number of bands used for BO in that block. In some of these embodiments, the number of bands for the band offset in the block is less than a number of bands signaled at a frame level. For example, the number of bands used for BO at block level is always less than or equal to maximum number of bands that was signaled at frame level. In addition or alternatively, the syntax element is or includes a high-level syntax, and the method 3500 may further include: receiving a signal comprising a flag to indicate whether a single band or a maximum number of bands specified in the high-level syntax is applied for a current block. For example, a flag is signalled to indicate whether a single band or the maximum number of bands specified in high-level syntax is applied for the current block.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. The term block may include a prediction block, a coding block, or a coding unit, i.e. CU. Embodiments in the disclosure may be applied to a luma block or a chroma block.

The techniques described above, can be implemented as computer software using computer-readable instructions and physically stored in one or more computer-readable media. For example, FIG. 36 shows a computer system (3600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 36:
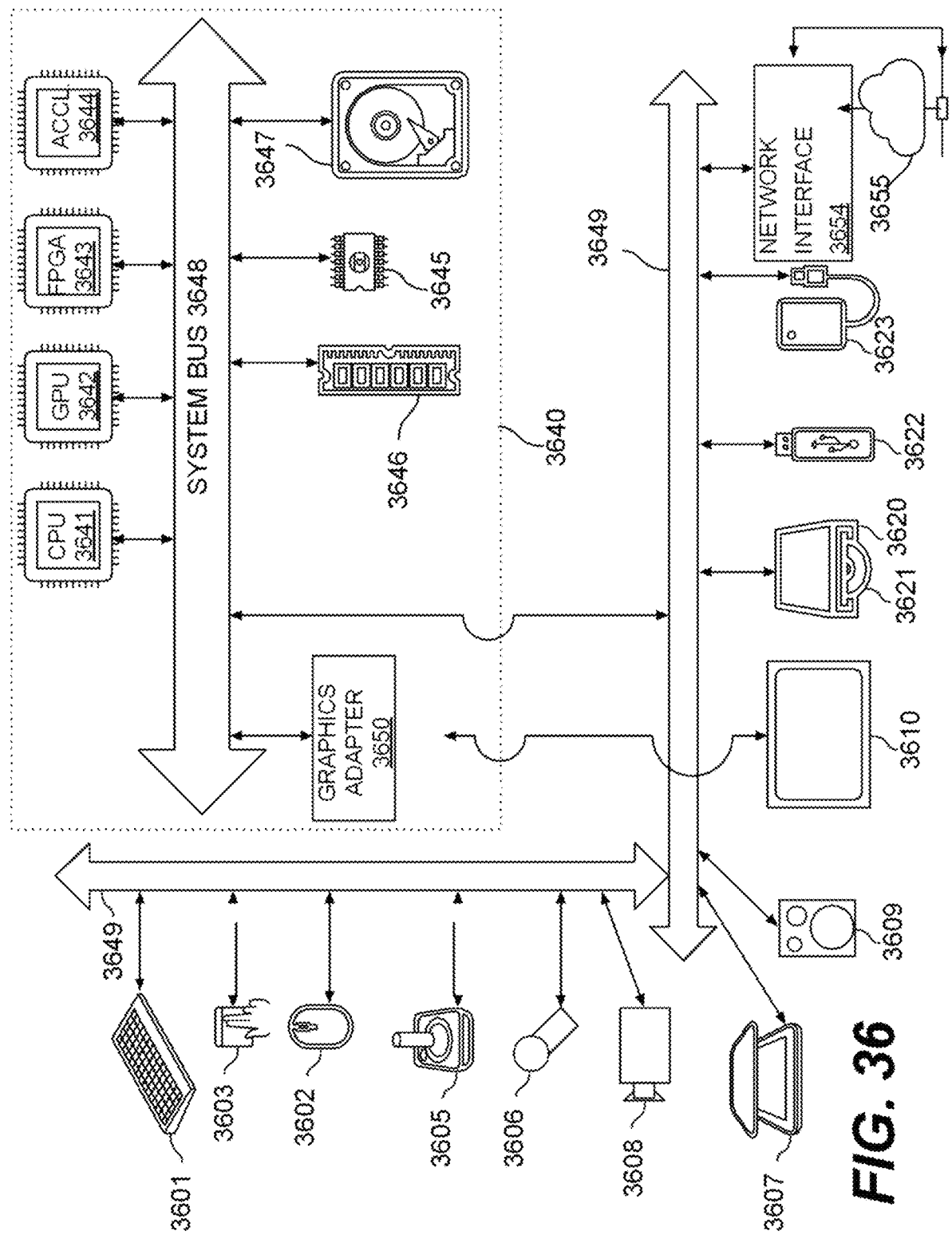
FIG. 36 shows a schematic illustration of a computer system in accordance with example embodiments of the disclosure.

The components shown in FIG. 36 for computer system (3600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (3600).

Computer system (3600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (3601), mouse (3602), trackpad (3603), touch screen (3610), data-glove (not shown), joystick (3605), microphone (3606), scanner (3607), camera (3608).

Computer system (3600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (3610), data-glove (not shown), or joystick (3605), but there can also be tactile feedback devices that do not serve as input devices), audio output devices (such as: speakers (3609), headphones (not depicted)), visual output devices (such as screens (3610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (3600) can also include human accessible storage devices and their associated media such as optical media including CD/DVD ROM/RW (3620) with CD/DVD or the like media (3621), thumb-drive (3622), removable hard drive or solid state drive (3623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (3600) can also include an interface (3654) to one or more communication networks (3655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (3649) (such as, for example USB ports of the computer system (3600)); others are commonly integrated into the core of the computer system (3600) by attachment to a system bus as described below (for example Ethernet interface into a PC computer system or cellular network interface into a smartphone computer system). Using any of these networks, computer system (3600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (3640) of the computer system (3600).

The core (3640) can include one or more Central Processing Units (CPU) (3641), Graphics Processing Units (GPU) (3642), specialized programmable processing units in the form of Field Programmable Gate Areas (FPGA) (3643), hardware accelerators for certain tasks (3644), graphics adapters (3650), and so forth. These devices, along with Read-only memory (ROM) (3645), Random-access memory (3646), internal mass storage such as internal non-user accessible hard drives, SSDs, and the like (3647), may be connected through a system bus (3648). In some computer systems, the system bus (3648) can be accessible in the form of one or more physical plugs to enable extensions by additional CPUs, GPU, and the like. The peripheral devices can be attached either directly to the core's system bus (3648), or through a peripheral bus (3649). In an example, the screen (3610) can be connected to the graphics adapter (3650). Architectures for a peripheral bus include PCI, USB, and the like.

CPUs (3641), GPUs (3642), FPGAs (3643), and accelerators (3644) can execute certain instructions that, in combination, can make up the aforementioned computer code. That computer code can be stored in ROM (3645) or RAM (3646). Transitional data can also be stored in RAM (3646), whereas permanent data can be stored for example, in the internal mass storage (3647). Fast storage and retrieve to any of the memory devices can be enabled through the use of cache memory, that can be closely associated with one or more CPU (3641), GPU (3642), mass storage (3647), ROM (3645), RAM (3646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (3600), and specifically the core (3640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (3640) that are of non-transitory nature, such as core-internal mass storage (3647) or ROM (3645). The software implementing various embodiments of the present disclosure can be stored in such devices and executed by core (3640). A computer-readable medium can include one or more memory devices or chips, according to particular needs. The software can cause the core (3640) and specifically the processors therein (including CPU, GPU, FPGA, and the like) to execute particular processes or particular parts of particular processes described herein, including defining data structures stored in RAM (3646) and modifying such data structures according to the processes defined by the software. In addition, or as an alternative, the computer system can provide functionality as a result of logic hardwired or otherwise embodied in a circuit (for example: accelerator (3644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

ALF: Adaptive Loop Filter
AMVP: Advanced Motion Vector Prediction
APS: Adaptation Parameter Set
ASIC: Application-Specific Integrated Circuit
AV1: AOMedia Video 1
AV2: AOMedia Video 2
BCW: Bi-prediction with CU-level Weights
BM: Bilateral Matching
BMS: benchmark set
CANBus: Controller Area Network Bus
CC-ALF: Cross-Component Adaptive Loop Filter
CCSO: Cross-Component Sample Offset
CD: Compact Disc
CDEF: Constrained Directional Enhancement Filter
CDF: Cumulative Density Function
CfL: Chroma from Luma
CIIP: Combined intra-inter prediction
CPUs: Central Processing Units
CRT: Cathode Ray Tube
CTB: Coding Tree Block
CTBs: Coding Tree Blocks
CTU: Coding Tree Unit
CTUs: Coding Tree Units
CU: Coding Unit
DMVR: Decoder-side Motion Vector Refinement
DPB: Decoded Picture Buffer
DPS: Decoding Parameter Set
DVD: Digital Video Disc
FPGA: Field Programmable Gate Areas
GBI: Generalized Bi-prediction
GOPs: Groups of Pictures
GPUs: Graphics Processing Units
GSM: Global System for Mobile communications
HDR: high dynamic range
HEVC: High Efficiency Video Coding
HRD: Hypothetical Reference Decoder
IBC (or IntraBC): Intra Block Copy
IC: Integrated Circuit
ISP: Intra Sub-Partitions
JEM: joint exploration model
JVET: Joint Video Exploration Team
LAN: Local Area Network
LCD: Liquid-Crystal Display
LCU: Largest Coding Unit
LR: Loop Restoration Filter
LSO: Local Sample Offset
LTE: Long-Term Evolution
MMVD: Merge Mode with Motion Vector Difference
MPM: most probable mode
MV: Motion Vector
MV: Motion Vector
MVD: Motion Vector difference
MVD: Motion vector difference
MVP: Motion Vector Predictor
OLED: Organic Light-Emitting Diode
PBs: Prediction Blocks
PCI: Peripheral Component Interconnect
PDPC: Position Dependent Prediction Combination
PLD: Programmable Logic Device POC: Picture Order Count
PPS: Picture Parameter Set
PU: Prediction Unit
PUs: Prediction Units
RAM: Random Access Memory
ROM: Read-Only Memory
RPS: Reference Picture Set
SAD: Sum of Absolute Difference
SAO: Sample Adaptive Offset
SB: Super Block
SCC: Screen Content Coding
SDP: Semi Decoupled Partitioning
SDR: standard dynamic range
SDT: Semi Decoupled Tree
SEI: Supplementary Enhancement Information
SNR: Signal Noise Ratio
SPS: Sequence Parameter Setting
SSD: solid-state drive
SST: Semi Separate Tree
TM: Template Matching
TU: Transform Unit
TUs: Transform Units,
USB: Universal Serial Bus
VPS: Video Parameter Set
VUI: Video Usability Information
VVC: versatile video coding
WAIP: Wide-Angle Intra Prediction

What is claimed is:

1. A method comprising:
receiving a coded video stream comprising a syntax element indicating whether a sample offset filtering process is applied to a frame in the coded video stream at a block level;
determining that at least one of: a generalized sample offset (GSO), a local sample offset (LSO), or a cross component sample offset (CCSO) is enabled for the frame at the block level based on the syntax element being a predefined value;
receiving a block-level flag indicating that one of the GSO, the LSO, or the CCSO is enabled for a block of the frame, wherein the block-level flag also indicates that another of the GSO, the LSO, or the CCSO is enabled for the block; and
decoding the coded video stream by applying the at least one of the GSO, the LSO, or the CCSO at the block level.

2. The method of claim 1, wherein determining that the at least one of the GSO, the LSO, or the CCSO is enabled comprises determining that the GSO is enabled based on the syntax element being the predefined value.

3. The method of claim 1, wherein determining that the at least one of the GSO, the LSO, or the CCSO is enabled comprises determining that the LSO is enabled based on the syntax element being the predefined value.

4. The method of claim 1, wherein determining that the at least one of the GSO, the LSO, or the CCSO is enabled comprises determining that the CCSO is enabled based on the syntax element being the predefined value.

5. The method of claim 1, further comprising:
receiving a signal indicating a first block-level flag for a luma component having a first block size that is the same as or smaller than a second block size of a chroma component when a second block-level flag for the chroma component having the second block size is signaled.

6. The method of claim 1, further comprising:
receiving, in a high-level syntax, a signal indicating a granularity of at least one of a chroma component or a luma component for application of the GSO, wherein the high-level syntax comprises: a video parameter set (VPS), a picture parameter set (PPS), a sequence parameter setting (SPS), an adaptation parameter set (APS), a frame header, a slice header, a picture header, a tile header, a superblock header, or a coding tree unit (CTU) header.

7. The method of claim 1, wherein the syntax element comprises a high-level syntax, the GSO enabled by the high-level syntax, the method further comprising:
receiving a signal comprising an additional high-level syntax to indicate a maximum number of bands used for a band offset.

8. The method of claim 7, wherein the high-level syntax comprises: a video parameter set (VPS), a picture parameter set (PPS), a sequence parameter setting (SPS), an adaptation parameter set (APS), a frame header, a slice header, a picture header, a tile header, a superblock header, or a coding tree unit (CTU) header.

9. The method of claim 1, wherein:
the block-level flag enables the GSO for the block,
the method further comprises:
receiving a signal comprising an additional high-level syntax to indicate a number of bands used for a band offset in the block.

10. The method of claim 9, wherein the number of bands for the band offset in the block is less than a number of bands signaled at a frame level.

11. The method of claim 9, wherein the syntax element comprises a high-level syntax, the method further comprising:
receiving a signal comprising a flag to indicate whether a single band or a maximum number of bands specified in the high-level syntax is applied for a current block.

12. The method of claim 1, wherein a block size of the frame in the coded video stream is different for a luma component and a chroma component corresponding to the frame.

13. An apparatus for encoding a video stream, the apparatus comprising:
a memory storing a plurality of instructions; and
a processor configured to execute the plurality of instructions, and upon execution of the plurality of instructions, is configured to:
receive a video stream;
determine a syntax element indicating whether a sample offset filtering process is applied to a frame in the video stream at a block level, the syntax element being a predefined value;
determine that at least one of: a generalized sample offset (GSO), a local sample offset (LSO), or a cross component sample offset (CCSO) is enabled for the frame at the block level based on the syntax element;
determine a block-level flag indicating that one of the GSO, the LSO, or the CCSO is enabled for a block of the frame, wherein the block-level flag also indicates that another of the GSO, the LSO, or the CCSO is enabled for the block; and
encode the video stream by application of the at least one of the GSO, the LSO, or the CCSO at the block level.

14. The apparatus of claim 13, wherein application of the at least one of the GSO, the LSO, or the CCSO comprises application of the GSO, and wherein a first block size of a luma component is the same as or smaller than a second block size of the chroma component.

15. The apparatus of claim 13, wherein the processor, upon execution of the plurality of instructions, is further configured to:
  determine a signal indicating a first block-level flag for a luma component having a first block size that is the same as or smaller than a second block size of a chroma component when a second block-level flag for the chroma component having the second block size is signaled.

16. The apparatus of claim 13, wherein the processor, upon execution of the plurality of instructions, is further configured to
  determine, in a high-level syntax, a signal indicating a granularity of at least one of a chroma component or a luma component for application of the GSO, wherein the high-level syntax comprises: a video parameter set (VPS), a picture parameter set (PPS), a sequence parameter setting (SPS), an adaptation parameter set (APS), a frame header, a slice header, a picture header, a tile header, a superblock header, or a coding tree unit (CTU) header.

17. The apparatus of claim 13, wherein at least one of:
  the syntax element comprises a high-level syntax, the GSO is enabled by the high-level syntax, and the processor, upon execution of the plurality of instructions, is further configured to receive a signal comprising an additional high-level syntax to indicate a maximum number of bands used for a band offset; or
  the block-level flag enables the GSO for the block, and the processor, upon execution of the plurality of instructions, is further configured to: determine a signal comprising an additional high-level syntax to indicate a number of bands used for a band offset in the block.

18. A non-transitory computer readable storage medium storing a plurality of instructions executable by a processor, wherein upon execution by the processor, the plurality of instructions is configured to cause the processor to perform a conversion between video data and a bitstream by:
  receiving the video data;
  determining a syntax element indicating whether a sample offset filtering process is applied to a frame in the video data at a block level, the syntax element being a predefined value;
  determine that at least one of: a generalized sample offset (GSO), a local sample offset (LSO), or a cross component sample offset (CCSO) is enabled for the frame at the block level based on the syntax element;
  determine a block-level flag indicating that one of the GSO, the LSO, or the CCSO is enabled for a block of the frame, wherein the block-level flag also indicates that another of the GSO, the LSO, or the CCSO is enabled for the block; and
  encode the video data into the bitstream by application of the at least one of the GSO, the LSO, or the CCSO at the block level.

\* \* \* \* \*